(12) United States Patent
Baggott et al.

(10) Patent No.: US 9,208,245 B2
(45) Date of Patent: Dec. 8, 2015

(54) SYSTEM AND METHOD FOR COMPENDING BLOGS

(75) Inventors: Christopher C. Baggott, Greenfield, IN (US); Allson L. Sales, Indianapolis, IN (US); Eric Stauffer, Indianapolis, IN (US); Brendan Walsh, Alton (GB)

(73) Assignee: Oracle International Corporation, Redwood Shores, CA (US)

( * ) Notice: Subject to any disclaimer, the term of this patent is extended or adjusted under 35 U.S.C. 154(b) by 643 days.

(21) Appl. No.: 12/665,568

(22) PCT Filed: Jun. 20, 2008

(86) PCT No.: PCT/US2008/067776
§ 371 (c)(1),
(2), (4) Date: Dec. 18, 2009

(87) PCT Pub. No.: WO2008/157810
PCT Pub. Date: Dec. 24, 2008

(65) Prior Publication Data
US 2010/0185664 A1 Jul. 22, 2010

Related U.S. Application Data

(60) Provisional application No. 61/004,341, filed on Nov. 27, 2007, provisional application No. 60/936,625, filed on Jun. 21, 2007, provisional application No. 60/994,898, filed on Sep. 21, 2007.

(51) Int. Cl.
*G06F 17/30* (2006.01)

(52) U.S. Cl.
CPC ...... *G06F 17/3089* (2013.01); *G06F 17/30589* (2013.01)

(58) Field of Classification Search
CPC .................................. G06F 17/30589
USPC ............... 707/706, 713, 722, 736, 737, 781, 707/999.003; 709/223
See application file for complete search history.

(56) References Cited

U.S. PATENT DOCUMENTS

| | | | |
|---|---|---|---|
| 2005/0086215 A1* | 4/2005 | Perisic | 707/3 |
| 2006/0173985 A1* | 8/2006 | Moore | 709/223 |
| 2006/0195442 A1 | 8/2006 | Cone | |
| 2007/0027932 A1* | 2/2007 | Thibeault | 707/200 |
| 2007/0130123 A1* | 6/2007 | Majumder | 707/3 |

OTHER PUBLICATIONS

International Searching Authority, Written Opinion of the International Searching Authority, mailed Dec. 24, 2008 (PCT/US2008/067776).
International Searching Authority, International Search Report, mailed Dec. 24, 2008 (PCT/US2008/067776).

* cited by examiner

*Primary Examiner* — Syling Yen
(74) *Attorney, Agent, or Firm* — Miles & Stockbridge, P.C.

(57) ABSTRACT

The present disclosure provides a system and method for preparing compended biogs, In at least one embodiment, a method of posting blog content to a compended blog comprises establishing a compended blog having a selected keyword, obtaining a blog content, processing the blog content to identify at least one blog content keyword contained within the blog content, comparing the identified blog content keyword to the selected keyword to determine whether a match exists based upon at least one predetermined criterion, and posting the blog content the compended blog if the comparison reveals a match based upon meeting or exceeding the predetermined criterion.

19 Claims, 42 Drawing Sheets

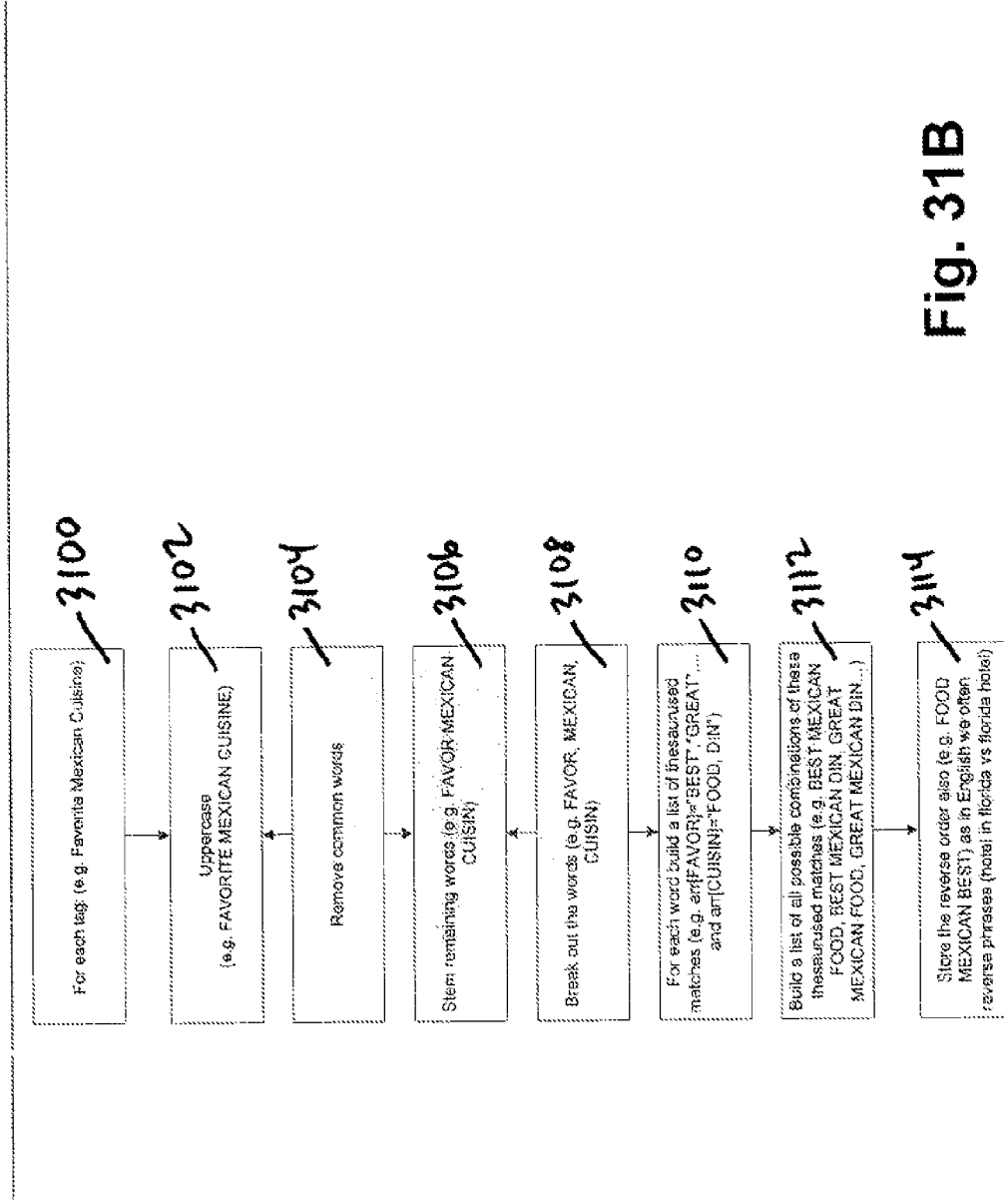

SYSTEM AND METHOD FOR COMPENDING BLOGS

PRIORITY

The present application is related to, and claims the priority benefit of, International Patent Application Ser. No. PCT/US2008/067776, filed Jun. 20, 2008, which is related to and claims the benefit of U.S. Provisional Patent Application Ser. No. 61/004,341, entitled "SYSTEM AND METHOD FOR COMPENDED BLOG CONTENT," filed Nov. 27, 2007, U.S. Provisional Patent Application Ser. No. 60/994,898, entitled "SYSTEM AND METHOD FOR COMPENDING BLOGS," filed Sep. 21, 2007, and U.S. Provisional Patent Application Ser. No. 60/936,625, entitled "SYSTEM AND METHOD FOR PREPARING COMPENDED BLOGS," filed Jun. 21, 2007. The contents of each of these applications are hereby incorporated by reference in their entirety into this disclosure.

BACKGROUND

A web log, or "blog," is a an internet site, or page(s) within a larger site, where a writer writes, or blogs, about topics of interest to the writer. Blog writers are typically referred to as "bloggers," and the electronic world of blogs, generally referred to as the "blogosphere," is rapidly expanding.

Every day, huge numbers of new blogs are created, and a even greater number are posted to or updated. As recently as 2006, estimates placed the number of blog posts as high as 1.2 million per day. Of these, 75,000 were newly created blogs. This increased blogging activity presents an excellent opportunity for corporations and other product and/or service providers to expand their marketing efforts.

Blogs present a unique opportunity for the public, including potential clients and customers, to get a candid view of employer practices, ethics and viewpoints. If used in an appropriate manner, blogs can be an invaluable tool to gain customers, educate clients, and increase market penetration.

Traditional blogs of the past few years typically involve the blogging efforts of an individual blogger creating and posting information to his or her own blog. This information is then typically accessed by a searcher of the Internet to identify the posted blog content via search, or whereby a searcher is directed to the blog content by the blogger. In addition, the information prepared and posted by the blogger is not used elsewhere, so the bloggers efforts are limited to a single forum.

Traditional blogs pose a number of problems that are solved by the disclosure of the present application. For example, if an individual blogger is also an employee of a company, and the blogger posts information related to the company's field to his or her own personal blog, the company may receive no benefit to those efforts as the personal blog content is not affiliated with the company. The disclosure of the present application solves that problem by providing a system and method for preparing a "compended" blog, which may comprise a compilation of posts from several individual blogs, a single post being posted to several compended blogs, or a combination thereof. For example, if a compended blog is created relating to automobile design, and an employee of an automobile design firm blogs to her individual blog relating to automobile design, a system and/or method of the present disclosure would allow the content from the individual blog to be posted on the compended blog based on at least one selected keyword, for example, which may be the incorporation of the words "automobile" and "design" within the individual blog post.

An additional problem created by individual blogs is described by way of the following example. In one example, a software company may have, for example, 50 different employee-bloggers, each of which maintaining their own personal blogs relating to an aspect of software design, creation, and implementation. The company, however, may have an interest in benefiting from these efforts, but has no mechanism to compile the information contained within those 50 individual blogs into a format useful to a potential customer or client interested in those aspects of software. At least one system and/or method of the present disclosure solves this problem by, for example, creating one or more compended blogs for specific aspects of software, whereby content from the 50 individual blogs, once affiliated with or accessible by the compended blog(s), may be placed on the compended blog(s) themselves. For example, the company may create a "software design" compended blog, and content created by the individual blogger-employee may, if one or more predetermined criteria are met (keyword matches, for example), may then additionally be posted to the "software design" blog for the benefit of the company.

As such, it would be beneficial to have a system and/or method for preparing and/or maintaining compended blogs to overcome these, and potentially other, shortcomings relating to traditional blogs.

BRIEF SUMMARY

In at least one embodiment of a method of posting blog content to a compended blog, the method comprises the steps of establishing at least one compended blog having at least one selected keyword, obtaining a blog content, processing the blog content to identify at least one blog content keyword contained within the blog content, comparing the at least one identified blog content keyword to the at least one selected keyword to determine whether a match exists based upon at least one predetermined criterion, and posting the blog content to at least one of the at least one compended blog if the comparison reveals a match based upon meeting or exceeding the at least one predetermined criterion. In another embodiment, the step of establishing at least one compended blog comprises establishing one compended blog having two or more selected keywords. In yet another embodiment, the blog content is selected from a group consisting of an article, a photograph, and a video clip. In an additional embodiment, the method further comprises the step of titling the at least one compended blog using at least one of the at least one selected keywords for the at least one compended blog. In yet an additional embodiment, the at least one selected keyword comprises a word or phrase used when a user searches an Internet to identify information relative to the at least one selected keyword.

In at least one embodiment of a method of posting blog content to a compended blog, the at least one selected keyword comprises a word or phrase indicative of a commercial product. In another embodiment, the at least one selected keyword comprises a word or phrase indicative of an organization. In yet another embodiment, the at least one selected keyword comprises a word or phrase indicative of a commercial service offering. In an additional embodiment, the blog content is prepared by an individual user having an individual user name. In yet an additional embodiment, the individual user prepares the blog content for posting on an individual blog of the individual user.

In at least one embodiment of a method of posting blog content to a compended blog, the step of posting the blog content further comprises the step of posting the blog content to an individual blog. In another embodiment, the blog content is present on the at least one compended blog in alphabetical order by individual user name. In yet another embodiment, the individual user has access to the at least one selected keyword of the at least one compended blog at the time the individual user prepared the blog content. In an additional embodiment, the step of comparing the at least one identified blog content keyword to the at least one selected keyword is performed by an administrator of the at least one compended blog. In yet an additional embodiment, the at least one compended blog comprises two or more compended blogs, and the step of posting the blog content comprises posting the blog content to at least two of the two or more compended blogs if a match exists for at least two of the two or more compended blogs.

In at least one embodiment of a method of posting blog content to a compended blog, the blog content is posted at a specific date and time, and the blog content is present on the at least one compended blog in reverse-chronological order. In another embodiment, the blog content is posted at a specific date and time, and the blog content is present on the at least one compended blog in chronological order. In yet another embodiment, the blog content is present on the at least one compended blog in alphabetical order by one of the at least one blog content keywords. In an additional embodiment, the method further comprises the step of delivering the blog content to a recipient via electronic mail. In yet an additional embodiment, the method further comprises the step of delivering the blog content to a recipient via Really Simple Syndication.

In at least one embodiment of a method of posting blog content to a compended blog, the step of establishing at least one compended blog is performed using Trellian data. In another embodiment, the at least one selected keyword comprises at least one compended tag. In yet another embodiment, if during the step of comparing the at least one identified blog content keyword to the at least one selected keyword does not reveal a match, the individual user may amend the blog content to include at least one selected keyword within the blog content. In an additional embodiment, the step of processing the blog content is performed using Yahoo Term Extraction. In yet an additional embodiment, if a match exists, a first score is provided to the match based upon an application of a scoring algorithm.

In at least one embodiment of a method of posting blog content to a compended blog, the at least one selected keyword is stemmed to identify at least one selected keyword stem. In another embodiment, the at least one blog content keyword is stemmed to identify at least one blog content keyword stem. In yet another embodiment, the step of comparing the at least one identified blog content keyword to the at least one selected keyword comprises the step of comparing the at least one blog content keyword stem to the at least one selected keyword stem to determine whether a match exists. In an additional embodiment, if a match exists, a second score is provided to the match based upon an application of a scoring algorithm. In yet an additional embodiment, the step of comparing the at least one identified blog content keyword to the at least one selected keyword comprises the step of comparing the at least one identified blog content keyword and the at least one blog content keyword stem to the at least one selected keyword and the at least one selected keyword stem to determine whether a match exists.

In at least one embodiment of a method of posting blog content to a compended blog, if a match exists, a third score is provided to the match based upon an application of a scoring algorithm. In another embodiment, the at least one selected keyword is passed through a thesaurus to identify one or more selected keyword synonyms. In yet another embodiment, the at least one blog content keyword is passed through a thesaurus to identify one or more blog content keyword synonyms. In an additional embodiment, the step of comparing the at least one identified blog content keyword to the at least one selected keyword comprises the step of comparing the one or more blog content keyword synonyms to the one or more selected keyword synonyms to determine whether a match exists. In yet an additional embodiment, if a match exists, a fourth score is provided to the match based upon an application of a scoring algorithm.

In at least one embodiment of a method of posting blog content to a compended blog, the step of comparing the at least one identified blog content keyword to the at least one selected keyword comprises the step of comparing the at least one identified blog content keyword and the one or more blog content keyword synonyms to the at least one selected keyword and the one or more selected keyword synonyms to determine whether a match exists. In another embodiment, if a match exists, a fifth score is provided to the match based upon an application of a scoring algorithm. In yet another embodiment, the at least one selected keyword stem is passed through a thesaurus to identify one or more selected keyword stem synonyms. In an additional embodiment, the at least one blog content keyword stem is passed through a thesaurus to identify one or more blog content keyword stem synonyms. In yet an additional embodiment, the step of comparing the at least one identified blog content keyword to the at least one selected keyword comprises the step of comparing the one or more blog content keyword stem synonyms to the one or more selected keyword stem synonyms to determine whether a match exists.

In at least one embodiment of a method of posting blog content to a compended blog, if a match exists, a sixth score is provided to the match based upon an application of a scoring algorithm. In another embodiment, the step of comparing the at least one identified blog content keyword to the at least one selected keyword comprises the step of comparing the one or more blog content keyword synonyms and the one or more blog content keyword stem synonyms to the one or more selected keyword synonyms and the one or more selected keyword stem synonyms to determine whether a match exists. In yet another embodiment, if a match exists, a seventh score is provided to the match based upon an application of a scoring algorithm. In an additional embodiment, the step of comparing the at least one identified blog content keyword to the at least one selected keyword comprises the step of comparing the at least one identified blog content keyword, the one or more blog content keyword synonyms, and the one or more blog content keyword stem synonyms to the at least one selected keyword, the one or more selected keyword synonyms, and the one or more selected keyword stem synonyms to determine whether a match exists. In yet an additional embodiment, if a match exists, a eighth score is provided to the match based upon an application of a scoring algorithm.

In at least one embodiment of a method of posting blog content to a compended blog, the step of comparing the at least one identified blog content keyword to the at least one selected keyword compares the at least one identified blog content keyword to the at least one selected keyword using a scoring algorithm. In another embodiment, the scoring algorithm provides individual scores relating to one or more matches. In yet another embodiment, at least two of the individual scores are equal to one another. In an additional embodiment, at least two of the individual scores are different from one another. In yet an additional embodiment, if a sum of the individual scores meets or exceeds a predetermined score threshold, the blog content is posted to at least one of the at least one compended blog.

In at least one embodiment of a method of posting blog content to a compended blog, the step of comparing the at least one identified blog content keyword to the at least one selected keyword further comprises the step of confirming the match prior to the step of posting the blog content. In another embodiment, the step of confirming the match is performed by an administrator. In yet another embodiment, if the step of confirming a match confirms the match, the step of posting the blog content will occur. In an additional embodiment, if the step of confirming a match confirms the match, the step of posting the blog content to the compended blog will not occur. In yet an additional embodiment, the at least one predetermined criterion comprises a word match between at least one of the at least one selected keyword and at least one of the at least one blog content keyword.

In at least one embodiment of a method of posting blog content to a compended blog, the at least one predetermined criterion comprises a predetermined score threshold. In another embodiment, the at least one selected keyword and the at least one identified blog content keyword are converted into uppercase format. In yet another embodiment, the method further comprises the step of removing common words from the at least one selected keyword and the at least one blog content keyword prior to performing the step of comparing the at least one identified blog content keyword to the at least one selected keyword.

In at least one embodiment of a method for registering a client requesting compended blog services, the method comprises the steps of creating a new client profile, affiliating the new client profile with at least one compended blog, and creating at least one category within the new client profile. In another embodiment, the method further comprises the step of creating at least one subcategory within each of the at least one categories, each of the at least one subcategories to become a compended blog. In yet another embodiment, the method further comprises the step of placing at least one tag against each compended blog. In an additional embodiment, the method further comprises the step of performing a build thesaurus tags process to generate a serialized array of thesaurused tags. In yet an additional embodiment, the method further comprises the step of saving the serialised array of thesaurused tags against each compended blog.

In at least one embodiment of a method for registering a client requesting compended blog services, the method comprises the steps of creating a new client profile, affiliating the new client profile with at least one compended blog, creating at least one category within the new client profile, creating at least one subcategory within each of the at least one categories, each of the at least one subcategories to become a compended blog, placing at least one tag against each compended blog, performing a build thesaurus tags process to generate a serialized array of thesaurused tags, and saving the serialised array of thesaurused tags against each compended blog.

In at least one embodiment of a method for building thesaurused tags, the method comprises the steps of identifying a tag having text, the text having one or more individual words, and converting the text of the tag into uppercase format. In yet another embodiment, the method further comprises the step of removing common words from the text to obtain remaining text. In an additional embodiment, the method further comprises the step of stemming the remaining text to obtain stemmed text, the stemmed text comprising individual stemmed terms. In yet an additional embodiment, the method further comprises the step of separating the individual stemmed terms of the stemmed text from one another.

In at least one embodiment of a method for registering a client requesting compended blog services, the method further comprises the step of building a list of thesaurused matches for each word of the stemmed text. In another embodiment, the method further comprises the step of building a list of combinations of the thesaurused matches. In yet another embodiment, the method further comprises the step of storing the list of combinations of the thesaurused matches. In an additional embodiment, the method further comprises the step of storing the list of combinations of the thesaurused matches in reverse order.

In at least one embodiment of a method for building thesaurused tags, the method comprises the steps of identifying a tag having text, the text having one or more individual words, converting the text of the tag into uppercase format, removing common words from the text to obtain remaining text, stemming the remaining text to obtain stemmed text, the stemmed text comprising individual stemmed terms, separating the individual stemmed terms of the stemmed text from one another, building a list of thesaurused matches for each word of the stemmed text, building a list of combinations of the thesaurused matches, and storing the list of combinations of the thesaurused matches.

In at least one embodiment of a method for performing a compending process, the method comprises the steps of approving a new blog post comprising common words and uncommon words, the new blog post obtained from a client, removing common words from the blog post, and stemming the uncommon words of the blog post to generate a compilation of one or more stemmed terms. In another embodiment, the method further comprises the step of searching a system for preparing compended blogs for one or more other blogs from the client. In yet another embodiment, the method further comprises the step of obtaining a thesaurused tags array for the new blog post and the one or more other blogs from the client. In an additional embodiment, the method further comprises the step of comparing the compilation of one or more stemmed terms with the thesaurused tags array to identify one or more matches of the one or more stemmed terms with the thesaurused tags array. In yet an additional embodiment, if one or more matches is/are identified, the method further comprises the step of posting the new blog post to one or more of the one or more other blogs.

In at least one embodiment of a method for performing a compending process, if one or more matches is/are identified, the method further comprises the step of posting the new blog post to a client's compended blog.

In at least one embodiment of a method for performing a compending process, the method comprises the steps of approving a new blog post comprising common words and uncommon words, the new blog post obtained from a client, removing common words from the blog post, stemming the uncommon words of the blog post to generate a compilation of one or more stemmed terms, searching a system for preparing compended blogs for one or more other blogs from the client, obtaining a thesaurused tags array for the new blog post and the one or more other blogs from the client, and comparing the compilation of one or more stemmed terms with the thesaurused tags array to identify one or more matches of the one or more stemmed terms with the thesaurused tags array. In another embodiment, if one or more matches is/are identified, the method father comprises the step of posting the new blog post to one or more of the one or more other blogs. In yet another embodiment, if one or more matches is/are identified, the method further comprises the step of posting the new blog post to a client's compended blog.

In at least one embodiment of a method for compending blog postings from a plurality of users, the method comprises the steps of establishing at least one compended blog having at least one selected keyword, providing a strength indicator for consideration when preparing blog content, obtaining a blog content, processing the blog content to identify at least one keyword contained in the content, comparing the at least one identified keyword to at least one selected keywords to determine whether a match exists, and posting the blog content to the compended blog if the comparison reveals a match. In another embodiment, the strength indicator comprises a tag cloud comprising one or more words/phrases. In yet another embodiment, the tag cloud contains words/phrases of varying font sizes, the font sizes corresponding to the frequency of compending the particular words/phrases. In an additional embodiment, the font sizes are larger for words/phrases with greater compending frequency than the font sizes for words/phrases with lesser compending frequency. In yet an additional embodiment, the tag cloud contains words/phrases of varying font colors, the font colors corresponding to the frequency of compending the particular words/phrases.

In at least one embodiment of a method for compending blog postings from a plurality of users, the font colors are darker for words/phrases with greater compending frequency than the font colors for words/phrases with lesser compending frequency. In another embodiment, the blog content is obtained from an individual blog. In yet another embodiment, the match is determined based upon at least one predetermined criterion, wherein at least one of the at least one predetermined criteria comprises predetermined score threshold based upon an application of an algorithm. In an additional embodiment, the strength indicator comprises a strength bar. In yet an additional embodiment, the strength bar displays a number between 1 and 100, the number based upon an application of a scoring algorithm.

In at least one embodiment of a method for compending blog postings from a plurality of users, the number is greater if the blog content has a relatively stronger match to the at least one selected keyword, and the number if smaller if the blog content has a relatively weaker match to the at least one selected keyword. In another embodiment, the scoring algorithm comprises one or more core factors. In yet another embodiment, one of the one or more core factors relates to the number of the at least one keywords that match the at least one selected keyword. In an additional embodiment, one of the one or more core factors relates to the number of different at least one keywords that match the at least one selected keyword. In yet an additional embodiment, one of the one or more core factors relates to the number of the at least one keywords that match the at least one selected keyword as compared to a number of all words within the blog content.

In at least one embodiment of a method for compending blog postings from a plurality of users, the strength bar displays at least one of two or more different colors, wherein the two or more different colors correspond to two or more different ranges of numbers between 1 and 100, wherein the number within the different ranges of numbers are based upon an application of a scoring algorithm. In another embodiment, one of the two or more different colors is red, the red color corresponding to a relatively weaker match to the at least one selected keyword, and wherein one of the two or more different colors is green, the green color corresponding to a relatively stronger match to the at least one selected keyword. In yet another embodiment, the number is greater if the blog content has a relatively stronger match to the one or more words/phrases, and wherein the number if smaller if the blog content has a relatively weaker match to the one or more words/phrases.

In at least one embodiment of a method for compending blog postings from a plurality of users, the method comprises the steps of establishing at least one compended blog having at least one selected keyword, searching one or more individual blogs for individual blog content, identifying individual blog content containing at least one individual blog content keyword, comparing the at least one selected keyword to the at least one individual blog content keyword to determine if a match exists, and posting the individual blog content containing the at least one individual blog content keyword matching the at least one selected keyword on the at least one compended blog if a match exists. In another embodiment, the method further comprises the step of generating a hyperlink referring to the individual blog content posted on the at least one compended blog. In yet another embodiment, the method further comprises the step of posting the hyperlink along with the individual blog content on the at least one compended blog. In an additional embodiment, the individual blog content is prepared by an individual user having an individual user name. In yet an additional embodiment, the individual user prepared the individual blog content for posting on an individual blog of the individual user.

In at least one embodiment of a method for compending blog postings from a plurality of users, the step of posting the individual blog content further comprises the step of posting the blog content to an individual blog. In another embodiment, the individual blog content is present on the at least one compended blog in alphabetical order by individual user name. In yet another embodiment, the individual user has access to the at least one selected keyword of the at least one compended blog at the time the individual user prepared the individual blog content. In an additional embodiment, the at least one compended blog comprises two or more compended blogs, and the step of posting the individual blog content comprises posting the individual blog content to at least two of the two or more compended blogs if a match exists for at least two of the two or more compended blogs. In yet an additional embodiment, if during the step of comparing the at least one identified blog content keyword to the at least one selected keyword does not reveal a match, the individual user may amend the individual blog content to include at least one selected keyword within the individual blog content.

In at least one embodiment of a method for compending blog postings from a plurality of users, if a match exists, a first score is provided to the match based upon an application of a scoring algorithm. In another embodiment, the at least one selected keyword is stemmed to identify at least one selected keyword stem. In yet another embodiment, the at least one individual blog content keyword is stemmed to identify at least one individual blog content keyword stem. In an additional embodiment, the step of comparing the at least one selected keyword to the at least one individual blog content keyword comprises the step of comparing the at least one individual blog content keyword stem to the at least one selected keyword stem to determine whether a match exists. In yet an additional embodiment, the step of comparing the at least one selected keyword to the at least one individual blog content keyword comprises the step of comparing the at least one individual blog content keyword and the at least one individual blog content keyword stem to the at least one selected keyword and the at least one selected keyword stem to determine whether a match exists.

In at least one embodiment of a method for compending blog postings from a plurality of users, the at least one selected keyword is passed through a thesaurus to identify one or more selected keyword synonyms. In another embodiment, the at least one individual blog content keyword is passed through a thesaurus to identify one or more individual blog content keyword synonyms. In yet another embodiment, the step of comparing the at least one selected keyword to the at least one individual blog content keyword comprises the step of comparing the one or more individual blog content keyword synonyms to the one or more selected keyword synonyms to determine whether a match exists.

In an additional embodiment, the step of comparing the at least one selected keyword to the at least one individual blog content keyword comprises the step of comparing the at least one individual blog content keyword and the one or more individual blog content keyword synonyms to the at least one selected keyword and the one or more selected keyword synonyms to determine whether a match exists. In yet an additional embodiment, the at least one selected keyword stem is passed through a thesaurus to identify one or more selected keyword stem synonyms.

In at least one embodiment of a method for compending blog postings from a plurality of users, the at least one individual blog content keyword stem is passed through a thesaurus to identify one or more individual blog content keyword stem synonyms. In another embodiment, the step of comparing the at least one selected keyword to the at least one individual blog content keyword comprises the step of comparing the one or more individual blog content keyword stem synonyms to the one or more selected keyword stem synonyms to determine whether a match exists. In yet another embodiment, the step of comparing the at least one selected keyword to the at least one individual blog content keyword comprises the step of comparing the one or more individual blog content keyword synonyms and the one or more individual blog content keyword stem synonyms to the one or more selected keyword synonyms and the one or more selected keyword stem synonyms to determine whether a match exists. In an additional embodiment, the step of comparing the at least one selected keyword to the at least one individual blog content keyword comprises the step of comparing the at least one individual blog content keyword, the one or more individual blog content keyword synonyms, and the one or more individual blog content keyword stem synonyms to the at least one selected keyword, the one or more selected keyword synonyms, and the one or more selected keyword stem synonyms to determine whether a match exists. In yet an additional embodiment, the method further comprises the step of removing common words from the at least one selected keyword and the at least one individual blog content keyword prior to performing the step of comparing the at least one selected keyword to the at least one individual blog content keyword.

In at least one embodiment of a method for compending blog postings, the method comprises the steps of establishing two or more compended blogs, each of the two or more compended blogs having at least one selected keyword, identifying an individual blog content prepared by an individual user posted on an individual user blog, the individual blog content having at least one individual blog content keyword, comparing the at least one selected keyword of each of at least two of the two or more compended blogs to the at least one individual blog content keyword to determine whether a match exists based upon at least one predetermined criterion, and posting the individual blog content to one or more of the two or more compended blogs if the comparison reveals a match. In another embodiment, if during the step of comparing the at least one selected keyword of each of at least two of the two or more compended blogs to the at least one individual blog content keyword does not reveal a match, the individual user may amend the individual blog content to include at least one selected keyword within the individual blog content. In yet another embodiment, if a match exists, a first score is provided to the match based upon an application of a scoring algorithm. In an additional embodiment, the at least one selected keyword is stemmed to identify at least one selected keyword stem. In yet an additional embodiment, the at least one individual blog content keyword is stemmed to identify at least one individual blog content keyword stem.

In at least one embodiment of a method for compending blog postings, the step of comparing the at least one selected keyword of each of at least two of the two or more compended blogs to the at least one individual blog content keyword comprises the step of comparing the at least one individual blog content keyword stem to the at least one selected keyword stem to determine whether a match exists. In another embodiment, the step of comparing the at least one selected keyword of each of at least two of the two or more compended blogs to the at least one individual blog content keyword comprises the step of comparing the at least one individual blog content keyword and the at least one individual blog content keyword stem to the at least one selected keyword and the at least one selected keyword stem to determine whether a match exists. In yet another embodiment, the at least one selected keyword is passed through a thesaurus to identify one or more selected keyword synonyms. In an additional embodiment, the at least one individual blog content keyword is passed through a thesaurus to identify one or more individual blog content keyword synonyms. In yet an additional embodiment, the step of comparing the at least one selected keyword of each of at least two of the two or more compended blogs to the at least one individual blog content keyword comprises the step of comparing the one or more individual blog content keyword synonyms to the one or more selected keyword synonyms to determine whether a match exists.

In at least one embodiment of a method for compending blog postings, the step of comparing the at least one selected keyword of each of at least two of the two or more compended blogs to the at least one individual blog content keyword comprises the step of comparing the at least one individual blog content keyword and the one or more individual blog content keyword synonyms to the at least one selected keyword and the one or more selected keyword synonyms to determine whether a match exists. In another embodiment, the at least one selected keyword stem is passed through a thesaurus to identify one or more selected keyword stem synonyms. In yet another embodiment, the at least one individual blog content keyword stem is passed through a thesaurus to identify one or more individual blog content keyword stem synonyms. In an additional embodiment, the step of comparing the at least one selected keyword of each of at least two of the two or more compended blogs to the at least one individual blog content keyword comprises the step of comparing the one or more individual blog content keyword stem synonyms to the one or more selected keyword stem synonyms to determine whether a match exists. In yet an additional embodiment, the step of comparing the at least one selected keyword of each of at least two of the two or more compended blogs to the at least one individual blog content keyword comprises the step of comparing the one or more individual blog content keyword synonyms and the one or more individual blog content keyword stem synonyms to the one or more selected keyword synonyms and the one or more selected keyword stem synonyms to determine whether a match exists.

In at least one embodiment of a method for compending blog postings, the step of comparing the at least one selected keyword of each of at least two of the two or more compended blogs to the at least one individual blog content keyword comprises the step of comparing the at least one individual blog content keyword, the one or more individual blog content keyword synonyms, and the one or more individual blog content keyword stem synonyms to the at least one selected keyword, the one or more selected keyword synonyms, and the one or more selected keyword stem synonyms to determine whether a match exists. In another embodiment, the method further comprises the step of removing common words from the at least one selected keyword and the at least one individual blog content keyword prior to performing the step of comparing the at least one selected keyword to the at least one individual blog content keyword.

In at least one embodiment of a method for delivering compended blog postings to a recipient, the method comprises the steps of identifying at least one compended blog, the at least one compended blog comprising at least one blog content relating to at least one selected keyword, the at least one blog content additionally posted on at least one other blog, identifying a recipient for receiving blog content from the at least one compended blog based upon the at least one selected keyword, and delivering at least one blog content relating to the at least one selected keyword to the recipient. In another embodiment, the step of delivering at least one blog content occurs at a predetermined frequency. In yet another embodiment, the predetermined frequency is daily. In an additional embodiment, the predetermined frequency is daily at a specific time. In yet an additional embodiment, the at least one blog content is delivered to the recipient via electronic mail. In another embodiment, the at least one blog content is delivered to the recipient via Really Simple Syndication.

In at least one embodiment of a method for compending blog postings, the method comprises the steps of establishing at least one compended blog having at least one selected keyword, identifying one or more identified blogs related to a client, each of the one or more identified blogs including identified blog content, processing the identified blog content to identify at least one identified blog content keyword contained within the identified blog content, comparing the at least one identified blog content keyword to the at least one selected keyword for the at least one compended blog to determine whether a match exists based upon at least one predetermined criterion, and posting at least one of the identified blog content to the at least one compended blog if the comparison reveals a match.

In at least one embodiment of a method for obtaining blog content keyword stemmed thesaurus terms, the method comprises the steps of obtaining a blog content, processing the blog content to identify at least one blog content keyword contained within the blog content, stemming the at least one blog content keyword to generate a compilation of at least one blog content keyword stemmed terms, and processing the at least one blog content keyword stemmed terms with a thesaurus to generate a compilation of at least one blog content keyword stemmed thesaurus terms.

In at least one embodiment of a method for obtaining blog content keyword stemmed thesaurus terms, the method comprises the steps of identifying one or more identified blogs related to a client, each of the one or more identified blogs including identified blog content, processing the identified blog content to identify at least one identified blog content keyword contained within the identified blog content, stemming the at least one identified blog content keyword to generate a compilation of compended tags, and processing the compilation of compended tags with a thesaurus to generate a compilation of compended stemmed tags.

In at least one embodiment of a method of posting blog content to a compended blog, the method comprises the steps of establishing at least one compended blog having at least one selected keyword, obtaining a blog content, the blog content having at least one blog content keyword, comparing at least one of the at least selected keywords to at least one of the at least one blog content keywords to determine whether a match exists based upon at least one predetermined criterion, and posting the blog content to at least one of the at least one compended blogs if the comparison step reveals a match based upon meeting or exceeding the at least one predetermined criterion.

In at least one embodiment of a system for accessing a compended blog, the system comprises at least one server hosting a compended blog, at least one user computer operably connected to the at least one server, at least one administrator computer operably connected to the at least one server, wherein the at least one user computer is operable to access the compended blog. In another embodiment, the at least one user computer is operably connected to the at least one server over a network. In yet another embodiment, the network comprises the Internet. In an additional embodiment, the network is selected from a group consisting of the Internet, a commercial telephone network, one or more local area networks, one or more wide area networks, one or more wireless communications networks, coaxial cable, fiber optic cable, and twisted-pair cable. In yet an additional embodiment, the at least one administrator computer is operably connected to the at least one server over a network.

In at least one embodiment of a system for accessing a compended blog, the network comprises the Internet. In another embodiment, the at least one user computer is selected from a group consisting of a personal computer, a mainframe computer, a workstation, a notebook computer, a laptop computer, a hand-held computer, a wireless mobile telephone, and a personal digital assistant. In yet another embodiment, the at least one administrator computer is selected from a group consisting of a personal computer, a mainframe computer, a workstation, a notebook computer, a laptop computer, a hand-held computer, a wireless mobile telephone, and a personal digital assistant. In an additional embodiment, the at least one server comprises one server. In yet an additional embodiment, the at least one server comprises two or more servers.

In at least one embodiment of a system for accessing a compended blog, the blog content is selected from a group consisting of an article, a photograph, and a video clip. In another embodiment, the blog content was directly derived from one or more individual blogs.

In at least one embodiment of a system for administering a compended blog, the system comprises a first computer hosting a compended blog, the compended blog having at least one selected keyword, a second computer operably connected to the first computer through a network, wherein the second computer is operable by a user to prepare individual blog content, wherein the individual blog content is accessible by the first computer, and wherein the first computer is operable to compare the individual blog content to the at least one selected keyword to determine whether a match exists, and wherein the first computer is further operable to post the individual blog content to the compended blog of a match exists.

In at least one embodiment of a system for compending blogs, the system comprises a first computer operably coupled to one or more user computers through a network, wherein the first computer is operable to establish at least one compended blog having at least one selected keyword, obtain a blog content from at least one of the one or more user computers, process the blog content to identify at least one blog content keyword contained within the blog content, compare the at least one identified blog content keyword to the at least one selected keyword to determine whether a match exists based upon at least one predetermined criterion, and post the blog content to at least one of the at least one compended blog if the comparison reveals a match. In another embodiment, a match exists based upon meeting or exceeding at least one predetermined criterion. In yet another embodiment, the at least one predetermined criterion comprises a word match between at least one of the at least one selected keyword and at least one of the at least one blog content keyword. In an additional embodiment, the at least one predetermined criterion comprises a predetermined score threshold.

In at least one embodiment of a system configured to compend blog postings from a plurality of users, the system comprises a server operably connected to a plurality of user computers and at least one administrator computer, the server including instructions to compend the blog postings by processing the blog postings to identify at least one keyword contained in the content, comparing the at least one identified keyword to at least one selected keywords for the compended blog to determine whether a match exists based upon predetermined criteria, and posting the blog content to the compended blog if the comparison reveals a match.

In at least one embodiment of a system for compending blogs, the system comprises a database capable of receiving blog content, and a processor operably connected to the database, the processor having and executing a program and operational to establish at least one compended blog having at least one selected keyword, obtain a blog content, process the blog content to identify at least one blog content keyword contained within the blog content, compare the at least one identified blog content keyword to the at least one selected keyword to determine whether a match exists based upon at least one predetermined criterion, and post the blog content to at least one of the at least one compended blog if the comparison reveals a match based upon meeting or exceeding the at least one predetermined criterion. In another embodiment, the blog content is selected from a group consisting of an article, a photograph, and a video clip. In yet another embodiment, the at least one selected keyword comprises a word or phrase used when a user searches an Internet to identify information relative to the at least one selected keyword. In an additional embodiment, the at least one selected keyword comprises a word or phrase indicative of a commercial product. In yet an additional embodiment, the at least one selected keyword comprises a word or phrase indicative of an organization.

In at least one embodiment of a system for compending blogs, the at least one selected keyword comprises a word or phrase indicative of a commercial service offering. In another embodiment, the blog content is prepared by an individual user having an individual user name. In yet another embodiment, the individual user prepares the blog content for posting on an individual blog of the individual user. In an additional embodiment, the step of posting the blog content further comprises the step of posting the blog content to an individual blog. In yet an additional embodiment, the blog content is present on the at least one compended blog in alphabetical order by individual user name.

In at least one embodiment of a system for compending blogs, the individual user has access to the at least one selected keyword of the at least one compended blog at the time the individual user prepared the blog content. In another embodiment, if a match exists, a first score is provided to the match based upon an application of a scoring algorithm. In yet another embodiment, the processor is further operable to stem the at least one selected keyword to identify at least one selected keyword stem. In an additional embodiment, the processor is further operable to stem the at least one blog content keyword identify at least one blog content keyword stem. In yet an additional embodiment, the processor is further operable to compare the at least one blog content keyword stem to the at least one selected keyword stem to determine whether a match exists.

In at least one embodiment of a system for compending blogs, the processor is further operable to compare the at least one identified blog content keyword and the at least one blog content keyword stem to the at least one selected keyword and the at least one selected keyword stem to determine whether a match exists. In another embodiment, the processor is further operable to pass the at least one selected keyword through a thesaurus to identify one or more selected keyword synonyms. In yet another embodiment, the processor is further operable to pass the at least one blog content keyword through a thesaurus to identify one or more blog content keyword synonyms. In an additional embodiment, the processor is further operable to compare the one or more blog content keyword synonyms to the one or more selected keyword synonyms to determine whether a match exists. In yet an additional embodiment, the processor is further operable to compare the at least one identified blog content keyword and the one or more blog content keyword synonyms to the at least one selected keyword and the one or more selected keyword synonyms to determine whether a match exists.

In at least one embodiment of a system for compending blogs, the processor is further operable to pass the at least one selected keyword stem through a thesaurus to identify one or more selected keyword stem synonyms. In another embodiment, the processor is further operable to pass the at least one blog content keyword stem through a thesaurus to identify one or more blog content keyword stem synonyms. In yet another embodiment, the processor is further operable to compare the one or more blog content keyword stem synonyms to the one or more selected keyword stem synonyms to determine whether a match exists. In an additional embodiment, the processor is further operable to compare the one or more blog content keyword synonyms and the one or more blog content keyword stem synonyms to the one or more selected keyword synonyms and the one or more selected keyword stem synonyms to determine whether a match exists. In yet an additional embodiment, the processor is further operable to compare the at least one identified blog content keyword, the one or more blog content keyword synonyms, and the one or more blog content keyword stem synonyms to the at least one selected keyword, the one or more selected keyword synonyms, and the one or more selected keyword stem synonyms to determine whether a match exists.

In at least one embodiment of a system for compending blogs, the processor is further operable to compare the at least one identified blog content keyword to the at least one selected keyword using a scoring algorithm. In another embodiment, the scoring algorithm provides individual scores relating to one or more matches. In yet another embodiment, if a sum of the individual scores meets or exceeds a predetermined score threshold, the blog content is posted to at least one of the at least one compended blog.

In at least one embodiment of a system for compending blogs, the system comprises a database capable of receiving a new client profile, and a processor operably connected to the database, the processor having and executing a program and operational to create the new client profile, affiliate the new client profile with at least one compended blog, and create at least one category within the new client profile. In another embodiment, the processor is further operational to create at least one subcategory within each of the at least one categories, each of the at least one subcategories to become a compended blog, place at least one tag against each compended blog, perform a build thesaurus tags process to generate a serialized array of thesaurused tags, and save the serialised array of thesaurused tags against each compended blog.

In at least one embodiment of a system for preparing thesaurused tags, the system comprises a database capable of receiving text, and a processor operably connected to the database, the processor having and executing a program and operational to identify a tag having text, the text having one or more individual words, convert the text of the tag into uppercase format, remove common words from the text to obtain remaining text, stem the remaining text to obtain stemmed text, the stemmed text comprising individual stemmed terms, separate the individual stemmed terms of the stemmed text from one another, build a list of thesaurused matches for each word of the stemmed text, build a list of combinations of the thesaurused matches, and store the list of combinations of the thesaurused matches.

In at least one embodiment of a system for compending blogs, the system comprises a database capable of receiving a new blog post, and a processor operably connected to the database, the processor having and executing a program and operational to approve the new blog post comprising common words and uncommon words, the new blog post obtained from a client, remove common words from the blog post, stem the uncommon words of the blog post to generate a compilation of one or more stemmed terms. In another embodiment, the processor is further operational to search a system for preparing compended blogs for one or more other blogs from the client, obtain a thesaurused tags array for the new blog post and the one or more other blogs from the client, and compare the compilation of one or more stemmed terms with the thesaurused tags array to identify one or more matches of the one or more stemmed terms with the thesaurused tags array.

In at least one embodiment of a system for compending blogs, the system comprises a database capable of receiving blog content, and a processor operably connected to the database, the processor having and executing a program and operational to establish at least one compended blog having at least one selected keyword, provide a strength indicator for consideration when preparing blog content, obtain the blog content, process the blog content to identify at least one keyword contained in the content, compare the at least one identified keyword to at least one selected keywords to determine whether a match exists, and post the blog content to the compended blog if the comparison reveals a match.

In at least one embodiment of a system for compending blogs, the system comprises a database capable of receiving individual blog content, and a processor operably connected to the database, the processor having and executing a program and operational to establish at least one compended blog having at least one selected keyword, search one or more individual blogs for individual blog content, identify individual blog content containing at least one individual blog content keyword, compare the at least one selected keyword to the at least one individual blog content keyword to determine if a match exists, and post the individual blog content containing the at least one individual blog content keyword matching the at least one selected keyword on the at least one compended blog if a match exists.

In at least one embodiment of a system for compending blogs, the system comprises a database capable of receiving individual blog content, and a processor operably connected to the database, the processor having and executing a program and operational to establish two or more compended blogs, each of the two or more compended blogs having at least one selected keyword, identify an individual blog content prepared by an individual user posted on an individual user blog, the individual blog content having at least one individual blog content keyword, compare the at least one selected keyword of each of at least two of the two or more compended blogs to the at least one individual blog content keyword to determine whether a match exists based upon at least one predetermined criterion, and post the individual blog content to one or more of the two or more compended blogs if the comparison reveals a match.

In at least one embodiment of a system for compending blogs, the system comprises a database capable of receiving blog content, and a processor operably connected to the database, the processor having and executing a program and operational to identify at least one compended blog, the at least one compended blog comprising at least one blog content relating to at least one selected keyword, the at least one blog content additionally posted on at least one other blog, identify a recipient for receiving blog content from the at least one compended blog based upon the at least one selected keyword, and deliver at least one blog content relating to the at least one selected keyword to the recipient.

In at least one embodiment of a system for compending blogs, the system comprises a database capable of receiving identified blog content, and a processor operably connected to the database, the processor having and executing a program and operational to establish at least one compended blog having at least one selected keyword, identify one or more identified blogs related to a client, each of the one or more identified blogs including identified blog content, process the identified blog content to identify at least one identified blog content keyword contained within the identified blog content, compare the at least one identified blog content keyword to the at least one selected keyword for the at least one compended blog to determine whether a match exists based upon at least one predetermined criterion, and post at least one of the identified blog content to the at least one compended blog if the comparison reveals a match.

In at least one embodiment of a system for compending blogs, the system comprises a database capable of receiving blog content, and a processor operably connected to the database, the processor having and executing a program and operational to obtain blog content, process the blog content to identify at least one blog content keyword contained within the blog content, stem the at least one blog content keyword to generate a compilation of at least one blog content keyword stemmed terms, and process the at least one blog content keyword stemmed terms with a thesaurus to generate a compilation of at least one blog content keyword stemmed thesaurus terms.

In at least one embodiment of a system for compending blogs, the system comprises a database capable of receiving identified blog content, and a processor operably connected to the database, the processor having and executing a program and operational to identify one or more identified blogs related to a client, each of the one or more identified blogs including identified blog content, process the identified blog content to identify at least one identified blog content keyword contained within the identified blog content, stem the at least one identified blog content keyword to generate a compilation of compended tags, and process the compilation of compended tags with a thesaurus to generate a compilation of compended stemmed tags.

In at least one embodiment of a system for compending blogs, the system comprises a database capable of receiving blog content, and a processor operably connected to the database, the processor having and executing a program and operational to establish at least one compended blog having at least one selected keyword, obtain blog content, the blog content having at least one blog content keyword, compare at least one of the at least selected keywords to at least one of the at least one blog content keywords to determine whether a match exists based upon at least one predetermined criterion, and post the blog content to at least one of the at least one compended blogs if the comparison step reveals a match based upon meeting or exceeding the at least one predetermined criterion.

In at least one embodiment of a computer program having a plurality of program steps to be executed on a computer to prepare a compended blog, the computer program comprises means for establishing at least one compended blog having at least one selected keyword, means for obtaining a blog content, means for processing the blog content to identify at least one blog content keyword contained within the blog content, means for comparing the at least one identified blog content keyword to the at least one selected keyword to determine whether a match exists based upon at least one predetermined criterion, and means for posting the blog content to at least one of the at least one compended blog if the comparison reveals a match based upon meeting or exceeding the at least one predetermined criterion.

In at least one embodiment of a computer program having a plurality of program steps to be executed on a computer to register a client requesting compended blog services, the computer program comprises means for creating a new client profile, means for affiliating the new client profile with at least one compended blog, means for creating at least one category within the new client profile, means for creating at least one subcategory within each of the at least one categories, each of the at least one subcategories to become a compended blog, means for placing at least one tag against each compended blog, means for performing a build thesaurus tags process to generate a serialized array of thesaurused tags, and means for saving the serialised array of thesaurused tags against each compended blog.

In at least one embodiment of a computer program having a plurality of program steps to be executed on a computer to build thesaurused tags, the computer program comprises means for identifying a tag having text, the text having one or more individual words, means for converting the text of the tag into uppercase format, means for removing common words from the text to obtain remaining text, means for stemming the remaining text to obtain stemmed text, the stemmed text comprising individual stemmed terms, means for separating the individual stemmed terms of the stemmed text from one another, means for building a list of thesaurused matches for each word of the stemmed text, means for building a list of combinations of the thesaurused matches, and means for storing the list of combinations of the thesaurused matches.

In at least one embodiment of a computer program having a plurality of program steps to be executed on a computer to prepare a compended blog, the computer program comprises means for approving a new blog post comprising common words and uncommon words, the new blog post obtained from a client, means for removing common words from the blog post; and means for stemming the uncommon words of the blog post to generate a compilation of one or more stemmed terms.

In at least one embodiment of a computer program having a plurality of program steps to be executed on a computer to perform a compending process, the computer program comprises means for approving a new blog post comprising common words and uncommon words, the new blog post obtained from a client, means for removing common words from the blog post, means for stemming the uncommon words of the blog post to generate a compilation of one or more stemmed terms, means for searching a system for preparing compended blogs for one or more other blogs from the client, means for obtaining a thesaurused tags array for the new blog post and the one or more other blogs from the client, and means for comparing the compilation of one or more stemmed terms with the thesaurused tags array to identify one or more matches of the one or more stemmed terms with the thesaurused tags array.

In at least one embodiment of a computer program having a plurality of program steps to be executed on a computer to perform a compending process, the computer program comprises means for establishing at least one compended blog having at least one selected keyword, means for providing a strength indicator for consideration when preparing blog content, means for obtaining a blog content, means for processing the blog content to identify at least one keyword contained in the content, means for comparing the at least one identified keyword to at least one selected keywords to determine whether a match exists, and means for posting the blog content to the compended blog if the comparison reveals a match.

In at least one embodiment of a computer program having a plurality of program steps to be executed on a computer to perform a compending process, the computer program comprises means for establishing at least one compended blog having at least one selected keyword, means for searching one or more individual blogs for individual blog content, means for identifying individual blog content containing at least one individual blog content keyword, means for comparing the at least one selected keyword to the at least one individual blog content keyword to determine if a match exists, and means for posting the individual blog content containing the at least one individual blog content keyword matching the at least one selected keyword on the at least one compended blog if a match exists.

In at least one embodiment of a compended blog, the compended blog comprises blog content from one or more individual blogs. In another embodiment, the compended blog further comprises a compended blog title, the compended blog title derived from at least one selected keyword affiliated with the compended blog.

In at least one embodiment of a compended blog, the compended blog comprises blog content from one or more other compended blogs.

In at least one embodiment of a machine readable media containing instructions for use in generating at least one compended blog, the instructions are executable by one or more processing devices to enable a user to post a first content, enable an administrator to establish a plurality of compended blogs and to select at least one keyword for each compended blog, and compare the first content to the selected keywords to determine whether a match exists and, if a match exists posting the content to the compended blog(s) for which a keyword match exists.

In at least one embodiment of a machine readable media containing instructions for use in generating at least one compended blog, the instructions are executable by one or more processing devices to establish at least one compended blog having at least one selected keyword, obtain a blog content, process the blog content to identify at least one blog content keyword contained within the blog content, compare the at least one identified blog content keyword to the at least one selected keyword to determine whether a match exists based upon at least one predetermined criterion, and post the blog content to at least one of the at least one compended blog if the comparison reveals a match based upon meeting or exceeding the at least one predetermined criterion.

BRIEF DESCRIPTION OF THE DRAWINGS

The features and advantages of the present disclosure, and the manner of attaining them, will be more apparent and better understood by reference to the following descriptions taken in conjunction with the accompanying drawings, wherein:

FIG. 31B shows a portion of an exemplary build thesaurused tags process of a method for preparing compended blogs according to the present disclosure;

DETAILED DESCRIPTION

Figure 1A:
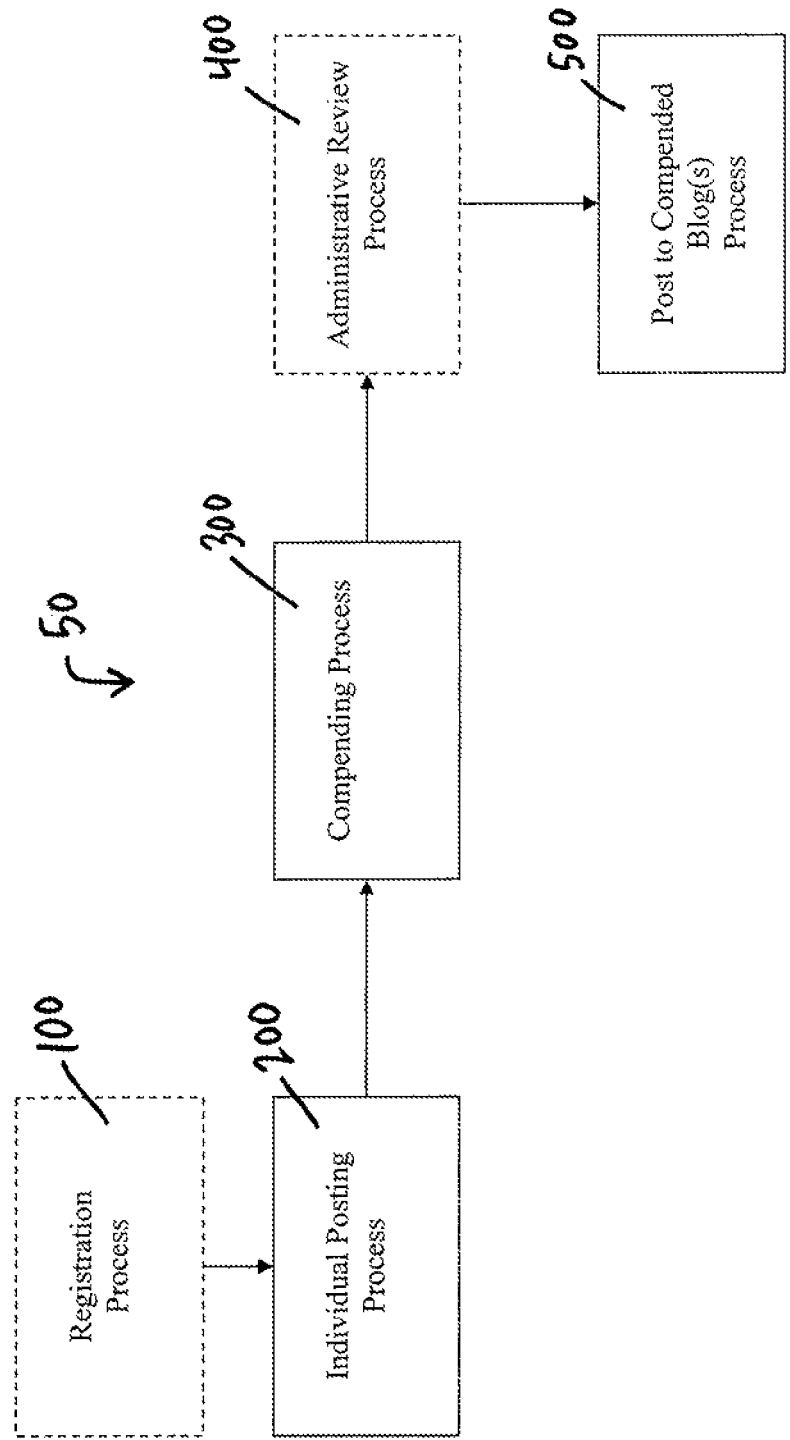
FIG. 1A shows a general process flow diagram of at least one embodiment of a method for preparing compended blogs according to the present disclosure.

The present disclosure relates to a system and method for preparing compended blogs. For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

Individual blogs and the functionality that enables their posting over the Internet typically have common characteristics. For example, individual blogs are typically managed through a user account. Several organizations, including, but not limited to, Google's Blogger and Six Apart's TypePad, enable an individual to prepare and maintain individual blogs over the Internet. In addition, a typical individual blog is likely to span several topics, and generally comprises multiple farms of content including, without limitation, articles, photographs, video clips, etc. (referred to herein as "content", "articles", and or "posts") prepared and/or posted to the blog by a single user. Furthermore, a typical individual blog is named/titled by the individual user.

Conversely, a compended blog, according to at least one embodiment of the present disclosure, has a number of notable differences from a typical individual blog. A compended blog, according to the present disclosure, may be managed through an administrator account (instead of an individual user account), and depending on the specific parameters set for the compended blog, may focus on one or multiple topics. Instead of merely aggregating several posts from the same individual under a single title or at a single location, a compended blog of the present disclosure may comprise a compilation of posts from several individual blogs, a single post being posted to several compended blogs, or a combination thereof. Furthermore, a compended blog of the present disclosure may be named or titled using a particular key word or phrase that people may use when searching the Internet in order to find information and products, for example related to a particular organization, product line, etc.

At least one exemplary embodiment of a system disclosed in the present application allows organizations or others to create collectively beneficial blogs in an environment that enables content solicitation and search optimization with control and compliance. Individual blogs or other content may be leveraged to create multiple "compended" category blogs, with each compended blog collecting relevant content from individual blogs and illustratively providing hyperlinks back to those individual blogs. Individual blog content may be "pushed" into the right place(s), a process that may occur on the back end. These "compended" category blogs are hubs of organized and relevant information that are easily navigated and found via search engines. In one embodiment, the content is created within personal user accounts, where individual users who post content to their individual blog(s) and specify individual preferences. In one example, using keyword tags, each individual blog content submission is categorized and then either published immediately or submitted to an administrator for approval prior to publishing (categorization also can happen on the back-end, and more technical users may still have the option to designate tags). Once published, the content post appears on that individual's blog page. In addition to posting on the individual user's blog, the content is also posted to the appropriate "compended" category blog(s), which links back to the individual's blog. An individual blog post can be posted to multiple "compended" blogs if it fits multiple categories. Illustratively, all "compended" category blog content is ordered in reverse-chronological order. Other methods of ordering are within the scope of this disclosure, for example in chronological order, by author, by title (alphabetically or otherwise), by topic (alphabetically or otherwise), and a variety of other methods of ordering. It is also within the scope of this disclosure to include a field sortable chart of the compended blogs and/or posted blogs within one or more compended categories.

In the event that a compended blog on a specific category does not yet exist, a new compended blog may be created and future content related to that category is added to it using the process above.

Content readers can choose to have content delivered via Really Simple Syndication (RSS) and/or email or via some other suitable means. They can also designate frequency and level of compending (for example, a reader whose organization uses the disclosed system for internal means may select to have anything related to "product" sent via email every Monday at 6:00 AM).

A user can log into his account to view metrics specific to his individual blog; an administrator or other authorized party can view metrics for all user blogs that he or she is managing.

EXAMPLE 1

Compendium Software

Examples of a system for preparing compended blogs according to the disclosure of the present application is provided herein. An illustrative embodiment of a method of the present disclosure is depicted in FIG. 1A. FIG. 1A represents a method for preparing compended blogs 50 including an optional registration process 100, an individual posting process 200, a compending process 300, an optional administrative review process 400, and a post to compended blog(s) process 500.

Figure 1B:
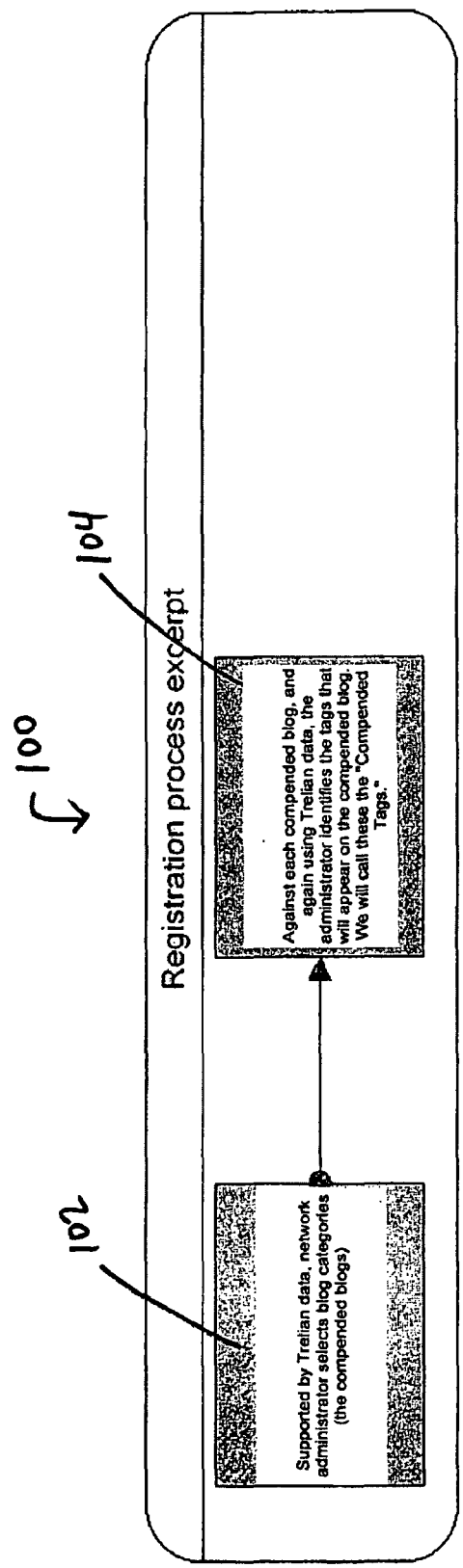
FIG. 1B shows an registration process flow diagram of at least one embodiment of a method for preparing compended blogs according to the present disclosure.

An example of a portion of a registration process for system for preparing compended blogs 50 of the present disclosure is shown in FIG. 1B. As shown in process step 102 of FIG. 1B, an administrator or other user may establish compended blogs that are each tagged with compended tags, for example using a service for recommending tag keywords based, for example, on traffic, such as Trellian KeywordDiscovery (based on a service provided by Trellian Limited, having its principle offices at 6-8 East Concourse, BEAUMARIS, VIC 3193, AUSTRALIA, and on the Internet at http://www.trellian.com). Based on inputs, such services provide keywords and related traffic, trends, and other statistical data, charts and other information. An administrator (not shown), during the initial set-up process, may either upload, input, or select from a source one or more categories associated with a topic. The categories are transmitted or otherwise provided to system for preparing compended blogs 50 and saved in a database (not shown). For example, a car dealer may have the categories "car models", "used cars", and "new cars". These categories may serve as a starting point for finding key words and/or phrases that people may search for via the Internet in order to find information, products, etc., pertaining to that topic.

In addition, as shown in process step 104, an administrator may also specify the number of keywords or phrases the administrator wishes to view per category. For example, an administrator may choose to view the top ten or top twenty key words and/or phrases associated with a particular category based on some suitable criteria, such as traffic or financial information. The user such as the administrator, after selecting categories then selects the keywords (which as used throughout this application may include phrases) for each category. In one embodiment the titles of compended blogs are the selected keywords for each category. The compended blog titles may be automatically generated upon selection of category keywords.

Other exemplary features and steps relating to the registration or account setup process are shown in and described herein with reference to FIGS. 5 through 12.

Figure 2:
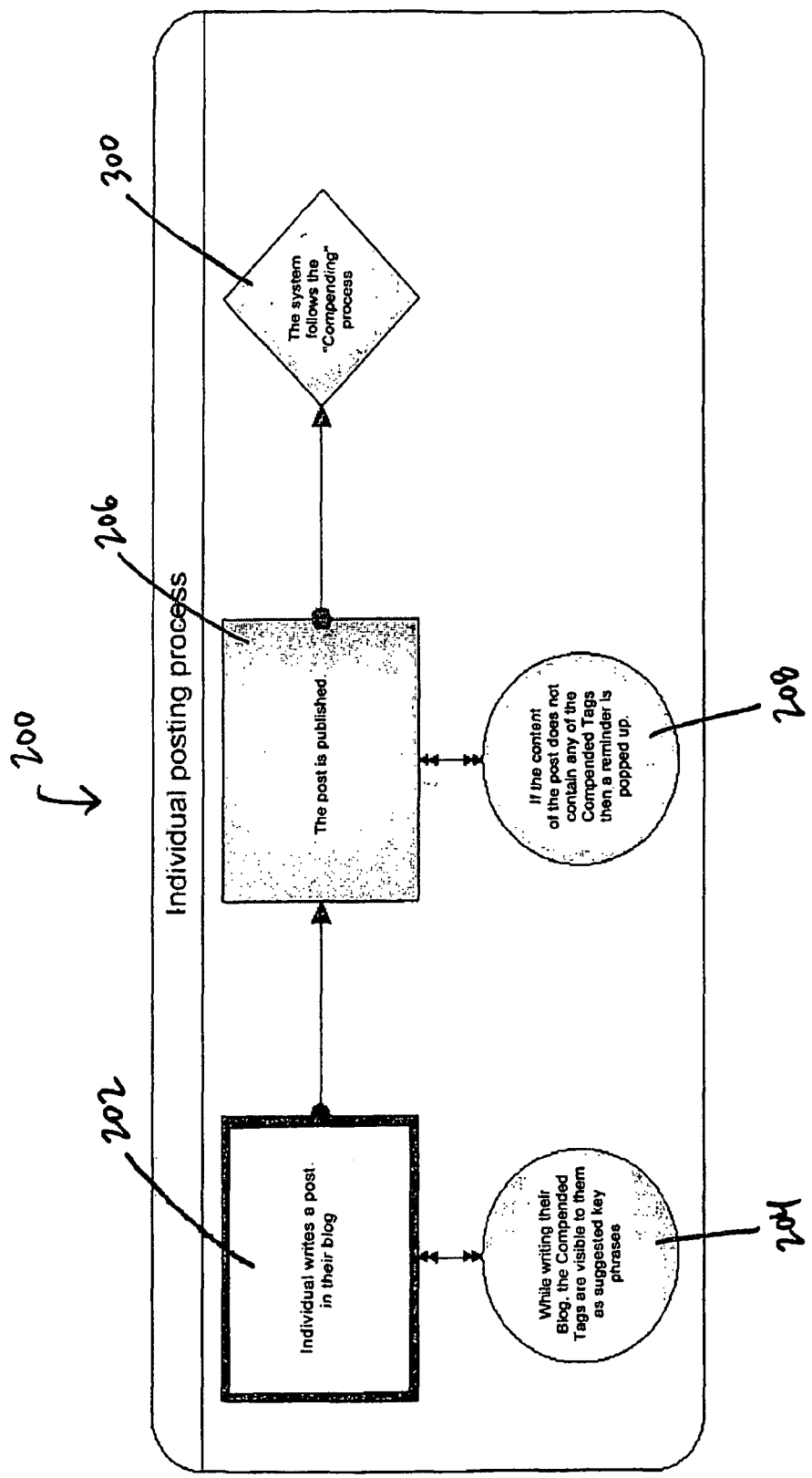
FIG. 2 shows an individual posting process flow diagram of at least one embodiment of a method for preparing compended blogs according to the present disclosure.

An example of an individual posting process according to system for preparing compended blogs 50 is shown in FIG. 2. As shown in FIG. 2, individual posting process 200 comprises process step 202 for which an individual (not shown) writes/prepares content for the individual's blog. Comment 204 references a situation whereby an individual may have access to a compended tags list (not shown) during the time an individual writes/prepares individual blog content, or upon submission thereof for posting. A compended tags list may comprise any number of words and phrases for selection by an individual to "tag" or include within particular blog content. For example, if an individual is writing/preparing individual blog content pertaining to a cell phone, the individual may want to include keyword "PDA" (for example from the compended tags list) so that the particular individual blog content is "tagged" with that particular keyword or tag.

Once an individual has prepared an individual blog content, the content is ready for "posting" or "publishing". At process step 206, an individual posts/publishes particular blog content to the individual's blog. Comment 208 references a situation when an individual did not incorporate one or more "tags" from a compended tag list into the individual's blog post. If a particular article or other blog content is not "tagged," the individual posting the content (or another user) may have the opportunity to add one or more tags to the post prior to posting or after the article has been posted via an update to add one or more tags to the already-posted blog post. A pop-up window, other screen or functionality may be presented to the user to recommend tags which the user may want to select for the post. The recommended tags list may be interfaced with an outside source such as the Trellian keyword service described herein or a similar system which may make suggestions based on the text of the post, or may use previous tags, or compended tags, selected keywords, or category names, in each case from this user or other users. Once a particular blog post has been posted, the compending process of system for preparing compended blogs 50 of the present disclosure may be followed (as shown by field 300).

Figure 3:
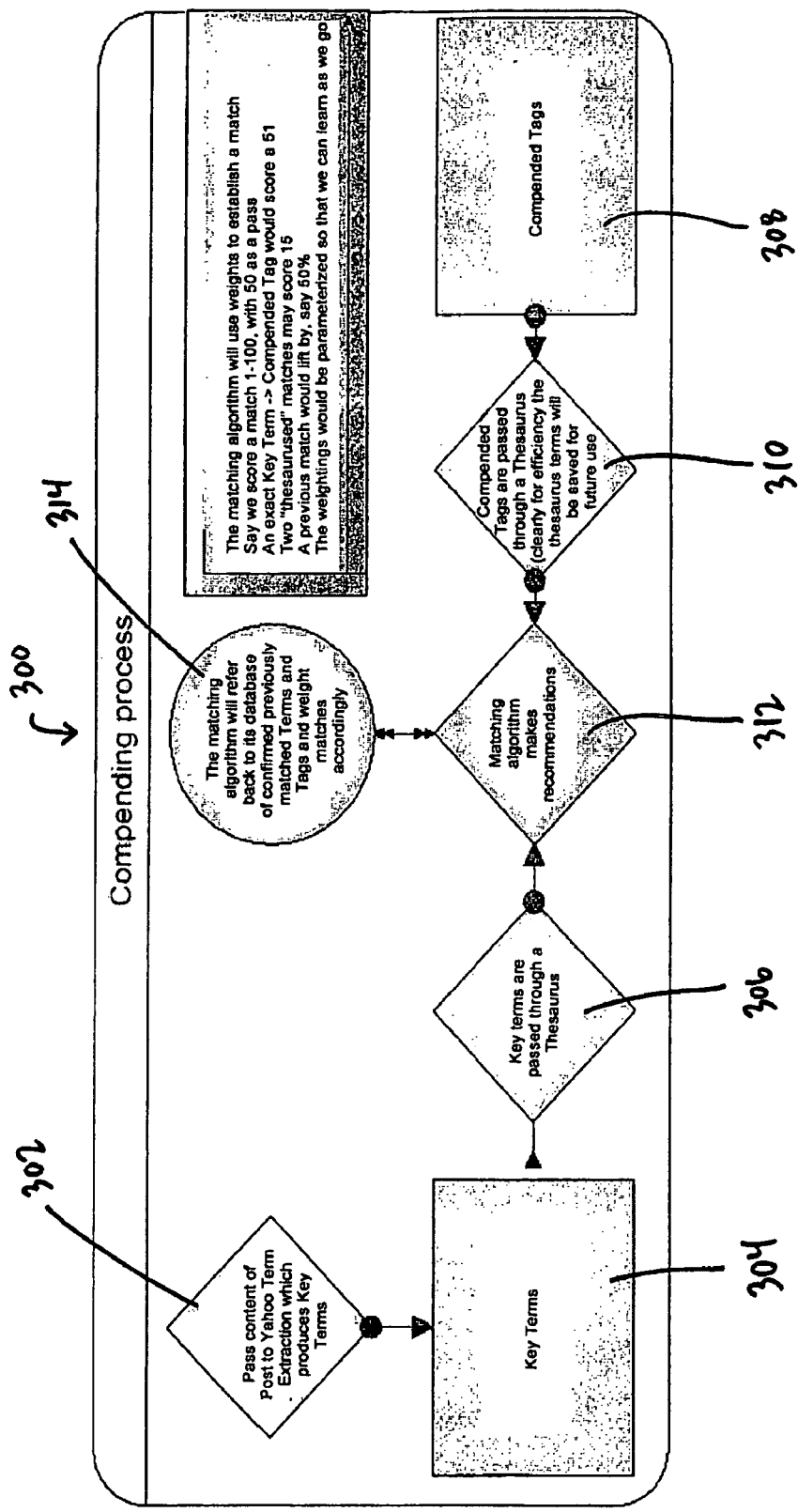
FIG. 3 shows a compending process flow diagram of at least one embodiment of a method for preparing compended blogs according to the present disclosure.

An example of a compending process according to a system for preparing compended blogs 50 is shown in FIG. 3. As shown in FIG. 3, compending process 300 begins with a blog posting which is posted at step 302. The blog post is illustratively submitted to a term extractor such as Yahoo Term Extraction which extracts keywords from the text of the post. It can be appreciated that Yahoo Term Extraction is merely one of several mechanisms for extracting keywords from a post, and that other extraction mechanisms useful for the same or similar purpose may be used within the scope and spirit of the present application.

In one embodiment, keywords (or key terms) are identified at step 304 by identifying portions of words so different forms of the same basic word will cause a match (for example, "comput" may be a key term 'stem' that is searched for to generate matches when a user submits a post including any of the terms "computing," "computer," or "computation"). In one embodiment the identified key terms or portions (stems) thereof are passed through a thesaurus to identify words with potentially similar meanings (synonyms). Key terms identified at step 304 may then be processed using a thesaurus in process step 306 to generate one or more key terms based upon a particular key term. For example, process step 306 may receive the key term "automobile" and yield the resulting key terms of "car" and "vehicle". Illustratively, the thesaurus itself may be stemmed so that a whole or partial key term will generate one or more partial synonyms (stems).

Referring again to FIG. 3, the identified key terms (or sterns thereof) and any synonyms (or stems thereof) are then submitted to be processed through an algorithm to establish whether a post matches a compended blog category, keywords, or tags. A match is determined based on a calculation. The calculation compares one or more of the following: identified key terms, identified key term stems, identified synonyms (based on key terms and/or stems), identified synonym stems (based either on full key terms or stems) with one or more of the following (which are provided at step 308 and shown illustratively as compended tags): compended tags (mud/or stems), selected keywords (and/or stems) or category names (and/or stems) or synonyms (for example using illustrative step 310 of processing with a thesaurus) and/or synonym stems of any of the foregoing. Different weights may be applied to various matches to provide a confidence level. For example, a direct match of a full identified key term with a compended tag, without stemming, may product a confidence, number, for example from 1 to 100 such as 51. If the required confidence to declare a "match" is 50, this example is considered a match and the posting would qualify for inclusion in a compended blog for which the compended tag is identified. Likewise, two matches from the post of the identified stems "calculat" and "program" with compended tags or keywords "computer" and "software" run through the thesaurus may generate confidence numbers of 20 each, which if summed equals 40 which is not enough to declare a match in this example. Instead of a summing function, any other suitable function(s) may be employed including a multiplication function that employs set or variable factors (including functions) to weight the subjects of the equation. Blog categories, keywords, or compended tags which are passed through the thesaurus generate blog category synonyms, keyword synonyms, or tag synonyms, each of which may be saved, or illustratively, may be saved when a criteria is met, such as a match being generated in the previously described calculation. Comment 314 provides a further example of a calculation such as that described above.

Referring again to the example of FIG. 3, compending process 300 comprises step 302 of providing individual blog post content to a system to generate "key terms" used by a system for preparing compended blogs 50. For example, step 302 may utilize Yahoo Term Extraction, or another extraction mechanism, to extract key terms from the text for comparison. The performance of step 302 by a system for preparing compended blogs 50 yields one or more key terms 304 to be used by a for preparing compended blogs 50. Similarly, a database of compended tags 308 may be processed using a thesaurus in process step 310 to generate one or more terms for use by a system for preparing compended blogs 50. Step 312 comprises a step whereby a matching algorithm is used to compare, for example, the key terms with the compended tags to determine whether the individual blog post is a match to and should be included under a particular category or blog title (keyword).

Figure 4A:
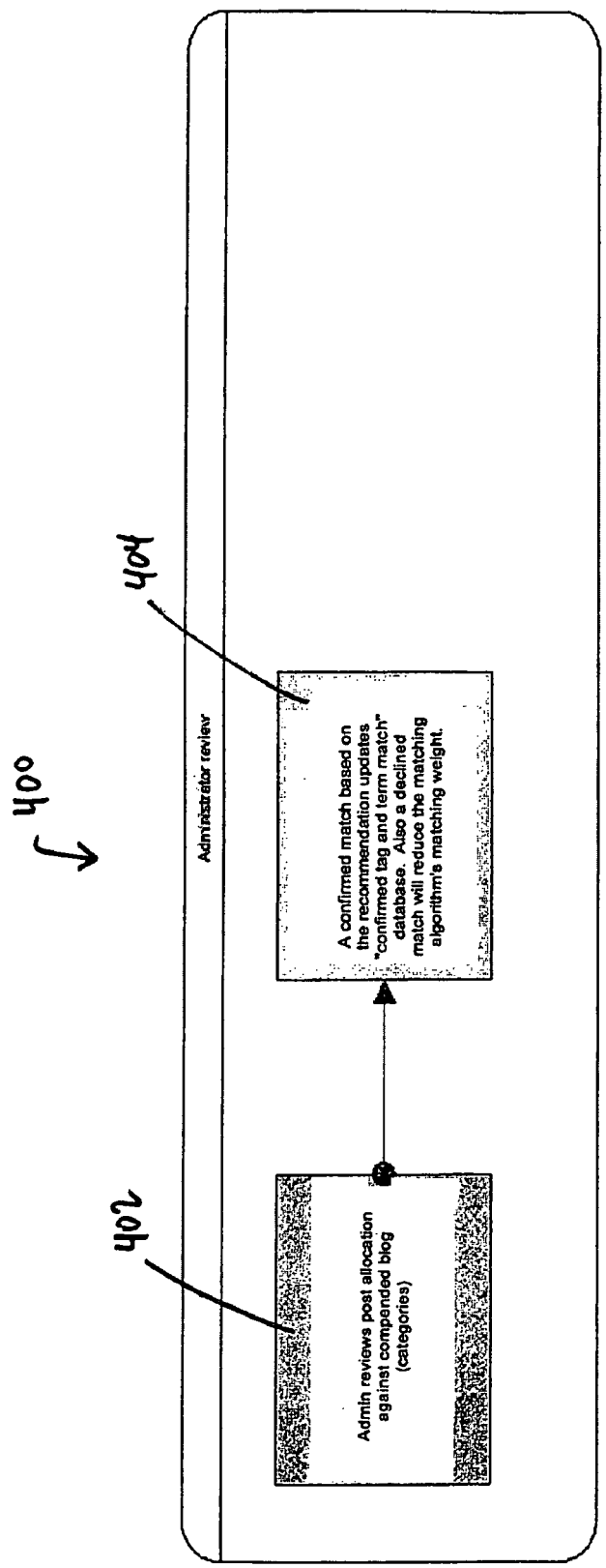
FIG. 4A shows a administrator review process flow diagram of at least one embodiment of a method for preparing compended blogs according to the present disclosure.

An example of an optional administrative review process according to a system for preparing compended blogs 50 is shown in FIG. 4A. As shown in FIG. 4A, administrative review process 400 comprises process step 402 whereby an administrator reviews post allocation against categories of one or more compended blogs. Process step 404 addresses a situation whereby a match may be confirmed based on the recommendation updates within the "confirmed tag and term match" database, and also addresses a situation whereby a match may be declined and will reduce the matching algorithm's matching weight.

Figure 4B:
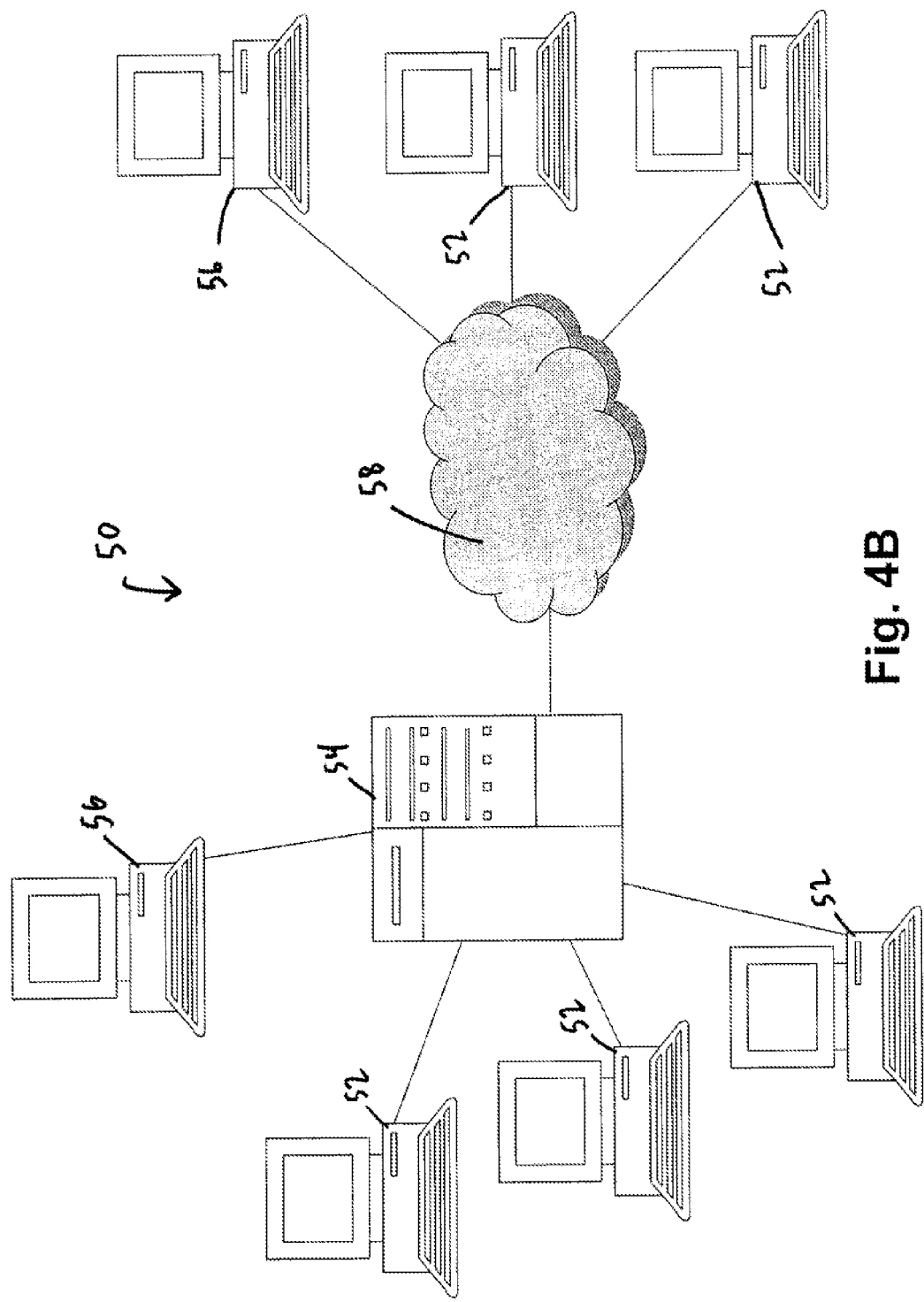
FIG. 4B shows a computer network for operating at least one embodiment of a system for preparing compended blogs according to the present disclosure.

A system for preparing compended blogs 50 of the present disclosure may operate on a computer network with one or more of the features shown in FIG. 4B. As shown in FIG. 4B, one or more user computers 52 may be operably connected to a system server 54. A user computer 52 may be a computer, computing device, or system of a type known in the art, such as a personal computer, mainframe computer, workstation, notebook computer, laptop computer, hand-held computer, wireless mobile telephone, personal digital assistant device, and the like.

One or more administrator computers 56 may also be operably connected to system server 54 including through a network 58 such as the Internet. Administrator computers 56, similar to user computers, may be computers, computing devices, or systems of a type known in the art, such as a personal computers, mainframe computers, workstations, notebook computers, laptop computers, hand-held computers, wireless mobile telephones, personal digital assistant devices, and the like. In addition, user computers and administrator computers may each comprise such software (operational and application), hardware, and componentry as would occur to one of skill of the art, such as, for example, one or more microprocessors, memory, input/output devices, device controllers, and the like. User computers and administrator computers may also comprise one or more data entry means (not shown in FIG. 4B) operable by a user of client computer and/or an administrator computer, such as, for example, a keyboard, keypad, pointing device, mouse, touchpad, touchscreen, microphone, and/or other data entry means known in the art. User computers and administrator computers also may comprise an audio display means (not shown in FIG. 4B) such as one or more loudspeakers and/or other means known in the art for emitting an audibly perceptible output. The configuration of User computers and administrator computers in a particular implementation of a system for preparing compended blogs 50 of the present disclosure is left to the discretion of the practitioner.

System server 54 may comprise one or more server computers, computing devices, or systems of a type known in the art. System server 54 may comprise server memory. System server 54 may comprise one or more components of solid-state electronic memory, such as random access memory. System server 54 may also comprise an electromagnetic memory such as one or more hard disk drives and/or one or more floppy disk drives or magnetic tape drives, and may comprise an optical memory such as a Compact Disk Read Only Memory (CD-ROM) drive. System server 54 may further comprise such software (operational and application), hardware, and componentry as would occur to one of skill of the art, such as, for example, microprocessors, input/output devices, device controllers, video display means, and the like.

System server 54 may comprise one or more host servers, computing devices, or computing systems configured and programmed to carry out the functions allocated to system server 54. System server 54 may be operated by, or under the control of, a "system operator," which may be an individual or a business entity. For purposes of clarity. System server 54 is shown in FIG. 4B and referred to herein as a single server. System server 54 need not, however, be a single server. System server 54 may comprise a plurality of servers or other computing devices or systems connected by hardware and software that collectively are operable to perform the functions allocated to a system server according to a system for preparing compended blogs 50 of present disclosure. Specifically, system server 54 may be operable to be a web server, configured and programmed to carry out the functions allocated to a system server according to the present disclosure. Further, although user computers 52 and administrator computers 56 may be connected directly to system server 54, these computers may be connected to system server 54 through any suitable network such as network 58. Further, in one embodiment, the users need not be provided access to system server 54 but instead the content posts from users are made by the user(s) and saved to one or more particular locations and the posts are accessed or harvested by the administrator or system 50 automatically.

System server 54 may be operably connected to the various user computers 52 and/or an administrator computers 56 by network 58, which in an embodiment of the present disclosure comprises the Internet, a global computer network. However, network 58 need not comprise the Internet. Network 58 may comprise any means for electronically interconnecting system server 54 and a user computer 52 and/or an administrator computer 56. Thus, it will be appreciated by those of ordinary skill in the art that the network 58 may comprise the Internet, the commercial telephone network, one or more local area networks, one or more wide area networks, one or more wireless communications networks, coaxial cable, fiber optic cable, twisted-pair cable, the equivalents of any of the foregoing, or the combination of any two or more of the foregoing. In an embodiment where system server 54 and user computer 52 and/or an administrator computer 56 comprise a single computing device operable to perform the functions delegated to both system server 54 and user computer 52 and/or an administrator computer 56 according to the present disclosure, network 58 comprises the hardware and software means interconnecting system server 54 and user computer 52 and/or an administrator computer 56 within the single computing device. Network 58 may comprise packet switched facilities, such as the Internet, circuit switched facilities, such as the public switched telephone network, radio based facilities, such as a wireless network, etc.

Figure 5:
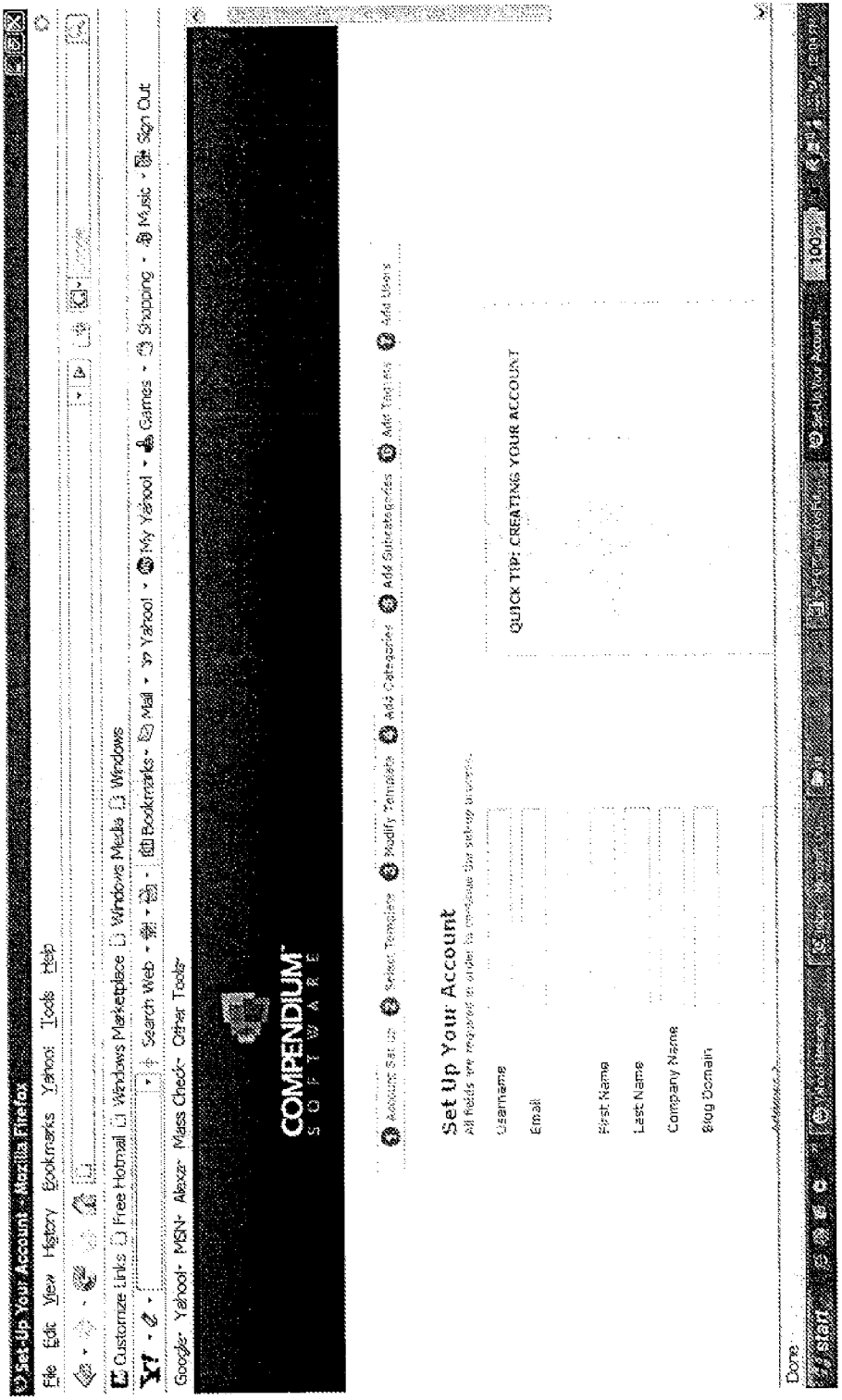
FIG. 5 shows a "Set Up Your Account" web page of at least one embodiment of a system for preparing compended blogs according to the present disclosure.

An example of a "Set Up Your Account" web page of a system for preparing compended blogs 50 of the present application is shown in FIG. 5. As shown in FIG. 5, Set Up Your Account web page allows a user to enter the user's desired username, e-mail address, first name, last name, company name, and the user's blog domain. The blog domain represents the blog website that a user's compended blog will be available from.

Figure 6A:
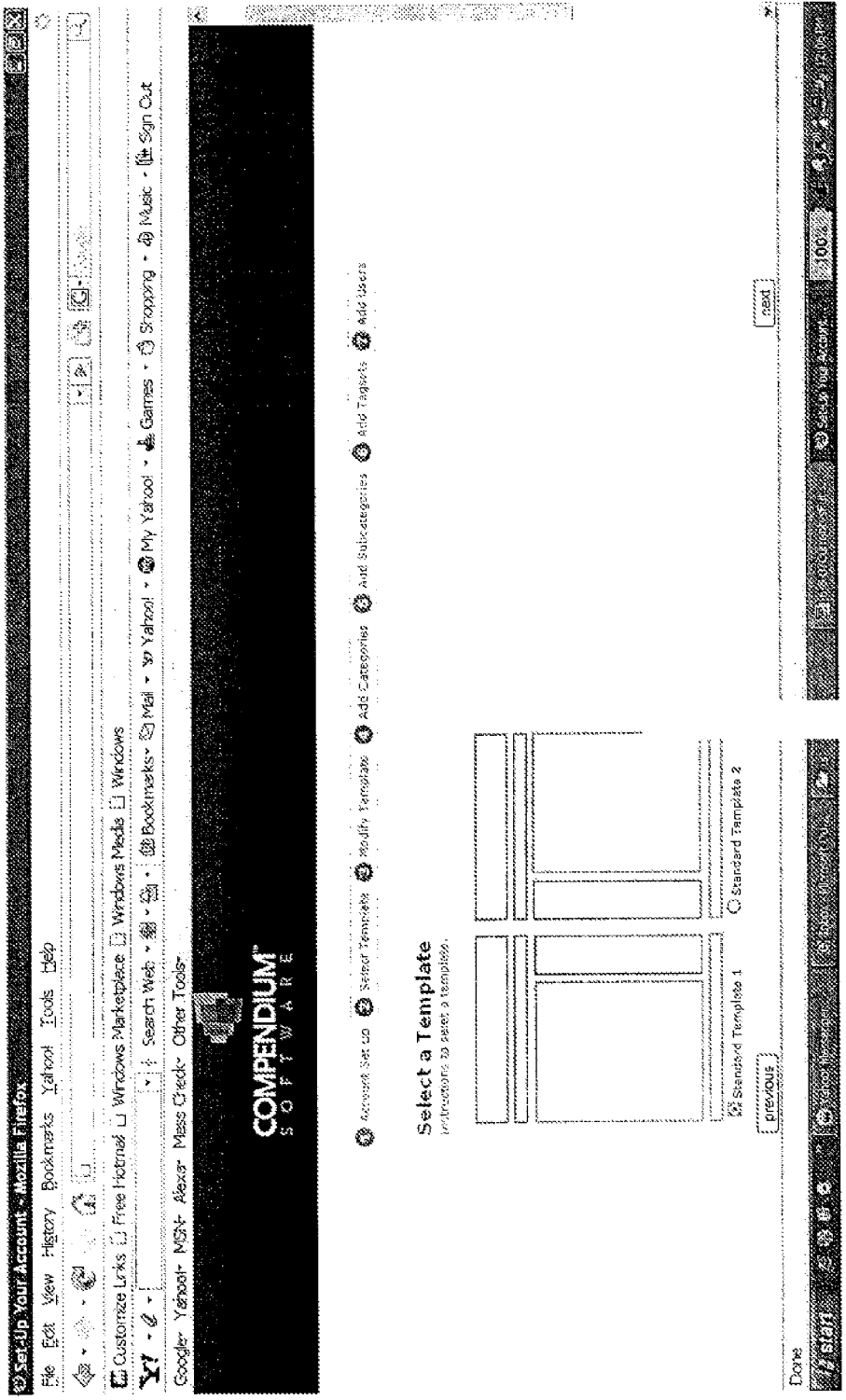
FIG. 6A shows a "Select a Template" web page of at least one embodiment of a system for preparing compended blogs according to the present disclosure.

An example of a "Select a Template" web page of a system for preparing compended blogs 50 of the present application is shown in FIG. 6A. As shown in FIG. 6A, Select a Template web page allows a user to select from one or more preformatted blog templates, allowing a user to determine the general lay-out of a resulting compended blog.

Figure 6B:
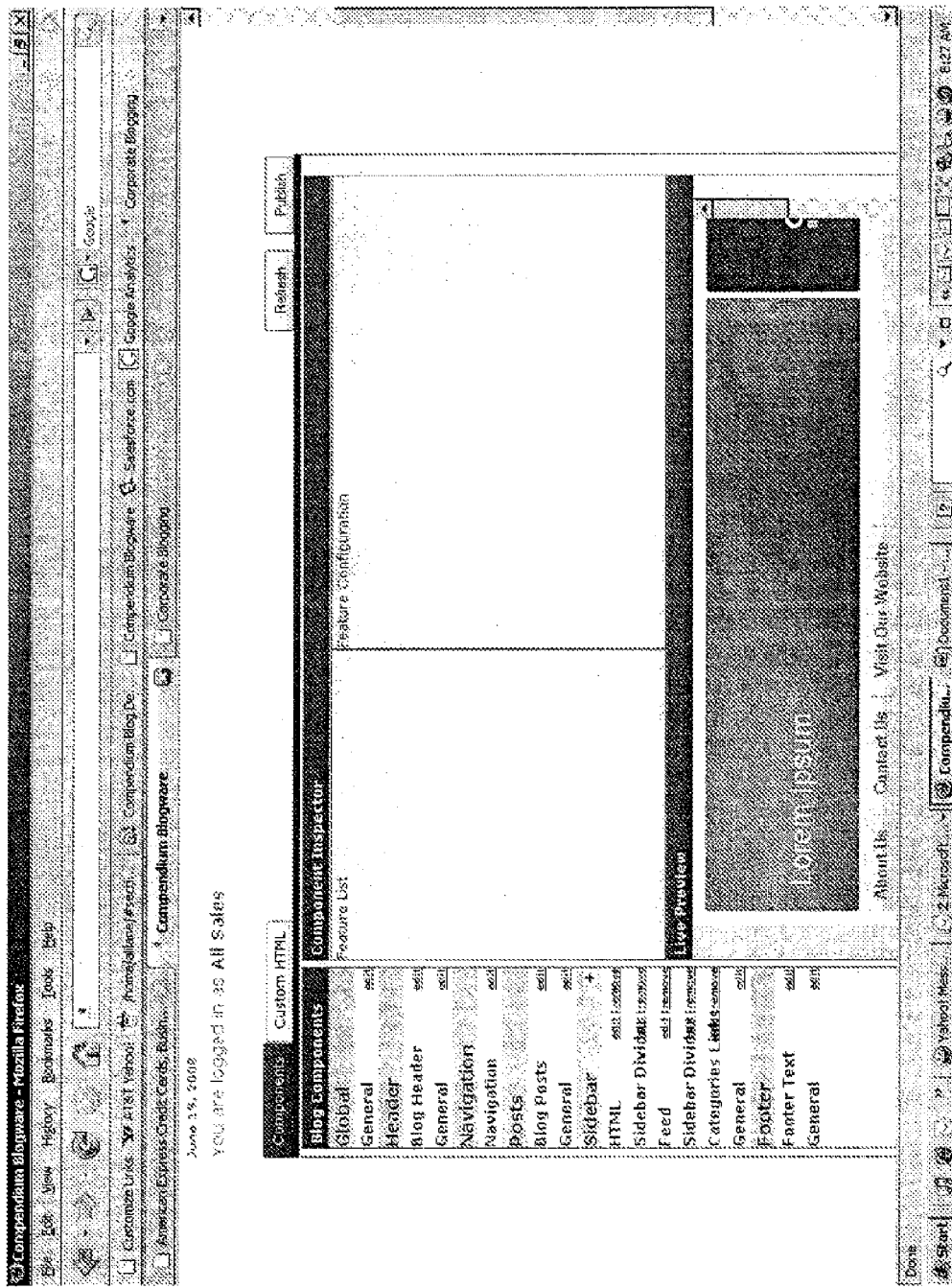
FIG. 6B shows another "Select a Template" web page of at least one embodiment of a system for preparing compended blogs according to the present disclosure.

An additional embodiment of "Select a Template" web page of a system for preparing compended blogs 50 of the present application is shown in FIG. 6B. As shown in FIG. 6B, Select a Template web page allows a user to, for example, paste in HyperText Markup Language (HTML) created in another program/word processor for increased flexibility, and allows a user to "preview" template capabilities prior to formally "publishing" or finalizing a particular blog template. Furthermore, an exemplary Select a Template web page may allow a user to include any number of potential sidebar elements, including text elements, HTML elements, etc., for increased blog template preparation flexibility.

Figure 7:
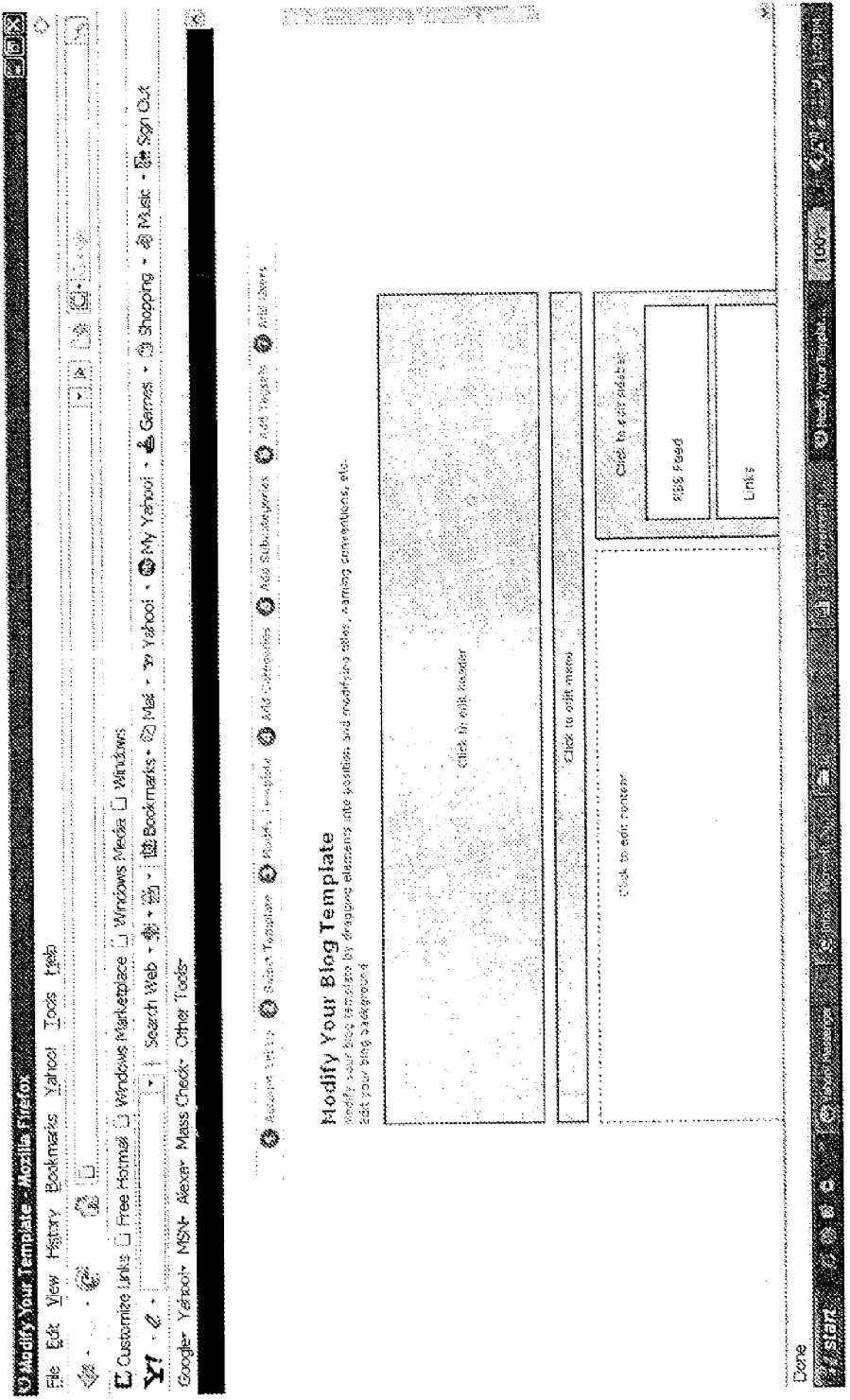
FIG. 7 shows a "Modify Your Blog Template" web page of at least one embodiment of a system for preparing compended blogs according to the present disclosure.

An example of a "Modify Your Blog Template" web page of a system for preparing compended blogs 50 of the present application is shown in FIG. 7. As shown in FIG. 7, Modify Your Blog Template web page allows a user to edit specific layout features of a blog template, including but not limited to, a header, menu, content, and sidebar as provided in FIG. 7. A user may configure/modify the template by double-clicking each content area and selecting corresponding elements, such as colors and fonts.

Figure 8:
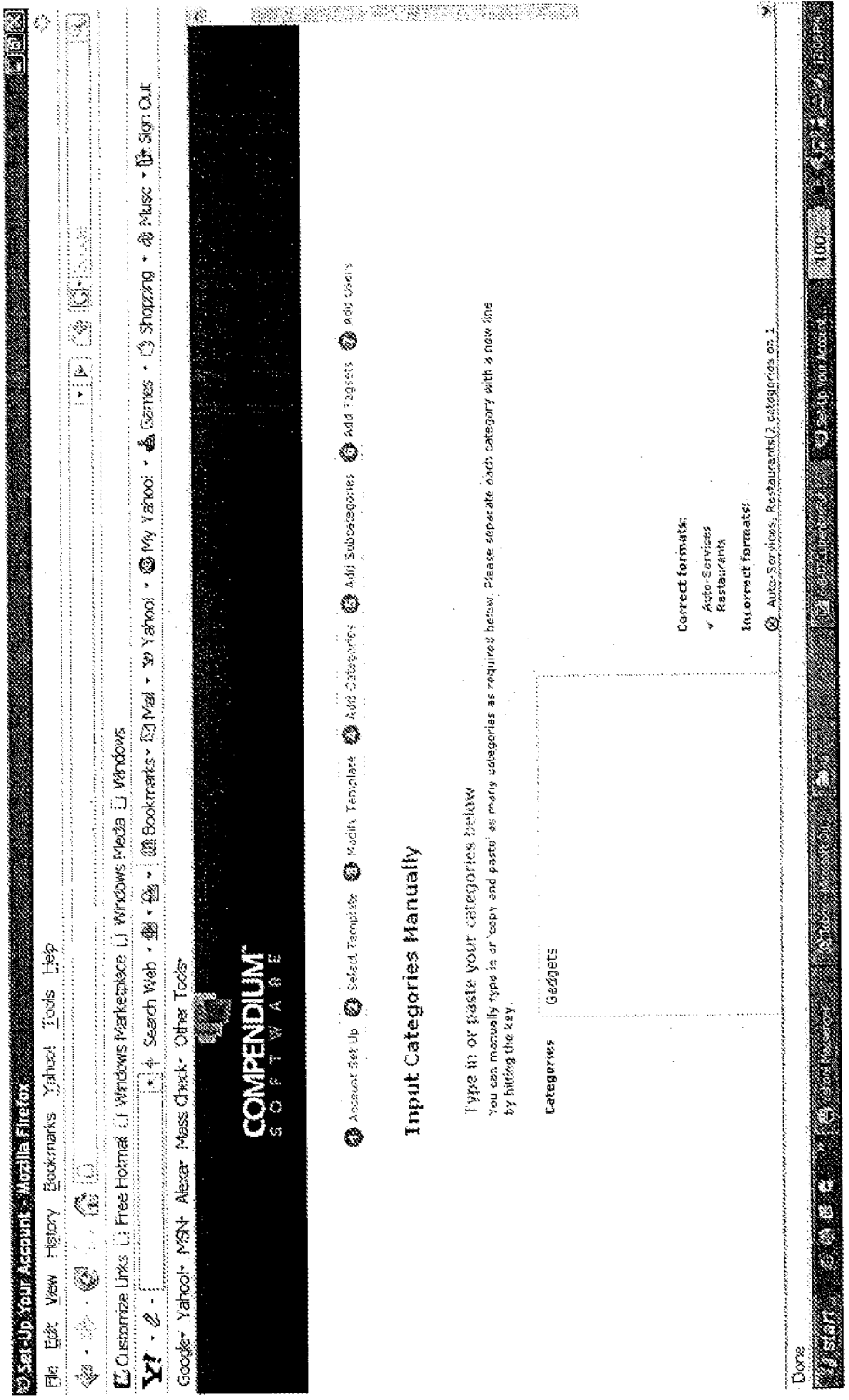
FIG. 8 shows an "Input Categories Manually" web page of at least one embodiment of a system for preparing compended blogs according to the present disclosure.

An example of an "Input Categories Manually" web page of a system for preparing compended blogs 50 of the present application is shown in FIG. 8. As shown in FIG. 8, Input Categories Manually web page allows a user to enter a category or multiple categories associated with an organization's industry, a particular product, or an user's preference, for example. These categories serve as the starting point for finding the keyword phrases that people may actually search online in order to find information and/or products related to that industry, product, etc. In the example shown in FIG. 8, "Gadgets" is entered as the category.

Figure 9:
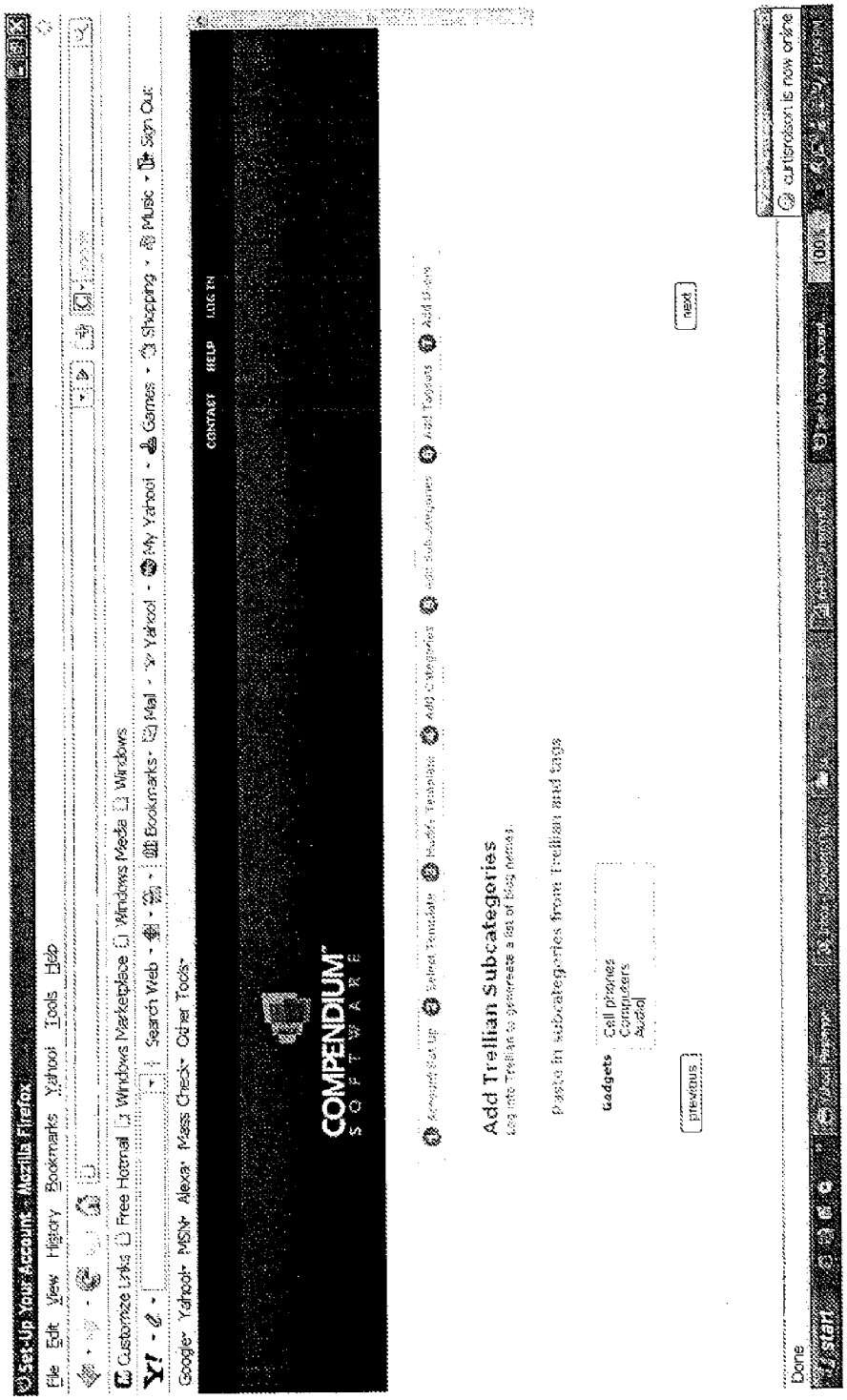
FIG. 9 shows an "Add Trellian Subcategories" web page of at least one embodiment of a system for preparing compended blogs according to the present disclosure.

An example of an "Add Trellian Subcategories" web page of a system for preparing compended blogs 50 of the present application is shown in FIG. 9. As shown in FIG. 9, Add Trellian Subcategories web page allows a user to input a list of keyword phrases that the organization and/or user would like to try to "win on" with respect to search. The term "win on" is intended to refer to receiving the highest or a relatively higher ranking than one or more others in one or more given searches, other things equal. A system for preparing compended blogs 50 may also assist the organization and/or user with identifying appropriate phrases using resources such as current/past paid search reports and traffic prediction tools such as Trellian. These keyword phrases will become the titles for one or more compended blogs. In the example shown in FIG. 9, "Cell phones," "Computers," and "Audio" are entered as the Trellian subcategories.

Figure 10:
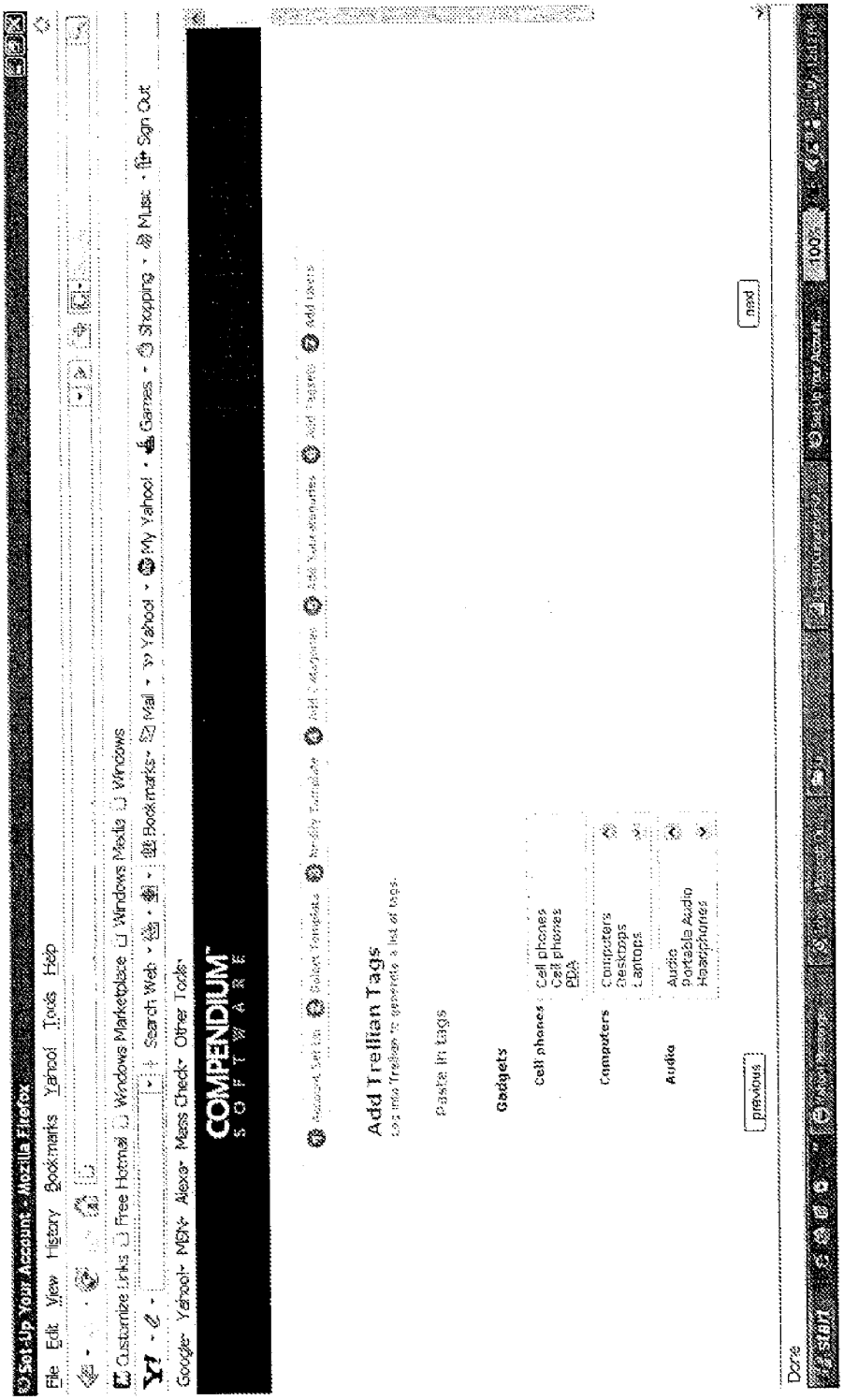
FIG. 10 shows an "Add Trellian Tags" web page of at least one embodiment of a system for preparing compended blogs according to the present disclosure.

An example of an "Add Trellian Tags" web page of a system for preparing compended blogs 50 of the present application is shown in FIG. 10. As shown in FIG. 10, Add Trellian Tags web page allows a user to enter tags to assist with back-end blog compending. In the example shown in FIG. 10, the tags "Cell phones," "PDA," and "Telephone" are entered with respect to the subcategory "Cell phones," the tags "Computers," "Desktops," and "Laptops" are entered with respect to the subcategory "Computers," and the tags "Audio," "Portable Audio," and "Headphones" are entered with respect to the subcategory "Audio."

Figure 11:
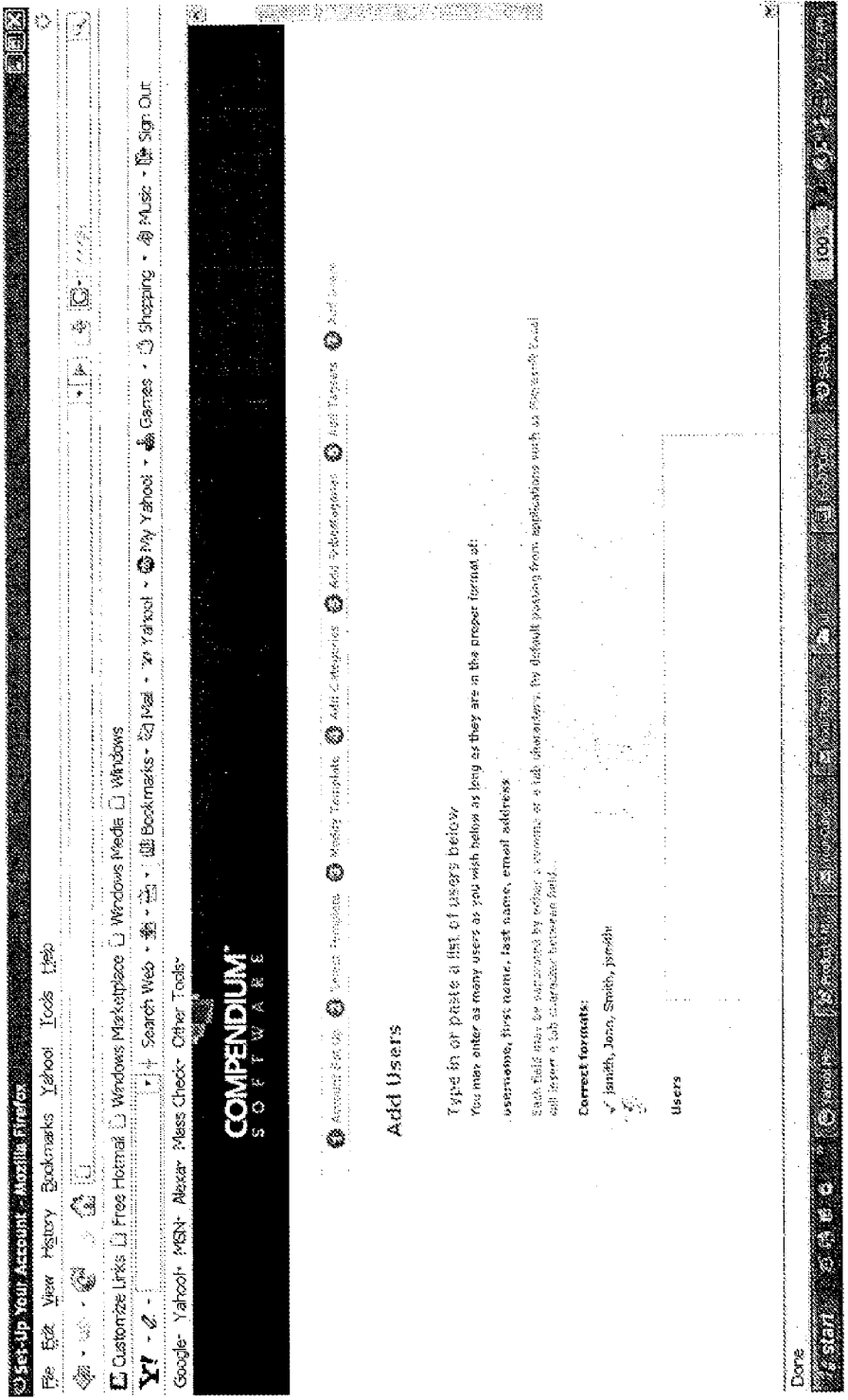
FIG. 11 shows an "Add Users" web page of at least one embodiment of a system for preparing compended blogs according to the present disclosure.

An example of an "Add Users" web page of a system for preparing compended blogs 50 of the present application is shown in FIG. 11. As shown in FIG. 11, Add Users web page allows a user to enter names and/or e-mail addresses of additional users pertaining to a compended blog. Such users may then each be given a user account and corresponding rights in order to manage a personal blog and post content to it.

Figure 12:
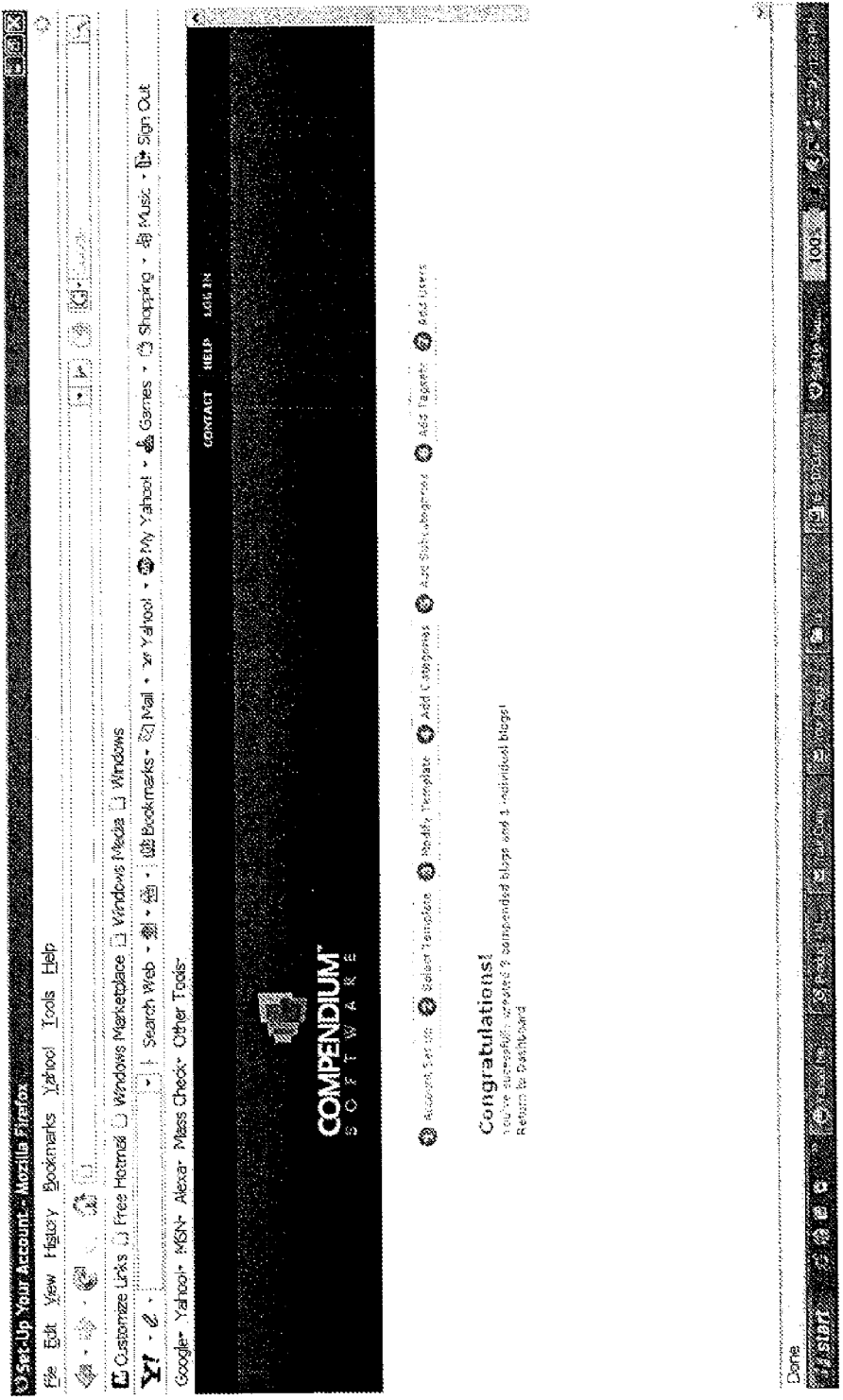
FIG. 12 shows a "Congratulations!" web page of at least one embodiment of a system for preparing compended blogs according to the present disclosure.

An example of a "Congratulations!" web page of a system for preparing compended blogs 50 of the present application is shown in FIG. 12. As shown in FIG. 12, Congratulations! web page signifies to a user that the initial setup process was successfully completed.

Figure 13:
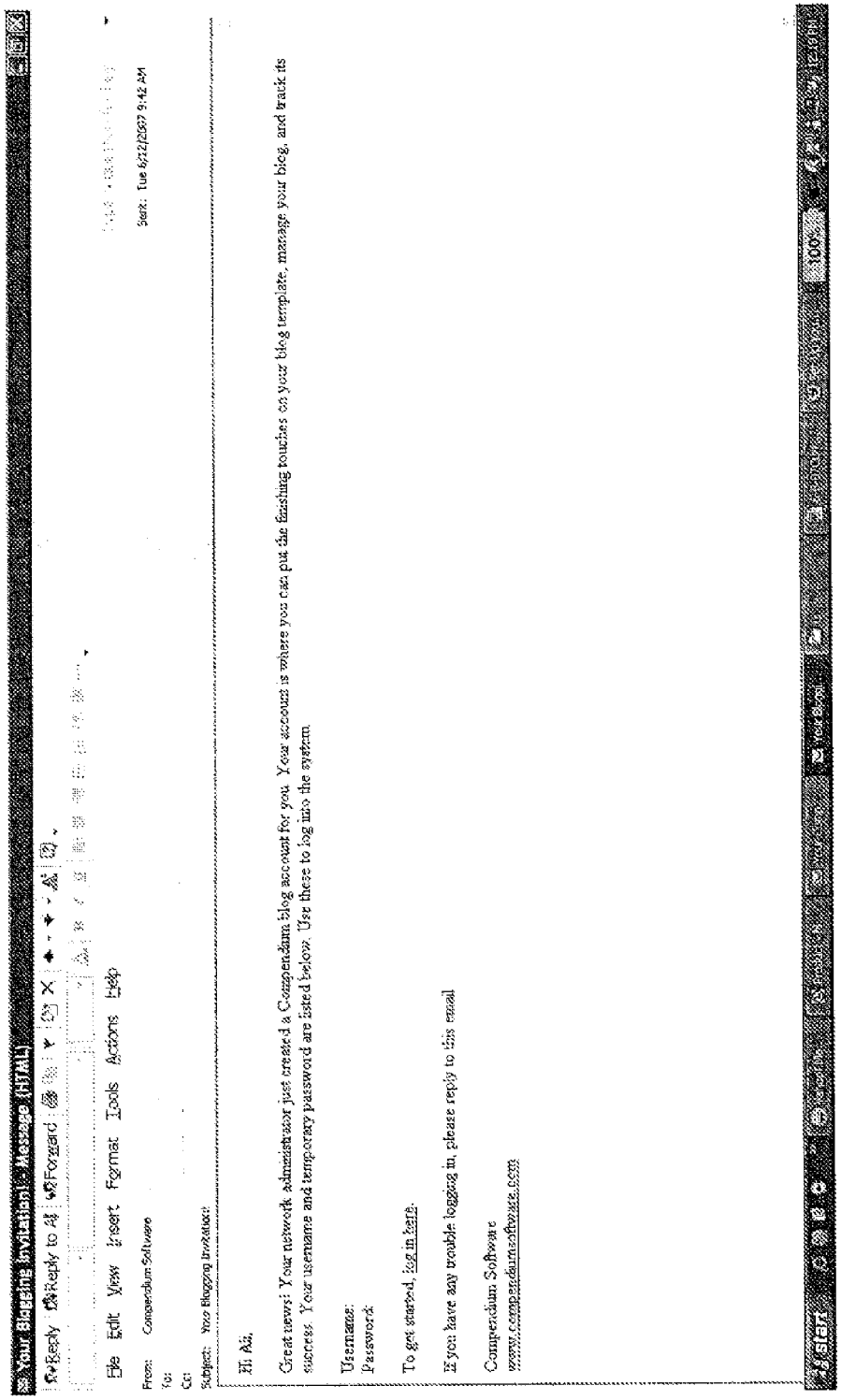
FIG. 13 shows a personal login information e-mail of at least one embodiment of a system for preparing compended blogs according to the present disclosure.

An example of a personal login information e-mail of a system for preparing compended blogs 50 of the present application is shown in FIG. 13. As shown in FIG. 13, once a user has successfully completed the initial setup process, an e-mail is generated by a system for preparing compended blogs 50 and forwards the e-mail to the user/registrant. The e-mail notifies the registrant/user that a network administrator of a system for preparing compended blogs 50 has created a blog account for the registrant/user, and provides the registrant/user with the registered username and password provided by a system for preparing compended blogs 50. The personal login information e-mail may also provide a hyperlink to a login web page (see FIG. 14 and related discussion below), and may also provide a hyperlink to the company hosting a system for preparing compended blogs 50.

Figure 14:
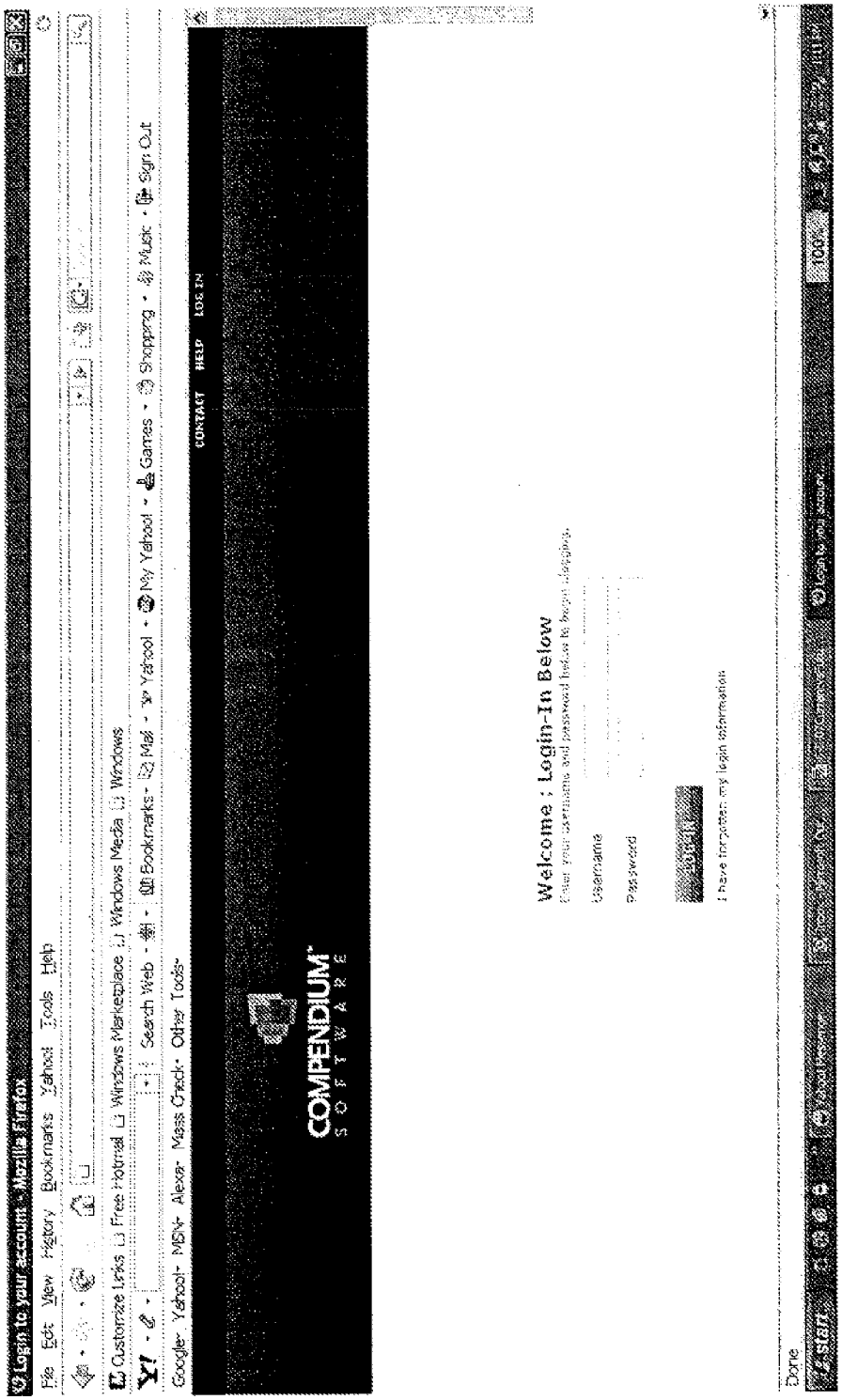
FIG. 14 shows a "Welcome: Login Below" web page of at least one embodiment of a system for preparing compended blogs according to the present disclosure.

An example of a "Welcome: Login Below" web page of a system for preparing compended blogs 50 of the present application is shown in FIG. 14. As shown in FIG. 14, Welcome: Login Below web page allows a registered user log in with the registered user's username and password. Once entered, a registered would select the "LOG-IN" button to access a system for preparing compended blogs 50.

Figure 15:
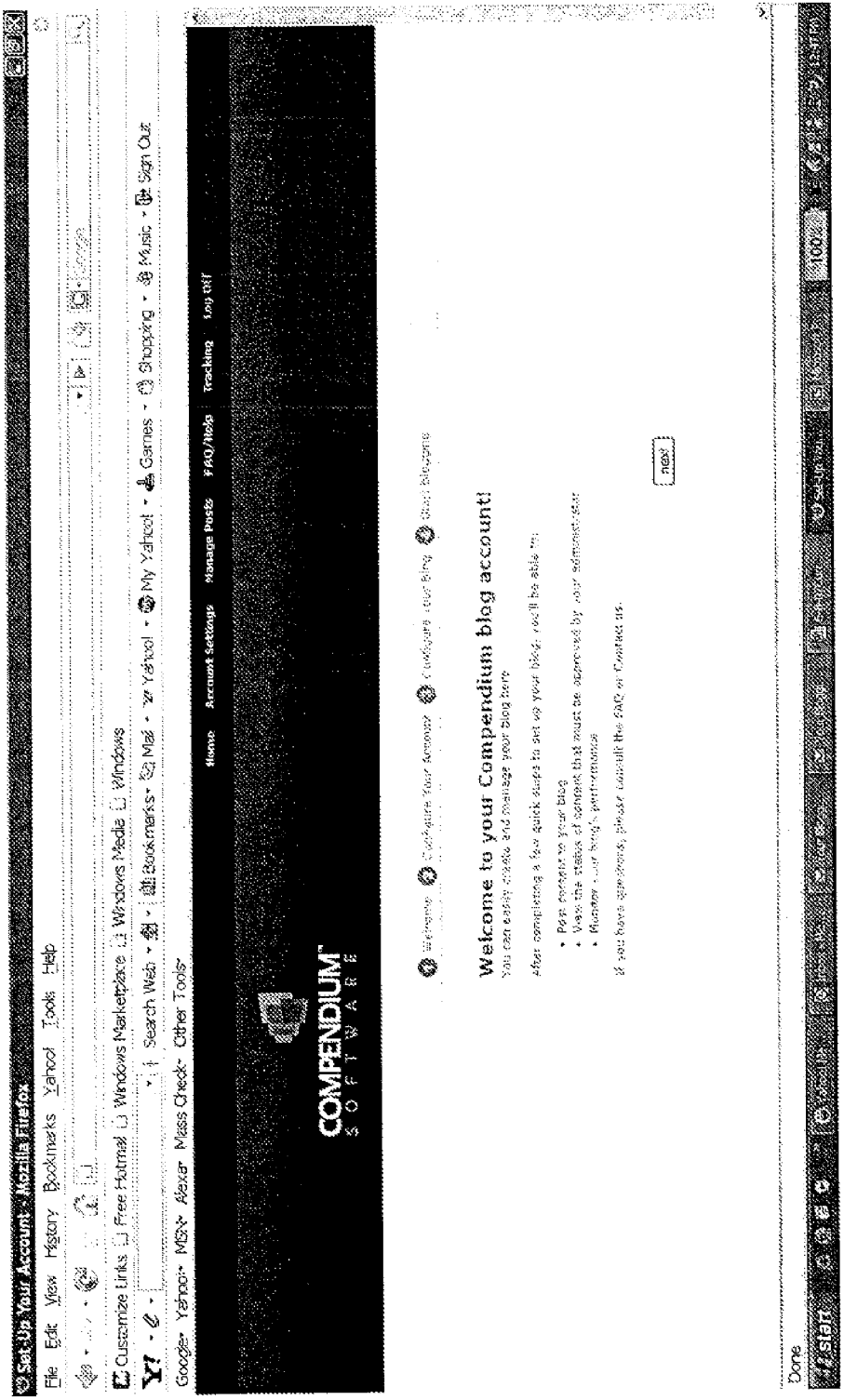
FIG. 15 shows a "Welcome to your Compendium blog account!" web page of at least one embodiment of a system for preparing compended blogs according to the present disclosure.

An example of a "Welcome to your Compendium blog account!" web page of a system for preparing compended blogs 50 of the present application is shown in FIG. 15. As shown in FIG. 15, Welcome to your Compendium blog account! web page greets a registered user with a welcome message and may identify a number of activities a registered user may engage in once a compended blog is formally set-up by the registered user.

Figure 16:
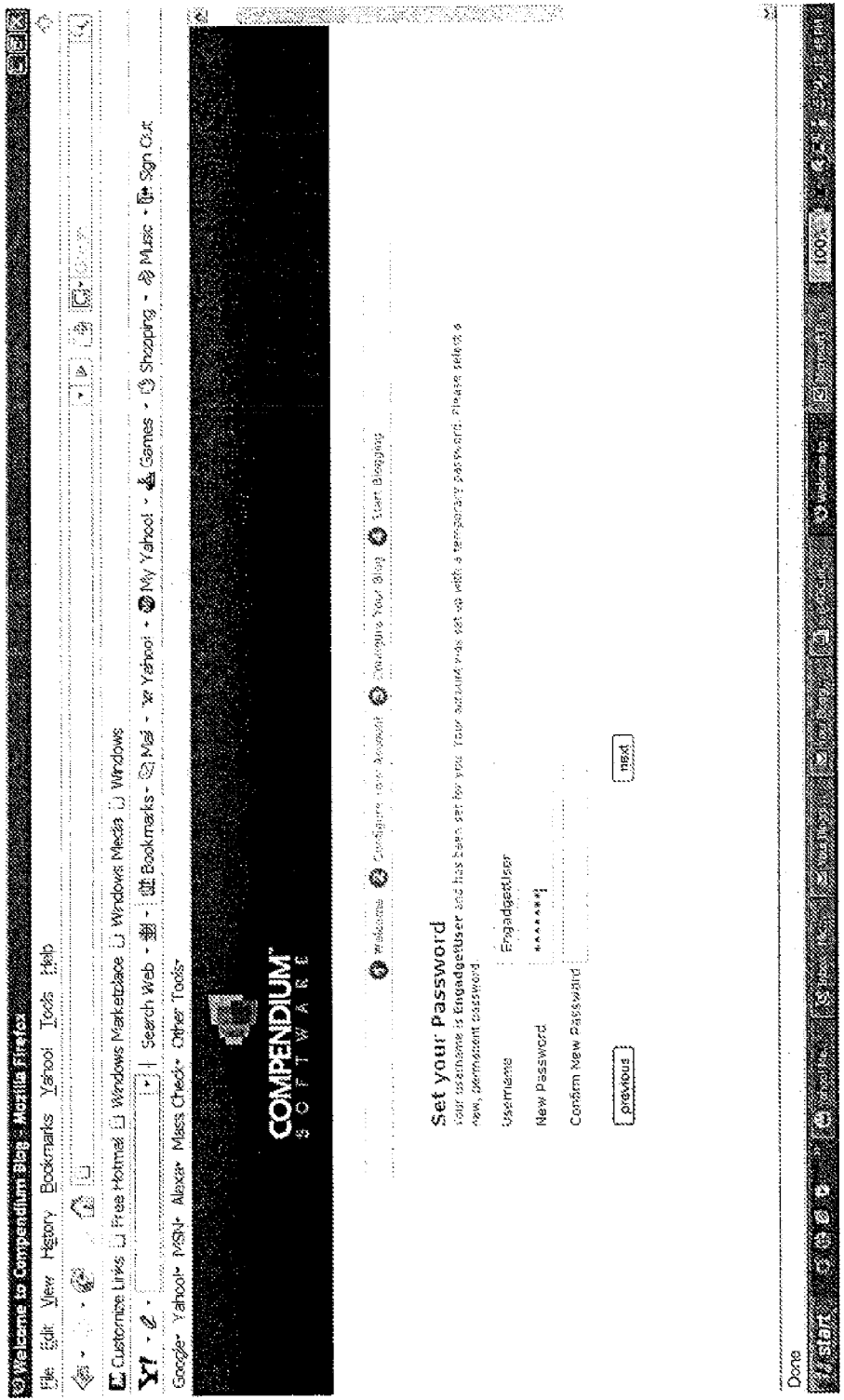
FIG. 16 shows a "Set your Password" web page of at least one embodiment of a system for preparing compended blogs according to the present disclosure.

An example of a "Set your Password" web page of a system for preparing compended blogs 50 of the present application is shown in FIG. 16. As shown in FIG. 16, Set your Password web page allows a registered user to enter a new password by entering the registered user's username, the password provided to the user by a system for preparing compended blogs 50, and by entering a new password.

Figure 17:
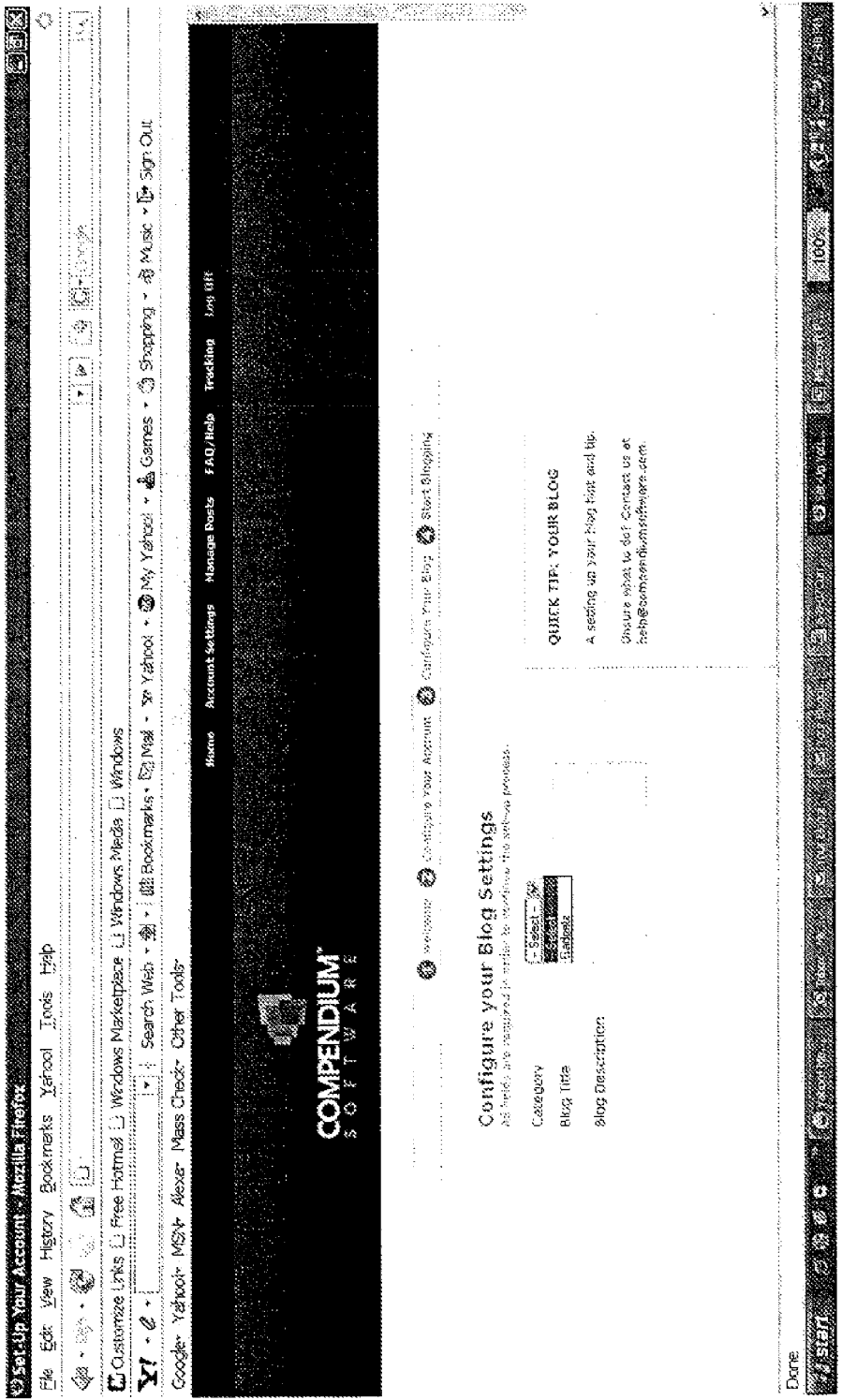
FIG. 17 shows a "Configure your Blog Settings" web page of at least one embodiment of a system for preparing compended blogs according to the present disclosure.

An example of a "Configure your Blog Settings" web page of a system for preparing compended blogs 50 of the present application is shown in FIG. 17. As shown in FIG. 17, Configure your Blog Settings web page allows a registered user to select a category previously provided by the administrator. The category serves as a guide to the user regarding what the user should be writing about (i.e., preparing a blog post concerning particular topic(s)). In the example shown in FIG. 17, only one category ("Gadgets") exists, so that category would be chosen by the user. The user may also enter in a blog title and a blog description within the respective fields shown in FIG. 17.

Figure 18A:
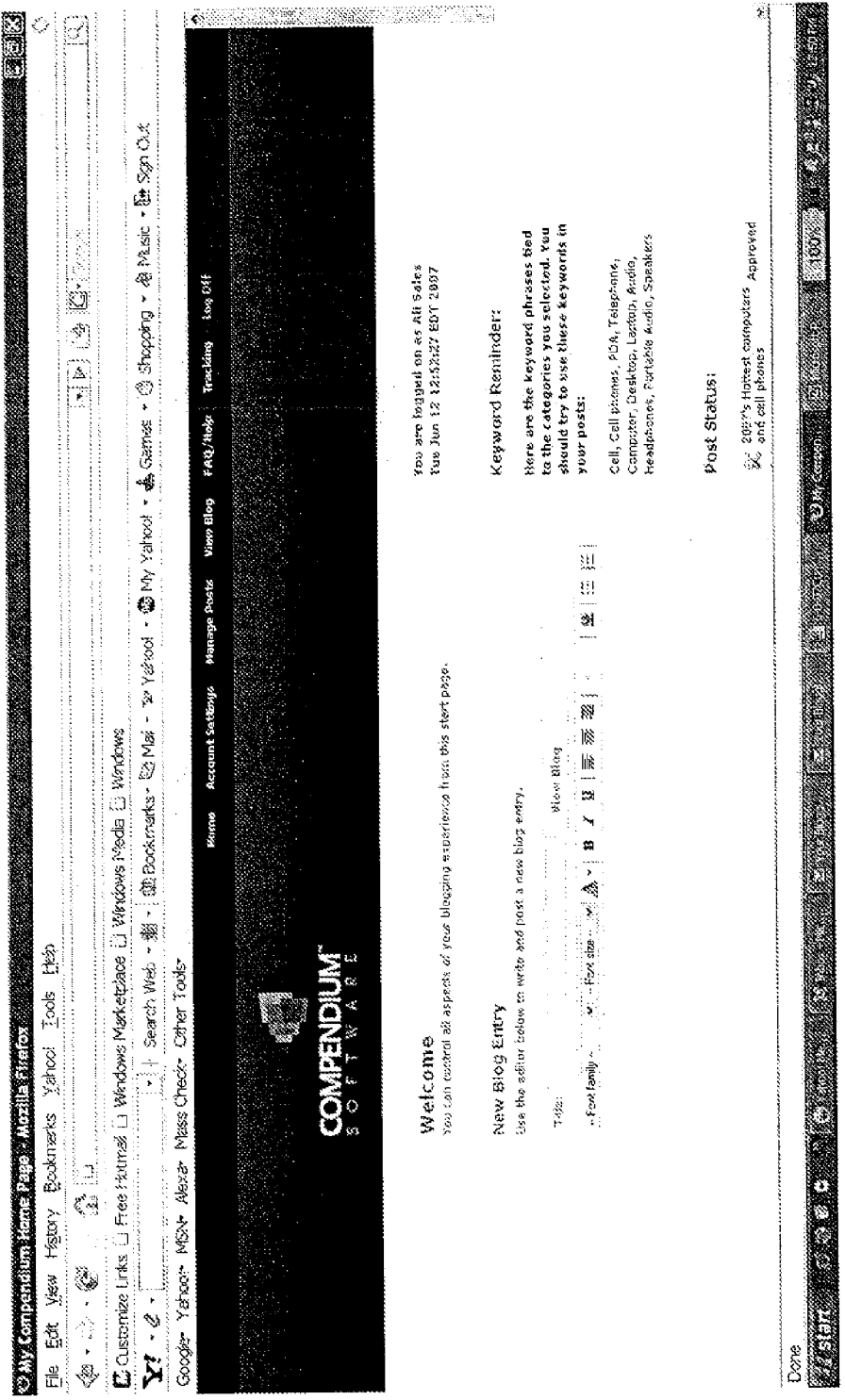
FIG. 18A shows a "New Blog Entry" web page of at least one embodiment of a system for preparing compended blogs according to the present disclosure.

An example of a "New Blog Entry" web page of a system for preparing compended blogs 50 of the present application is shown in FIG. 18A. As shown in FIG. 18A, New Blog Entry web page allows a registered user to prepare a new blog article. The user may include a title for the blog article and content for the particular blog article. As shown in FIG. 18A, a sidebar is provided with one or more keyword reminders for the user to consider while preparing the blog article. In this example, all tags provided as shown in FIG. 10 appear in the sidebar shown in FIG. 18A.

Figure 18B:
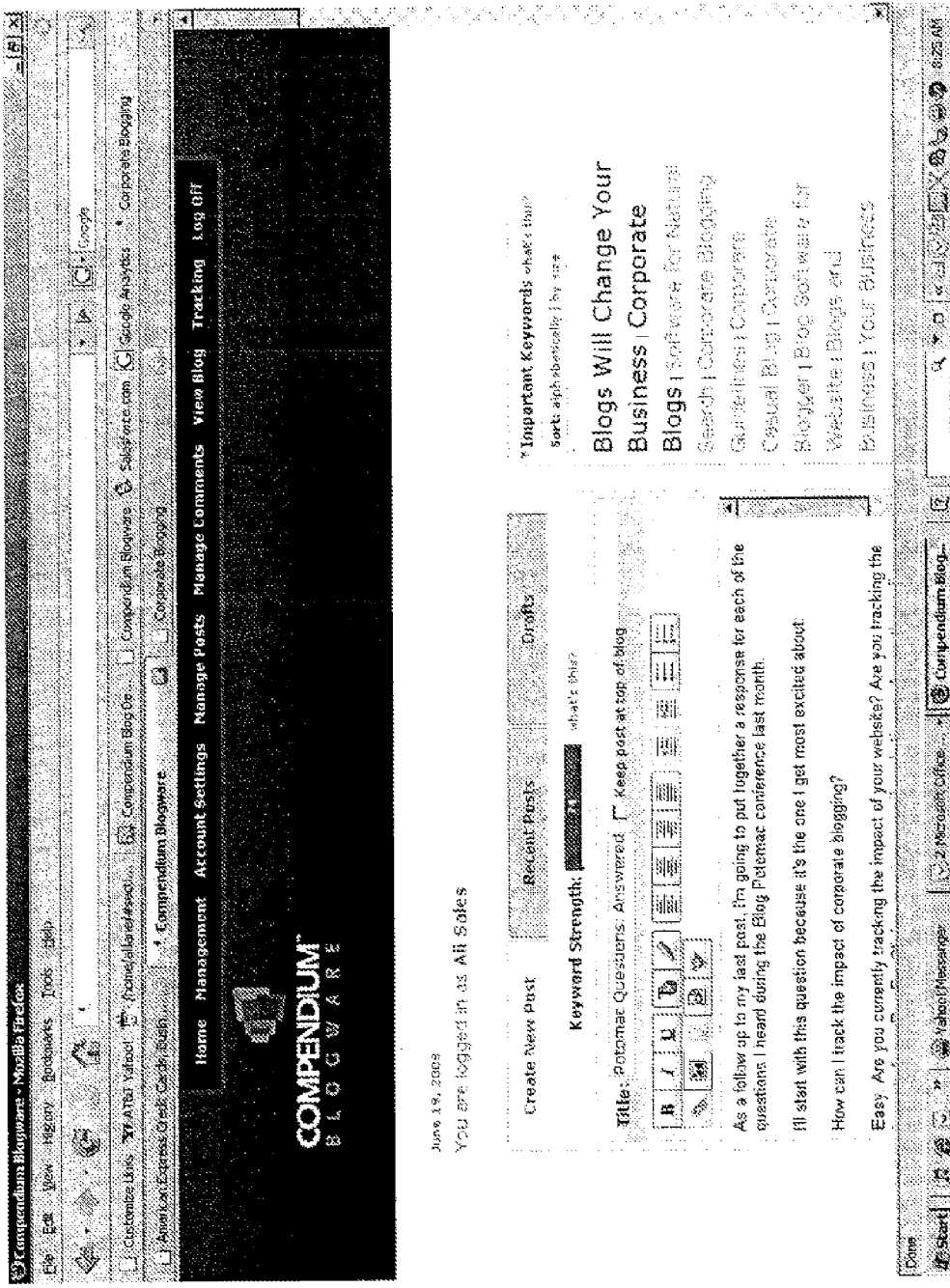
FIG. 18B shows another "New Blog Entry" web page of at least one embodiment of a system for preparing compended blogs according to the present disclosure.

Another example of a "New Blog Entry" web page of a system for preparing compended blogs 50 of the present application is shown in FIG. 18B. As shown in FIG. 18B, New Blog Entry web page allows a registered user to prepare a new blog article. In at least this embodiment, New Blog Entry web page comprises a strength indicator in the form of a tag cloud comprising one or more words/phrases. An exemplary tag cloud, as shown in FIG. 18B, contains words/phrases of varying font sizes, the font sizes corresponding to the frequency of compending the particular words/phrases. Such a tag cloud, also referred to as a "keyword strength tool" or a "keyword suggestion tool," may provide a user with a visual indication of whether or not he or she is writing about the keywords that an organizational compended blog, for example, wishes to target. If a user uses one or more of these keywords while preparing a blog post, the blog post may be more apt to be included within a particular compended blog affiliated with said terms.

In the embodiment shown in FIG. 18B, New Blog Entry web page further comprises a strength indicator in the form of a strength bar. The strength bar, as shown in this exemplary embodiment, may change from red to green and, for example, may automatically calculate a score between 1 and 100 based upon a scoring algorithm. The color change from red to green, for example, may provide a signal to a user that the user's blog entry is a better match based on the keywords affiliated with a particular compended blog. Similarly, a higher score (closer to 100, for example), may provide the same type of signal to the user.

A scoring algorithm, as referenced above with respect to FIG. 18B and generally herein, may comprise one or more core factors associated with a particular scoring calculation. One core factor, for example, may be that the number of keyword phrases that exactly match the keywords that appear within a particular tag cloud. Another core factor may be based upon the number of distinct keyword phrases used, i.e. a user may get "credit" for writing about more than one keyword. Additionally, a core factor may be based upon keyword concentration, namely the ratio of keywords used compared to the overall number of words within a particular blog post.

Figure 18C:
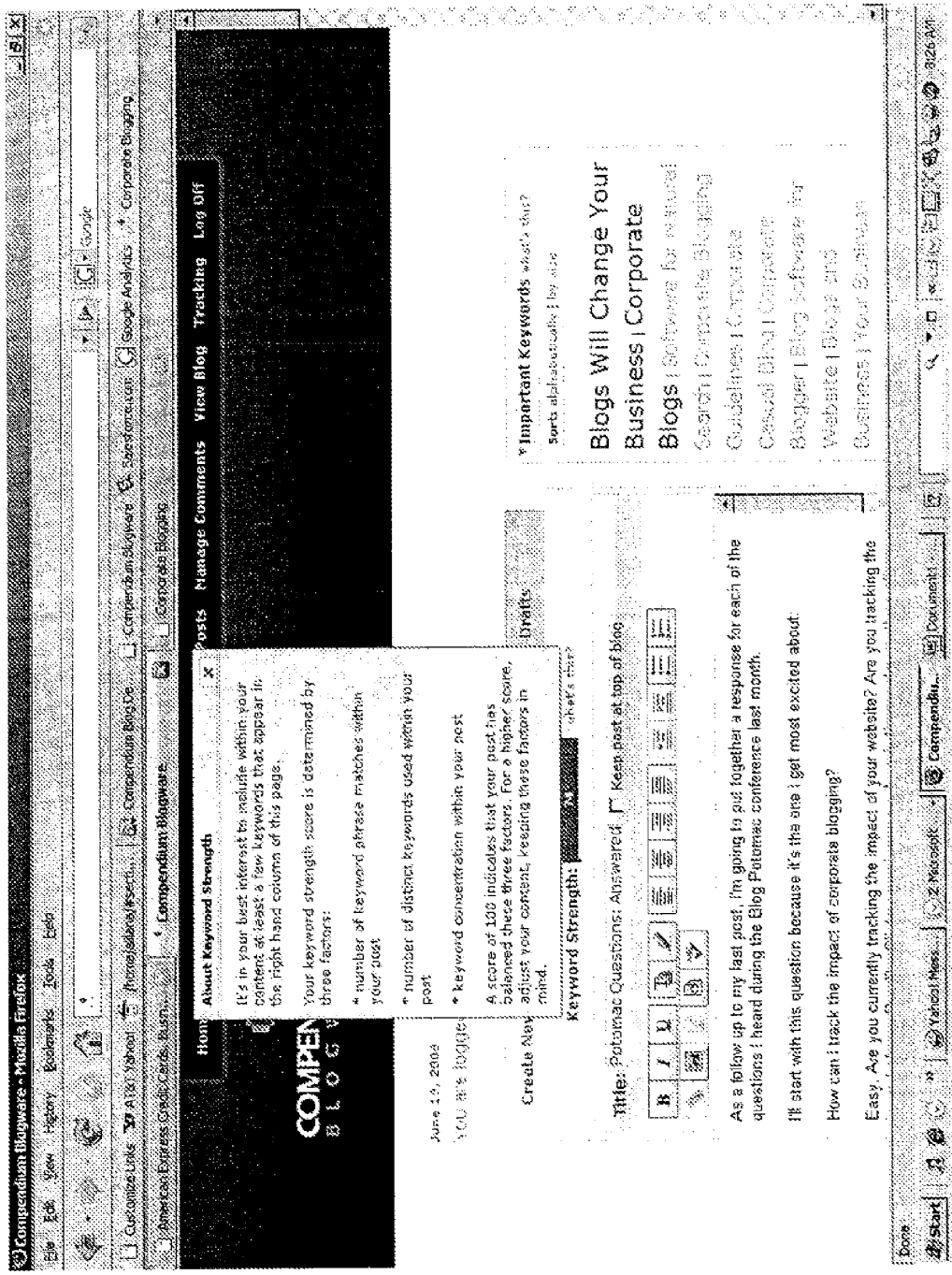
FIG. 18C shows an additional "New Blog Entry" web page of at least one embodiment of a system for preparing compended blogs according to the present disclosure.

Another example of a "New Blog Entry" web page of a system for preparing compended blogs 50 of the present application is shown in FIG. 18C. As shown in FIG. 18C, New Blog Entry web page allows a registered user to prepare a new blog article. In this particular embodiment, for example, if a user selects "what's this" regarding "Keyword Strength," a window (or other indicator) may appear to provide information to the user regarding the purpose behind the keyword strength indicator.

Figure 19:
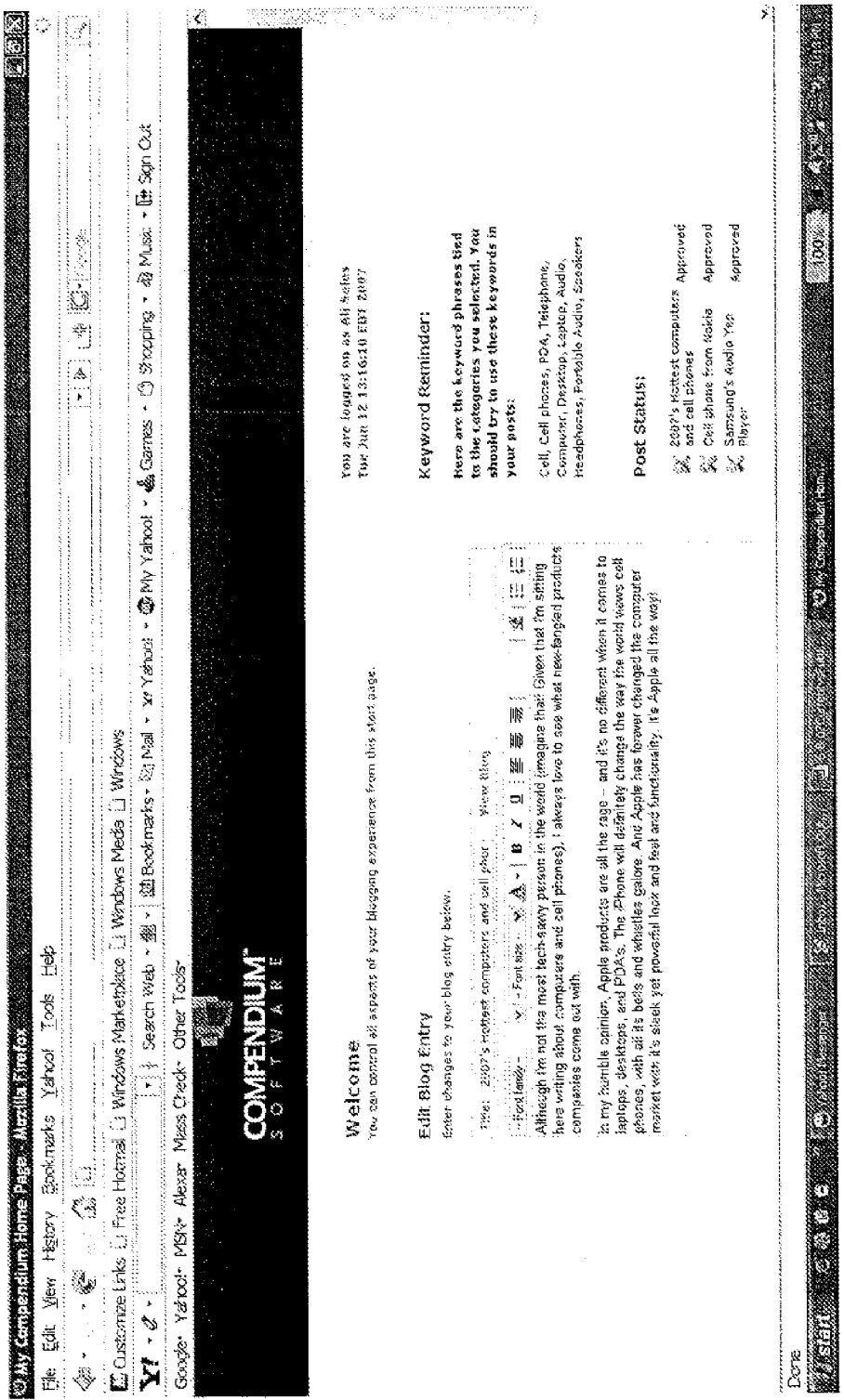
FIG. 19 shows an "Edit Blog Entry" web page of at least one embodiment of a system for preparing compended blogs according to the present disclosure.

An example of a "Edit Blog Entry" web page of a system for preparing compended blogs 50 of the present application is shown in FIG. 19. As shown in FIG. 19, Edit Blog Entry web page allows a registered to prepare edits to a blog article prepared pursuant to a New Blog Entry web page shown in FIG. 18.

By way of example, three example blog posts are shown below, and by way of example, will be referenced by a number of the following figures.

Example Blog Post #1:
Title: Samsung's Audio Yepp Player
Various flavors of Samsung's T9 audio music player have been floating around for a good while now, but the Yepp T9+ version packs a little something extra for those not content with just listening to jams. Design wise, not much has changed, as users will still notice a 1.8-inch 220×176 resolution display and capacities up to 8 GB in size, but this rendition reportedly includes multi-player gaming via built-in Bluetooth. It looks like a good five or so titles will be included, and while we've no doubt that Korean users will find one without issue, getting this audio player over here in North America probably won't be as easy as it should be. ©Engadget 2007.

Example Blog Post #2:
Title: Cell phone from Nokia
Can't afford the $750 or so required to pick up a Nokia N95 cell phone right now? Fret not, as the Chinese knockoff factories have been workin' overtime in order to crank out a somewhat similar alternative to fit the bill. The E-PDA V16 comes in a bit larger than the authentic iteration and includes a three-inch QVGA touchscreen, three-megapixel camera, Bluetooth, multimedia player, and a touch of tacky to top things off for this cell. Of course, any of your pals that are in the know won't be impressed by your futile attempts to fool 'em, but considering that this thing won't cost you nearly as much coin as the real deal, it might be worth the embarrassment (or not). Catch a few more snapshots of the impostor after the jump. ©Engadget 2007

Example Blog Post #3:
Title: 2007's Hottest computers and cell phones
Although I'm not the most tech-savvy person in the world (imagine that!Given that I'm sitting here writing about computers and cell phones), I always love to see what new-fangled products companies come out with.
In my humble opinion. Apple products are all the rage—and it's no different when it comes to laptops, desktops, and PDA's. The iPhone will definitely change the way the world views cell phones, with all its bells and whistles galore. And Apple has forever changed the computer market with its sleek yet powerful look and feel and functionality. It's Apple all the way!

Figure 20:
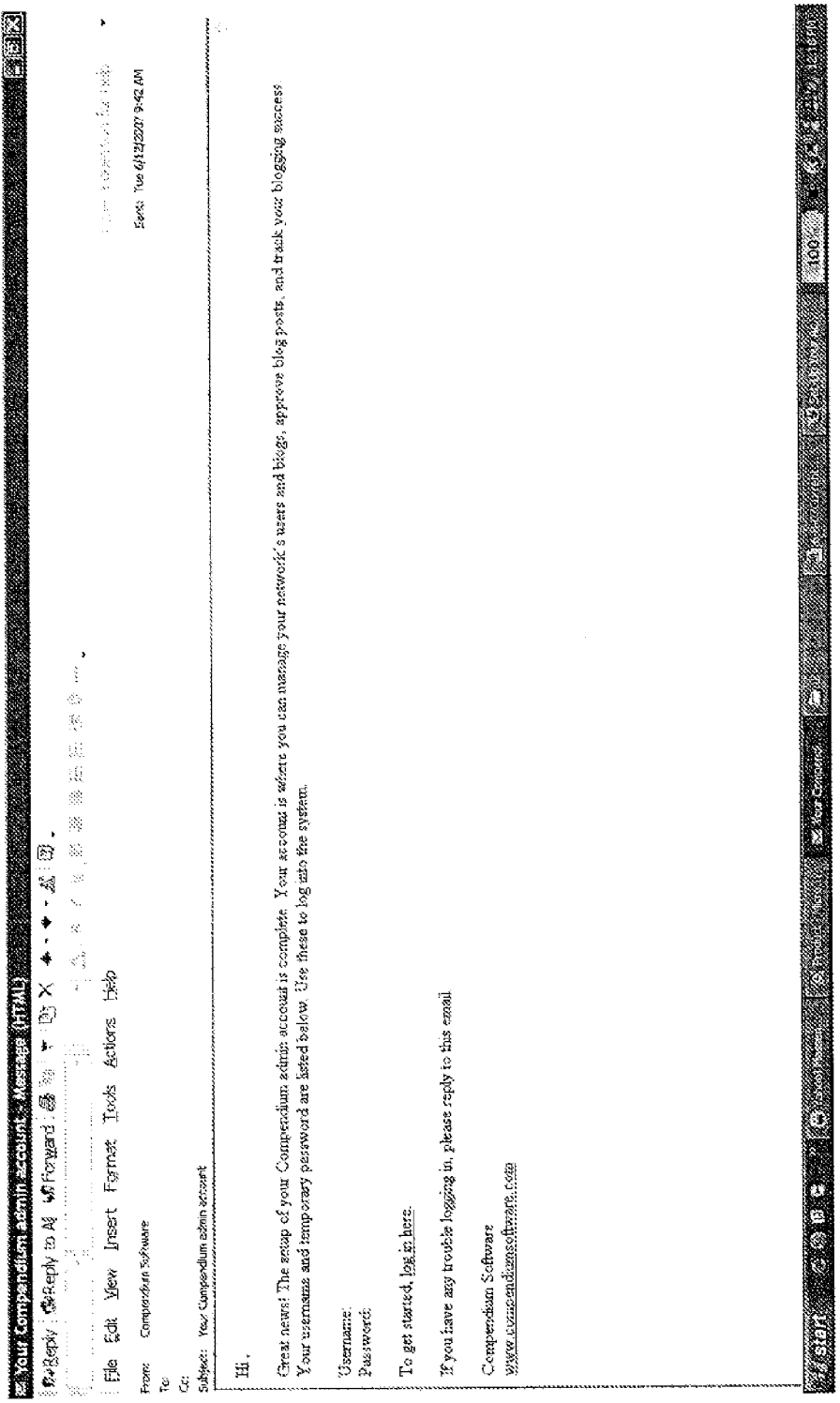
FIG. 20 shows a personal login information e-mail of at least one embodiment of a system for preparing compended blogs according to the present disclosure.

An example of an administrator personal login information e-mail of a system for preparing compended blogs 50 of the present application is shown in FIG. 20. As shown in FIG. 20, personal login information e-mail is generated by a system for preparing compended blogs 50 and forwarded the e-mail to the user/registrant. The e-mail notifies the registrant/user that blog posts have been prepared, and it provides a registrant/user (and in this example, an administrator) with the registered username and password provided by a system for preparing compended blogs 50. The personal login information e-mail may also provide a hyperlink to a login web page (see FIG. 21 and related discussion below), and may also provide a hyperlink to the company hosting a system for preparing compended blogs 50.

Figure 21:
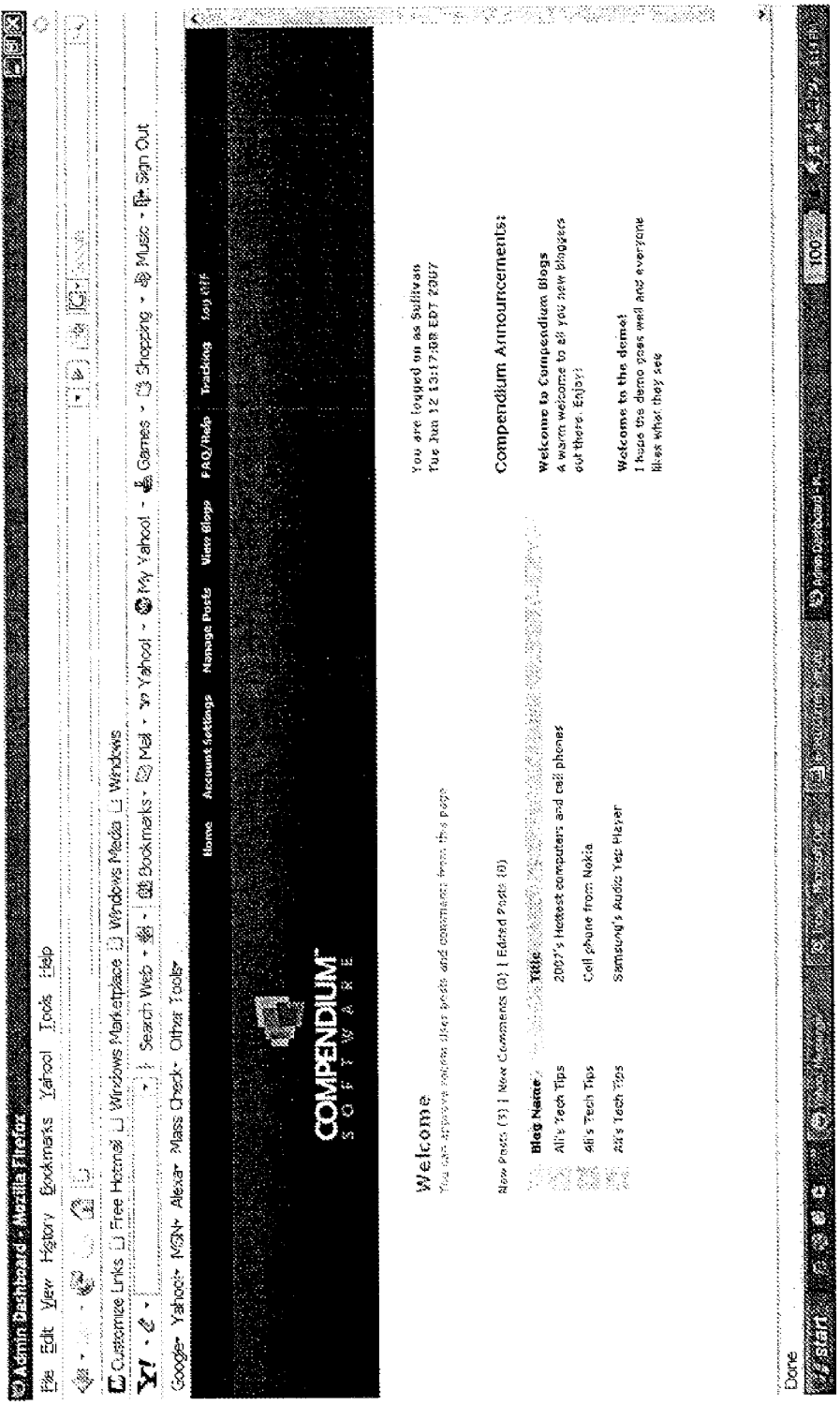
FIG. 21 shows an administrator "Welcome" web page of at least one embodiment of a system for preparing compended blogs according to the present disclosure.

An example of an administrator "Welcome" web page of a system for preparing compended blogs 50 of the present application is shown in FIG. 21. As shown in FIG. 21, administrator Welcome web page alerts the administrator of new posts to be approved, any comments prepared by other users to be approved, and any posts that have been edited.

Figure 22:
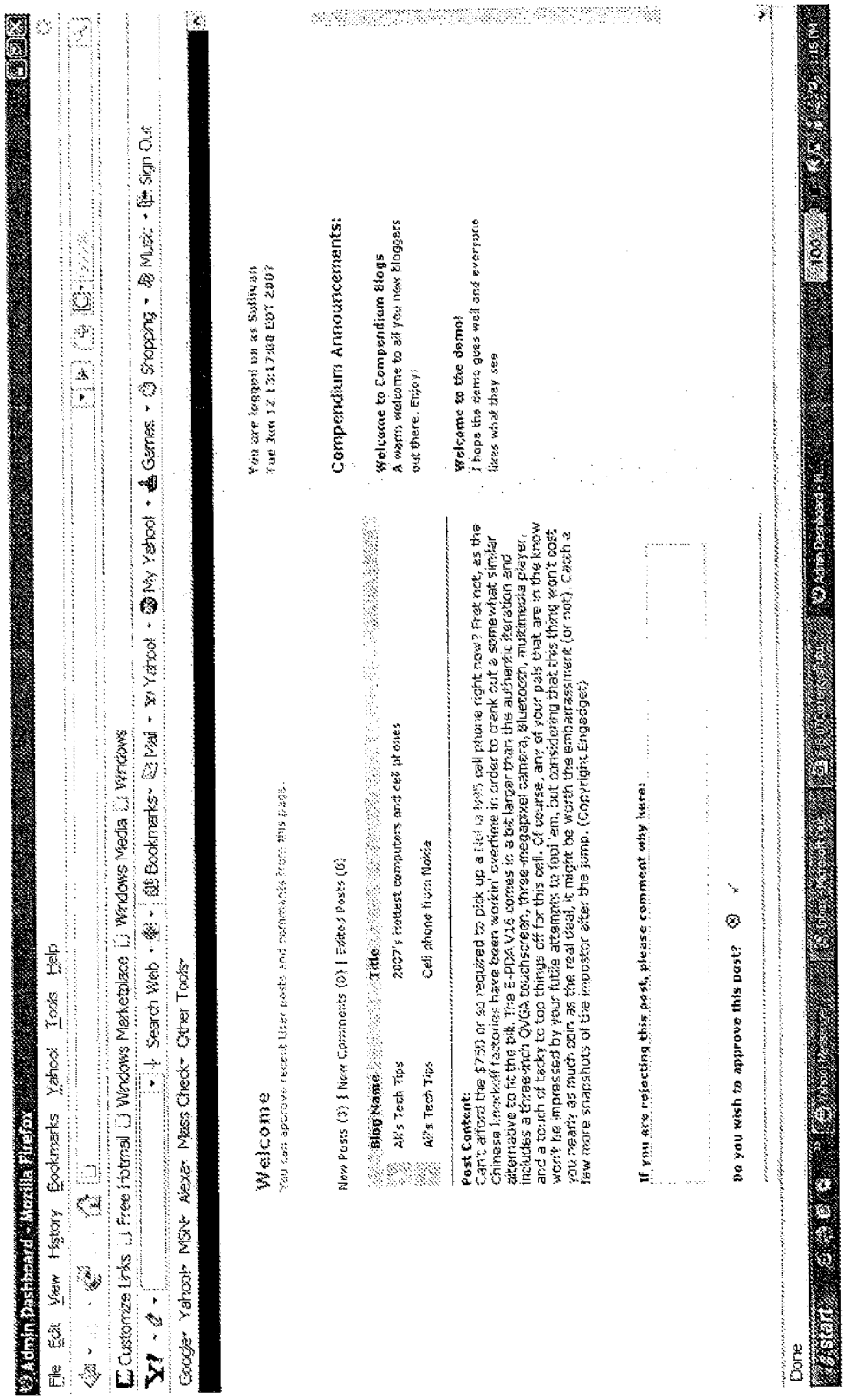
FIG. 22 shows a content-specific "Welcome" web page of at least one embodiment of a system for preparing compended blogs according to the present disclosure.

An example of a content-specific "Welcome" web page of a system for preparing compended blogs 50 of the present application is shown in FIG. 22. As shown in FIG. 22, content-specific Welcome web page appears once an administrator as selected a post for approval (as shown in the list within FIG. 21), allowing the administrator to view the content the post and either approve or reject the post. In the example shown in FIG. 22, an administrator may click on an arrow to expand an entry, and after it is expanded, the administrator may click on a green "check" to approve the post or a red "X" to reject the post. If the administrator wishes to reject the post, the administrator may also enter comments as to why the post is rejected.

Once an administrator approves a post, the compending process 300 takes place as shown in FIGS. 3 and 30. This compending process 300, which may occur nearly immediately after approval, causes the post to be distributed to one or more individual blogs and to any relevant compended blogs based on the content within each post.

Figure 23:
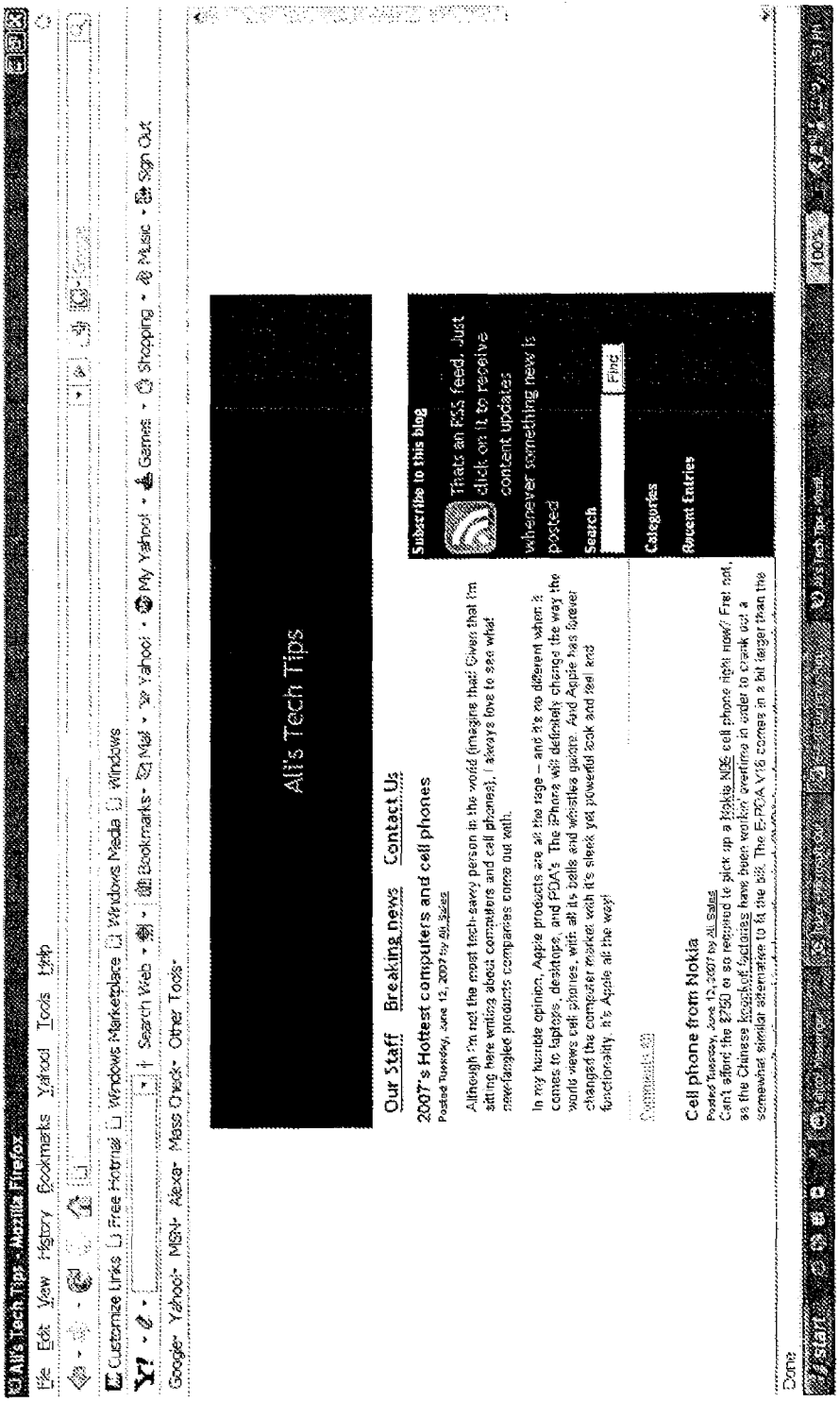
FIG. 23 shows an individual blog of at least one embodiment of a system for preparing compended blogs according to the present disclosure.

An example of a compended blog of a system for preparing compended blogs 50 of the present application is shown in FIG. 23. As shown in FIG. 23, the compended blog is entitled "Ali's Tech Tips," and all three example posts referenced above (only two shown via the screenshot, however) are present on this compended blog as each post contained one or more tags relevant to the category and the subcategory or subcategories applicable to the "Ali's Tech Tips" compended blog.

Figure 24:
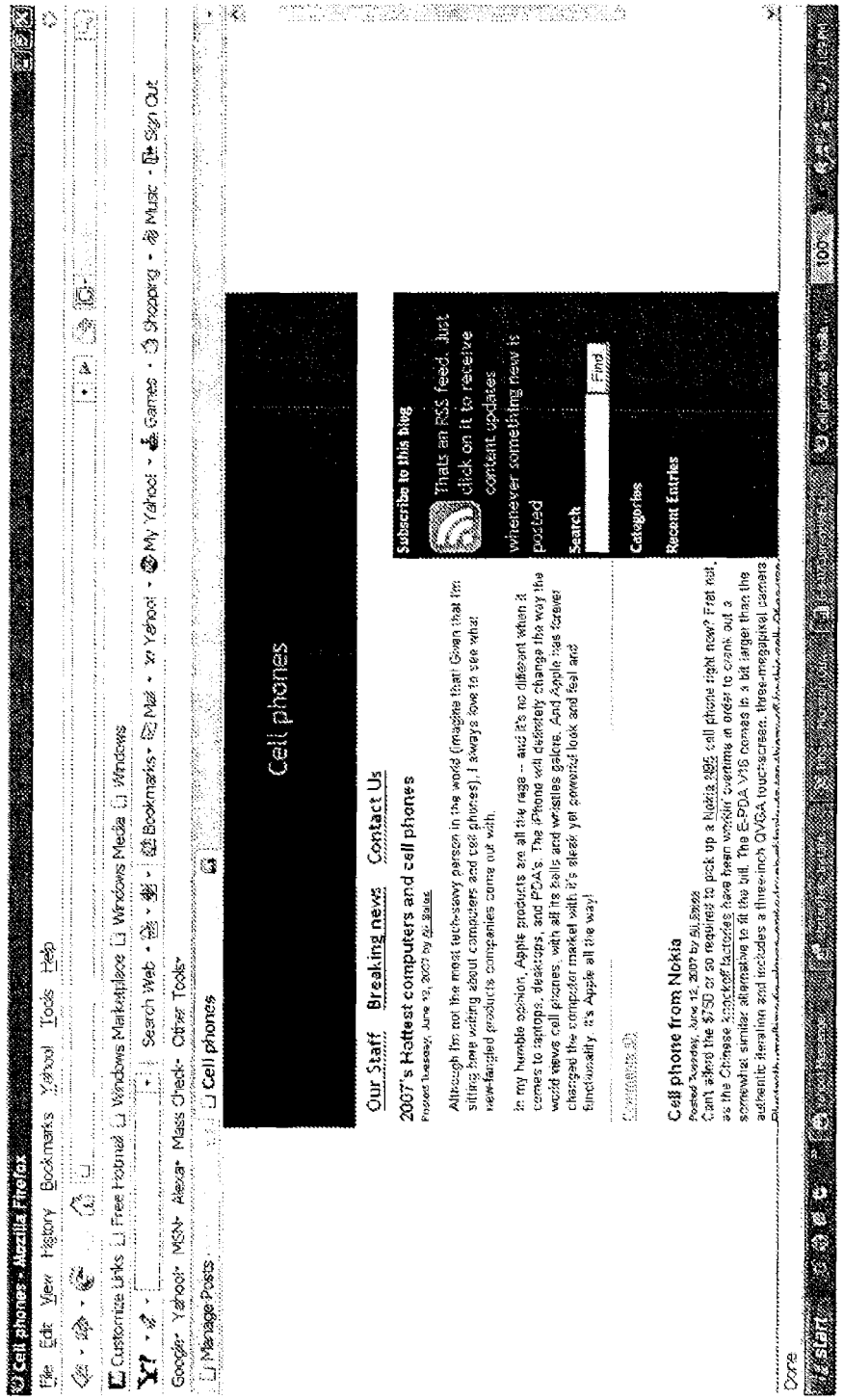
FIG. 24 shows a compended blog of at least one embodiment of a system for preparing compended blogs according to the present disclosure.

An additional example of a compended blog of a system for preparing compended blogs 50 of the present application is shown in FIG. 24. As shown in FIG. 24, the compended blog is entitled "Cell phones," and only two of the three example posts referenced above are present on this compended blog. The two posts present within the "Cell phones" compended blog each contained one or more tags relevant to the category and the subcategory or subcategories applicable to the "Cell phones" compended blog, while the third example post did not.

Figure 25:
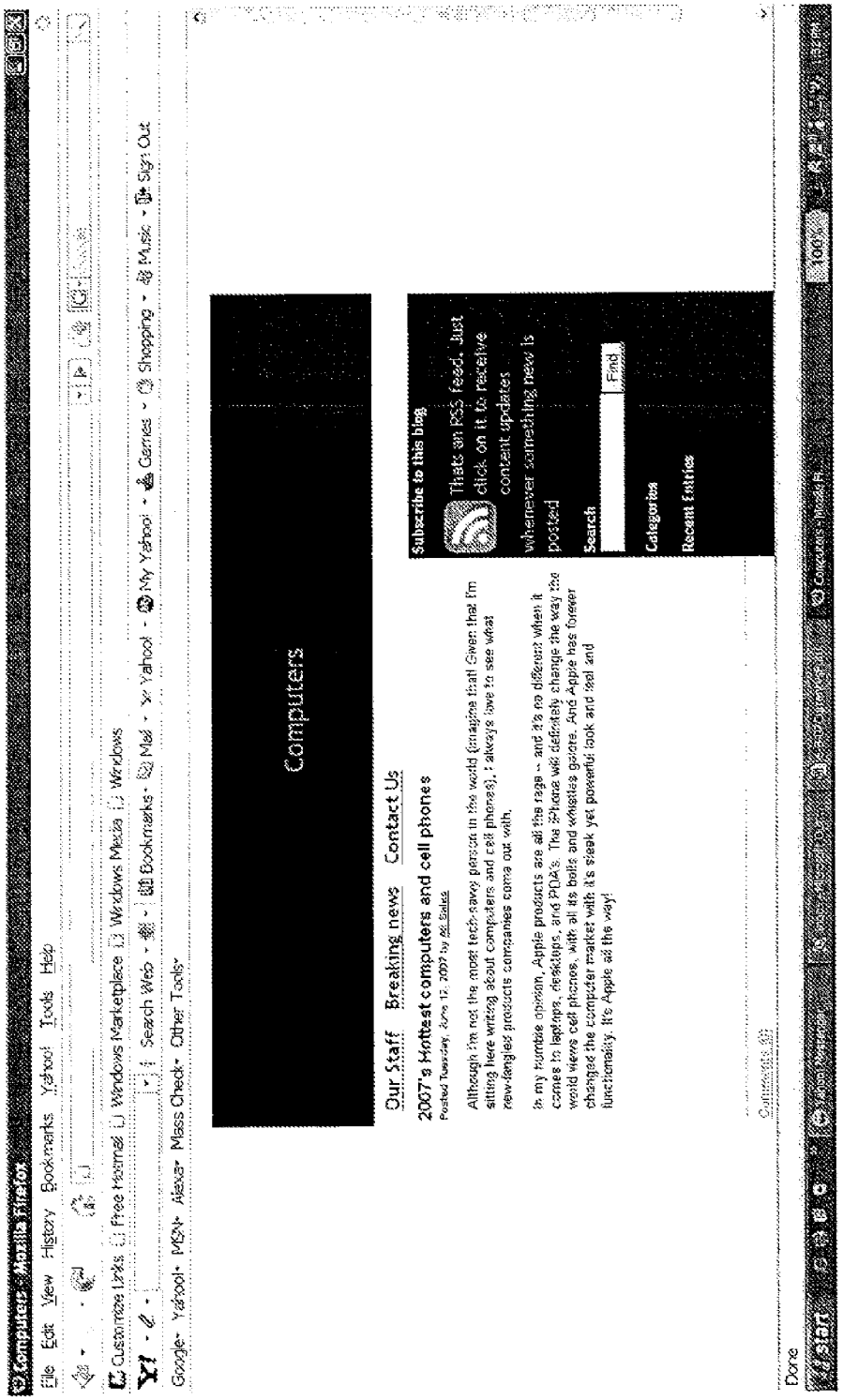
FIG. 25 shows another compended blog of at least one embodiment of a system for preparing compended blogs according to the present disclosure.

Another example of a compended blog of a system for preparing compended blogs 50 of the present application is shown in FIG. 25. As shown in FIG. 25, the compended blog is entitled "Computers," and only one of the three example posts referenced above are present on this compended blog. The post present within the "Computers" compended blog contained one or more tags relevant to the category and the subcategory or subcategories applicable to the "Computers" compended blog, while the other two example posts did not.

Figure 26:
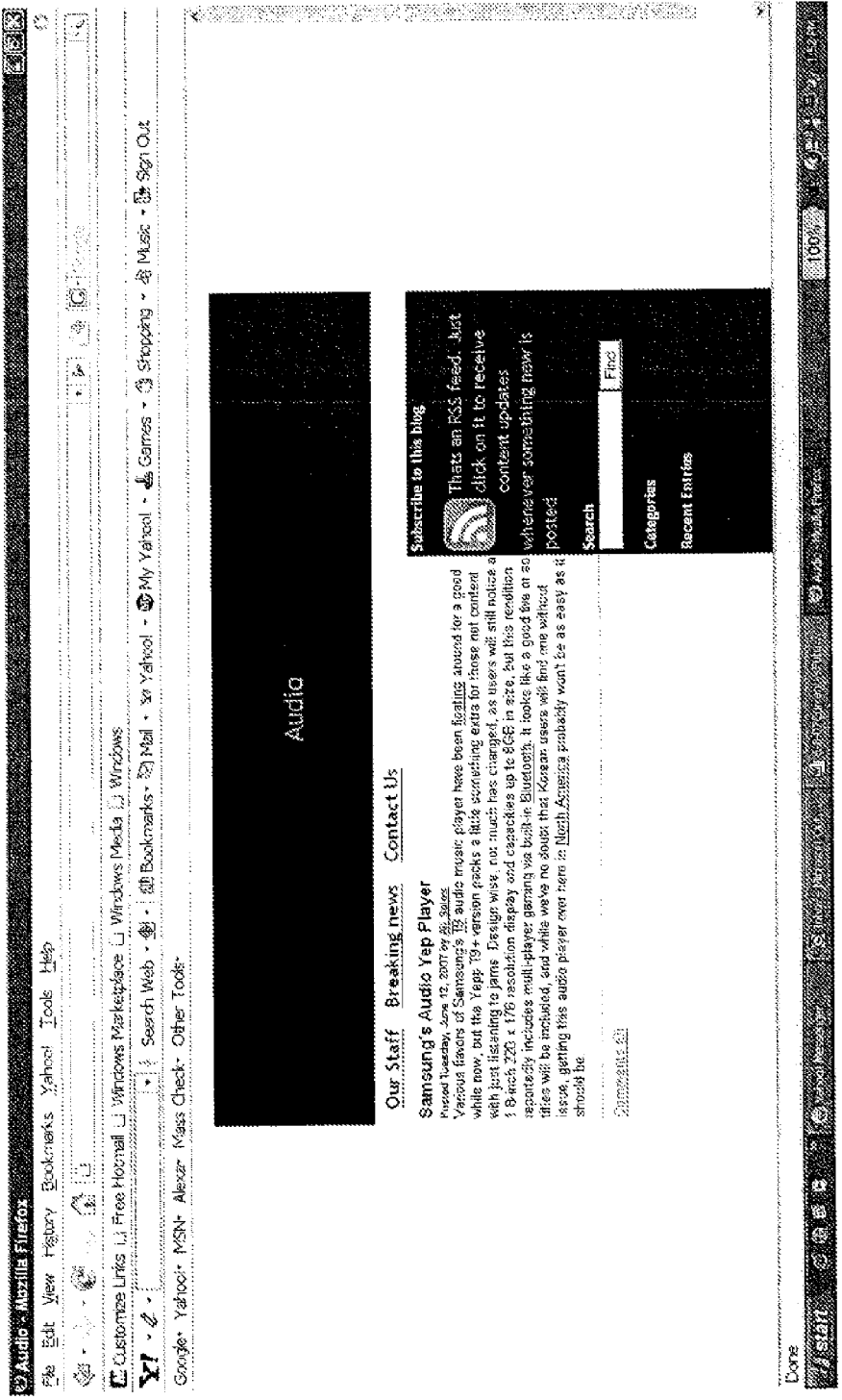
FIG. 26 shows another compended blog of at least one embodiment of a system for preparing compended blogs according to the present disclosure.

Yet another example of a compended blog of a system for preparing compended blogs 50 of the present application is shown in FIG. 26. As shown in FIG. 26, the compended blog is entitled "Audio," and only one of the three example posts referenced above are present on this compended blog. The post present within the "Audio" compended blog contained one or more tags relevant to the category and the subcategory or subcategories applicable to the "Audio" compended blog, while the other two example posts did not.

Figure 27:
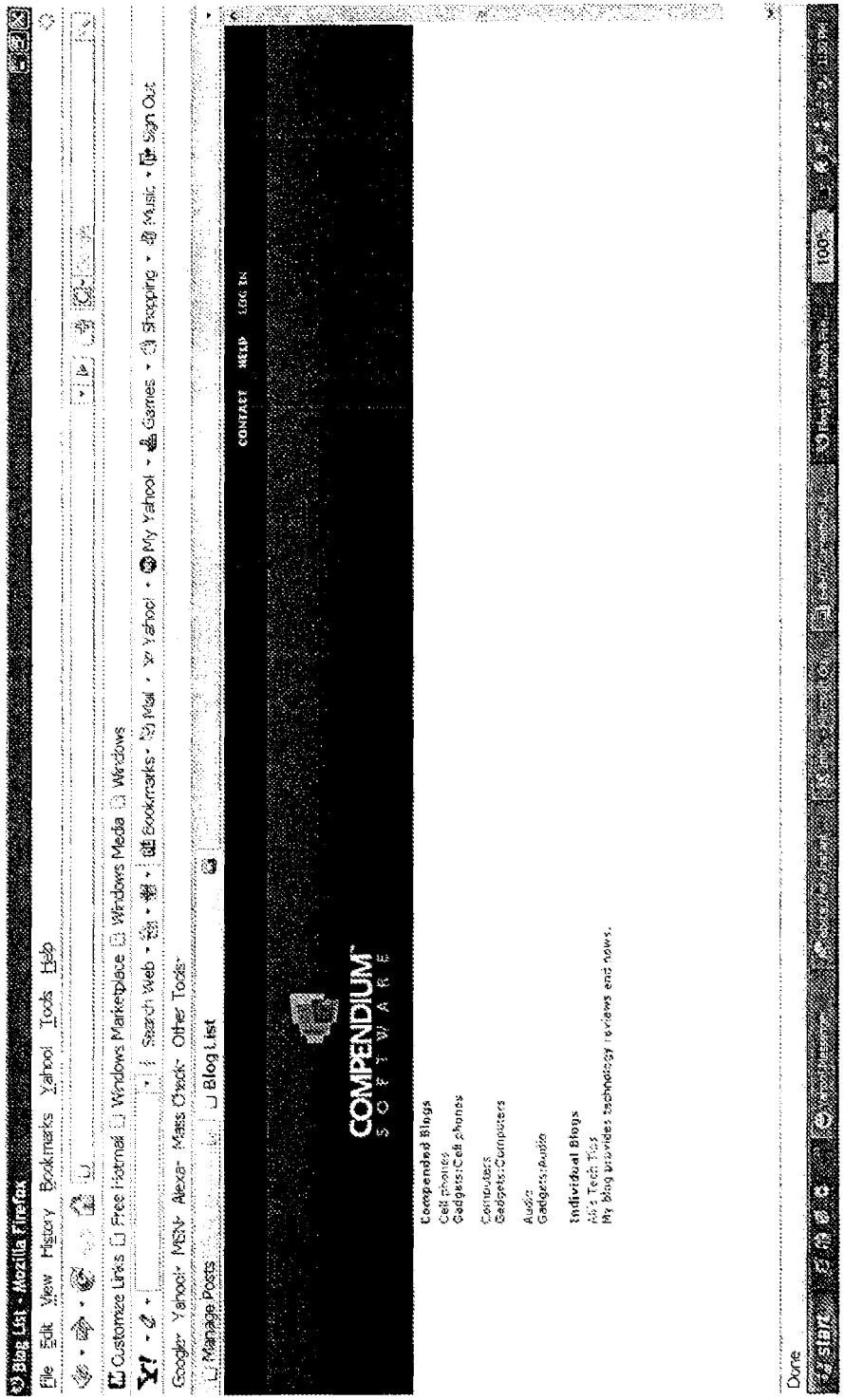
FIG. 27 shows a unique company web page of at least one embodiment of a system for preparing compended blogs according to the present disclosure

An example of a company's unique web page of a system for preparing compended blogs 50 of the present application is shown in FIG. 27. As shown in FIG. 27, the company's unique web page contains a list of compended blogs associated with a particular company, and illustratively all individual blogs (not shown). Similarly, FIG. 27 could instead represent an individual user's unique web page of a system for preparing compended blogs 50, and could contain a list of compended blogs associated with a particular user. Such a unique web page may be automatically created by a system for preparing compended blogs 50 based on the information entered as the "Blog Domain" during the setup process (shown in FIG. 5). In one embodiment, the URLs for all compended and individual blogs include the root domain, which may be set up during the administrator's registration process, and are appended with the title of the appropriate blog.

Figure 28:
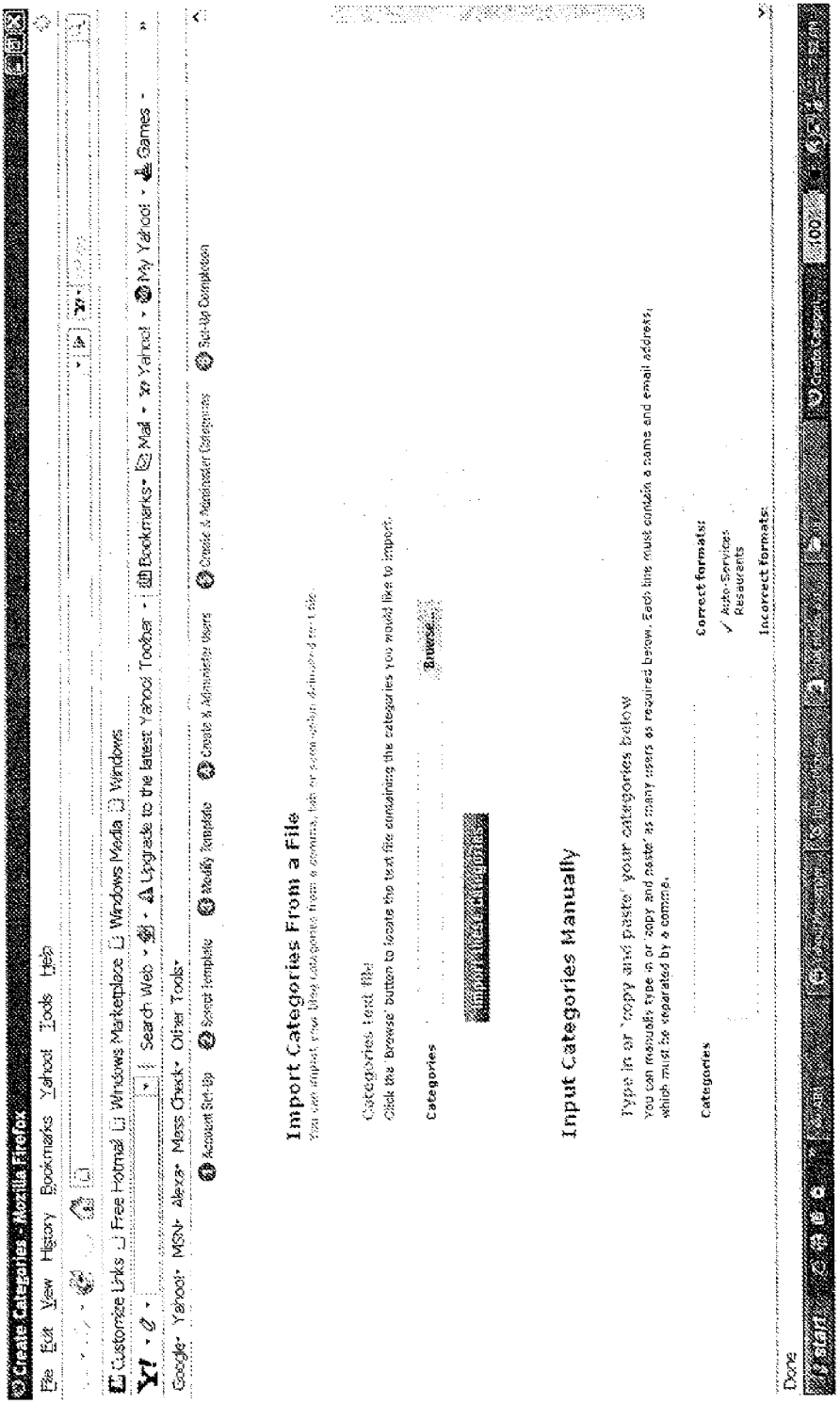
FIG. 28 shows a "Select Compended Blog Category" web page of at least one embodiment of a system for preparing compended blogs according to the present disclosure.

As shown in FIG. 28, a Select Compended Blog Category web page enables a user such as an administrator to either upload a list of categories or manually input categories associated with the user's organization's industry. Illustratively the user performs this task during the initial setup process, but it is within the scope of this disclosure to enable this functionality on demand. In the example shown, a car dealer might have the categories: Car models, used cars, and new cars. These categories serve as the starting point for finding the keyword phrases that people actually search online in order to find information, products and the like related to that industry. In this step, the user also specifies the number of keyword phrases he wants to be able to view per category. For example, the admin may elect to view the top 20 keyword phrases associated with each category, or the top 100, or any number desired.

Figure 29:
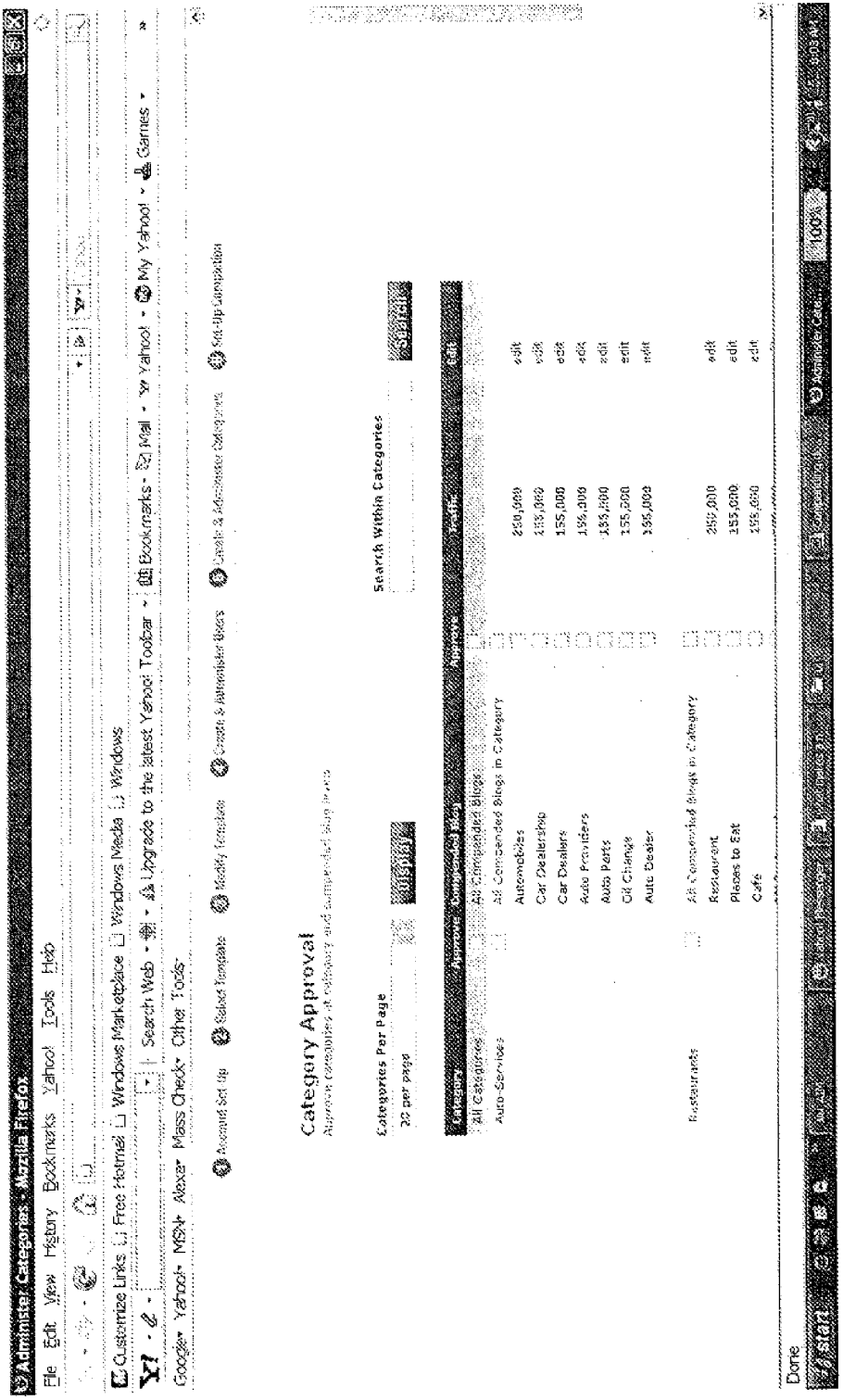
FIG. 29 shows a "Select Keywords/Blog Titles for Categories and Approval" web page of at least one embodiment of a system for preparing compended blogs according to the present disclosure, illustratively integrated with Trellian's Keyword Discovery Tool.

As shown in FIG. 29, a Select Keywords/Blog Titles for Categories and Approval web page enables a user such as an administrator to select keywords or categories. The page may further enable the user to approve or disapprove of a particular posting for inclusion generally or in a specific compended blog title or category. Illustratively the web page is integrated with Trellian's KeywordDiscovery tool. For each category listed by a user such as the administrator, system 50 may be configured to query a keyword service such as Trellian to retrieve and display a predetermined or other number of related keywords (this number may be designated by the administrator as previously disclosed). Data may include corresponding yearly traffic amounts for each keyword or other relevant data. Traffic amounts and other data may also form the basis upon which the number of displayed keywords is determined.

Still referring to FIG. 29, in the next step, the user (e.g. an administrator) views the data pulled from the service and can select the exact keyword phrases he wants for compended blogs. Again, illustratively, these keyword phrases will become the titles for compended blogs. For example, by putting a checkbox in the category column as shown in FIG. 29, the user is accepting all associated keyword phrases, i.e. Automobiles, Car Dealerships, Car Dealers, Auto Providers. This selection will result in 1 compended blog per keyword phrase selected. In another example, by putting a checkbox next to the individual keyword phrase, i.e. Automobiles, the admin is selecting only that keyword phrase, which will become the title of 1 compended blog.

Figure 30A:
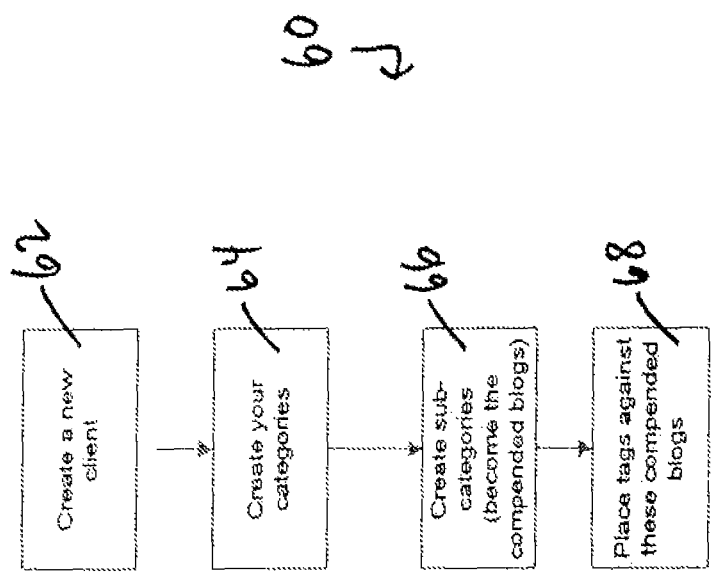
FIG. 30A shows an exemplary registration excerpt of at least one embodiment of a method for preparing compended blogs according to the present disclosure.

As shown in FIG. 30A, an exemplary registration method 60 includes the steps of creation of a new client 62, creation of one or more new categories 64, optional step 66 of creation of one or more sub-categories, and optional step 68 of placement of tags against one of the new categories or subcategories. This information is then saved to suitable memory and used in conjunction with the compending process.

Figure 30B:
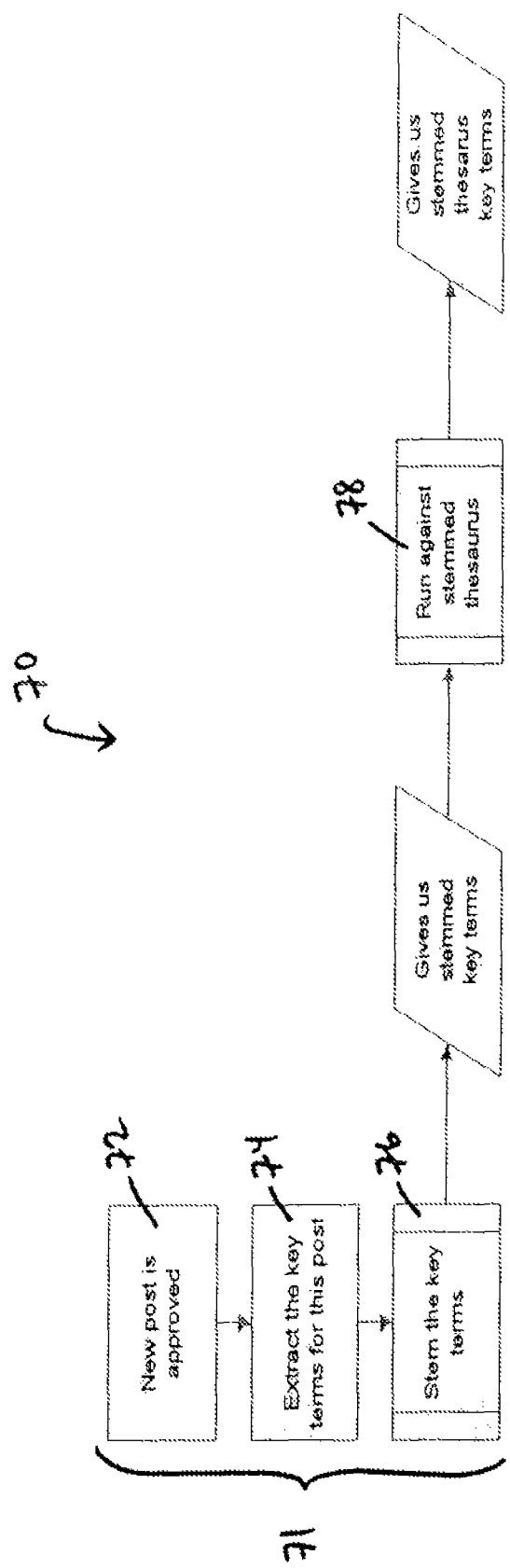
FIG. 30B shows a portion of an exemplary compending process, in particular a content post processing process of at least one embodiment of a method for preparing compended blogs according to the present disclosure.
Figure 30C:
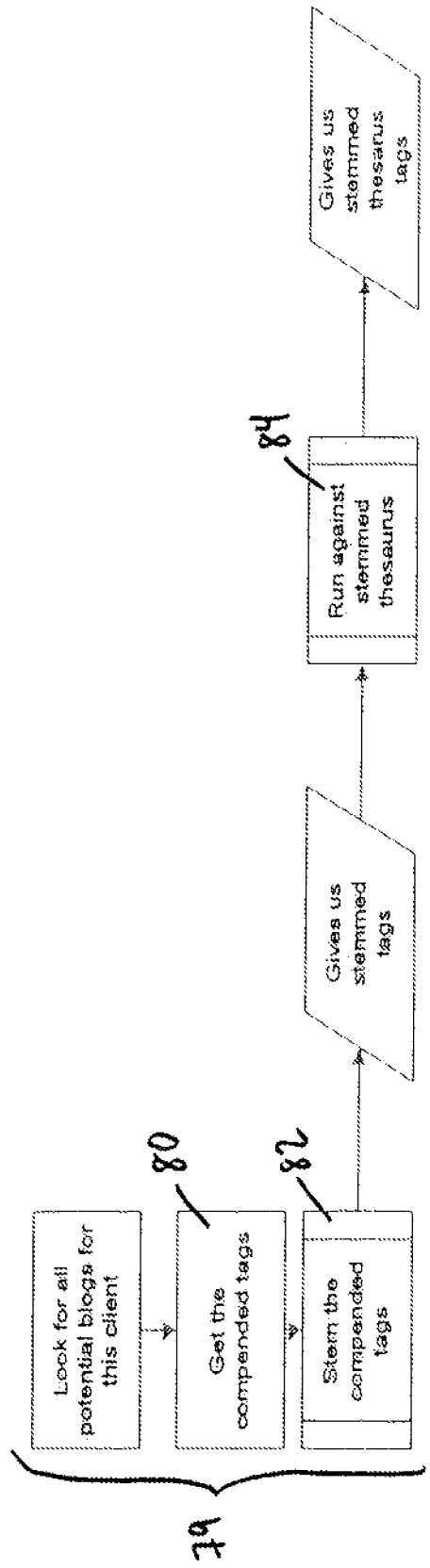
FIG. 30C shows a portion of an exemplary compending process, in particular a compended blog processing process of at least one embodiment of a method for preparing compended blogs according to the present disclosure.

FIGS. 30B and 30C show an exemplary compending process 70 in which post submissions are processed through post processing process 71 shown in FIG. 30B. Post processing process 71 illustratively includes the step 72 of approving a post submission from a user, step 74 of extracting key terms from the post, optional step 76 of stemming the key terms to produce stemmed key terms, and optional step 78 of processing the key terms and/or stemmed key terms with a thesaurus or stemmed thesaurus to produce key term synonyms or stemmed versions thereof.

Exemplary compending process 70 further includes compended blog identification to identify potential compended blog matches for post submissions through a compended blog processing process 79, as shown in FIG. 30C. Compended blog processing process 79 includes step 80 of identifying compended tags ("tags") for purposes of simplifying this identification part of this example may include identification and other processing of categories, sub-categories, or tags) of the potential compended blogs, optional step 82 of stemming the tags to produce stemmed tags, optional step 84 of processing the tags or stemmed tags with a thesaurus to produce tag synonyms or stems thereof.

Figure 30D:
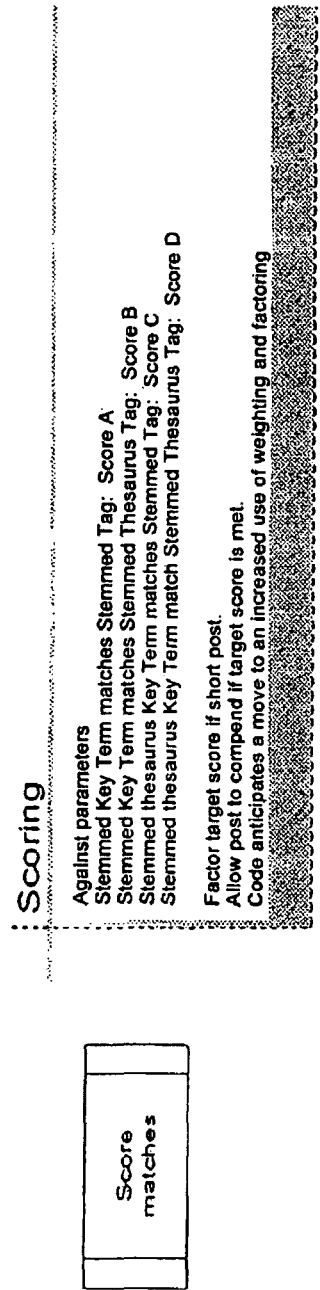
FIG. 30D shows an exemplary scoring process of and exemplary compending process of at least one embodiment of a method for preparing compended blogs according to the present disclosure.

Compending process 70 further includes a scoring algorithm which is applied in a scoring process to the results of the above processing. As shown in FIG. 30D, scores (or weights or factors) are applied to different kinds of matches. In the illustrative example, when a stemmed key term matches a stemmed tag the score of A is applied to the match; when a stemmed key term matches a stemmed thesaurus tag (or synonym) the score of B is applied to the match; when a stemmed thesaurus key term (synonym) matches a stemmed tag the score of C is applied to the match; and when a stemmed thesaurus key term (synonym) matches a stemmed thesaurus tag (or synonym) the score of D is applied to the match. A, B, C, and D may be all equal, all different, or some may be equal and others different. In one specific example, A>B>C>D. In another example, A>B>D, and B=C. Any number may be used for each score depending on the outcome that is desired. An overall score is calculated. The scores may be added to produce the overall score or they may be included in one or more match determination functions to calculate the overall score. Regardless, if the overall score produces a predetermined result, such as exceeding a threshold, then a match is declared. An administrator or other user may be notified of matches. The administrator or other users may be enabled to approve of a match or to decline or override the match. Once a match is determined (and optionally approved or not overridden), the post submission is posted to the compended blog. In one illustrative embodiment, if a post does not exceed a particular length, then a different function can be applied in comparison with the function applied for a longer post. Likewise, scores can be functions themselves, which functions adjust depending on some variable such as post length.

Figure 31A:
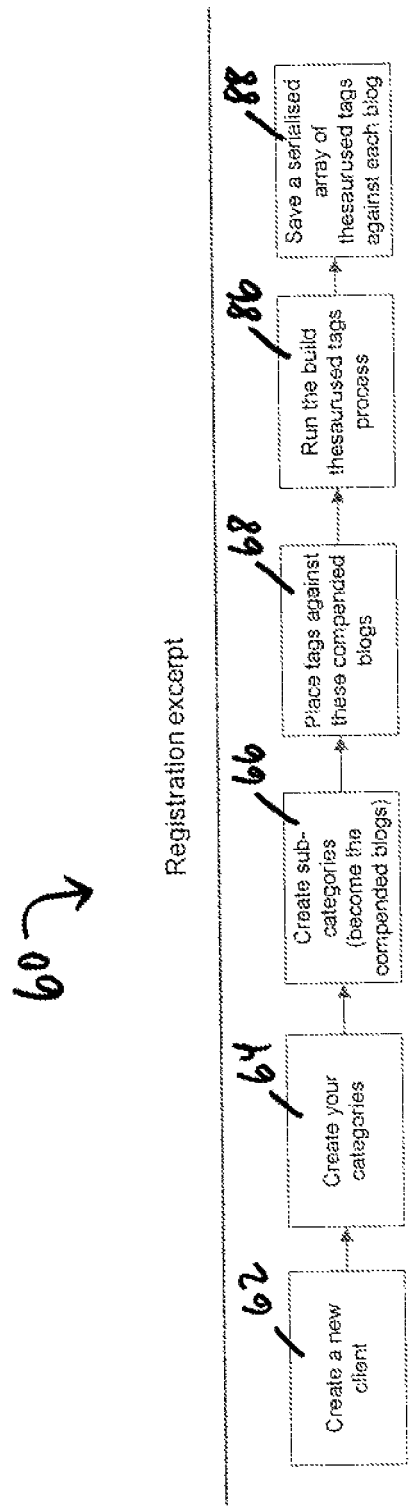
FIG. 31A shows an exemplary registration excerpt of at least one embodiment of a method for preparing compended blogs according to the present disclosure.

It can be appreciated that a scoring process such as the process described in reference to FIG. 30D is not the only process that may be used to obtain a match. For example, another embodiment of an exemplary registration method 60 is shown in FIG. 31A. This embodiment includes the steps of creation of a new client 62, creation of one or more new categories 64, optional step 66 of creation of one or more sub-categories, and optional step 68 of placement of tags against one of the new categories or subcategories. In addition, the exemplary registration method 60 shown in FIG. 31A further includes the steps of performing the build thesaurused tags process 86 and saving a serialized array of thesaurused tags against each blog 88. Build thesaurused tags process 86 may be performed by the process shown in FIG. 31B and is used to generate database of compended tags 308 as saved in process step 88. The information is then saved (i.e., process step 88) to suitable memory and used in conjunction with the compending process. As previously discusses herein, database of compended tags 308 may be processed using a thesaurus in process step 310 to generate one or more terms for use by a system for preparing compended blogs 50.

FIG. 31B shows an exemplary build thesaurused tags process 86 of a system for preparing compended blogs 50 of the present disclosure. In this exemplary build thesaurused tags process 86, a tag is first identified for building in build thesaurused tags process 86. As shown in step 3100, an exemplary tag ("Favorite Mexican Cuisine") is identified, and the tag is then converted to uppercase text ("FAVORITE MEXICAN CUISINE" in this example) in step 3102. Any common words (for example, "and" or "the"), or stems thereof, that may be present in the tag being processed are removed at step 3104. Common words are determined by comparing a word with a common word (or stem) list, for example, and if the word exists on the common word list, it is declared a common word. If a word is not on the "common word" list, it is an uncommon word. By way of additional example, if a tag originally enters this exemplary process as "Favorite Mexican and Italian Cuisine", step 3102 would convert the tag to "FAVORITE MEXICAN AND ITALIAN CUISINE", and step 3104 would remove the common word "AND" resulting with tag "FAVORITE MEXICAN ITALIAN CUISINE".

Step 3106 of the exemplary build thesaurused tags process 86 stems the tag using any one or more of the stemming processes described herein. For example, stemming "FAVORITE MEXICAN CUISINE" may result in "FAVOR MEXICAN CUISIN" as shown in step 3106. Stemming may have a number of benefits to use of system for comparing compended blogs 50, including but not limited to the effective reduction of the overall number of matches to those used in common language so that nonsense terms and phrases are not included as matches.

Step 3108 would then be performed to break out, or separate, the words in the tag from one another. For example, "FAVOR MEXICAN CUISIN" may result from step 3106, enter step 3108, and result in "FAVOR, MEXICAN, CUISIN". It can be appreciated that any number of separation identifiers may be used, including but not limited to commas, hyphens, and semicolons, as appropriate to allow for effective separation in build thesaurused tags process 86.

Step 3110 may then be performed to build a list of thesaurused matches for each word in the tag. For example, the stemmed term "FAVOR" may have the thesaurused matches of "BEST" and "GREAT", and the stemmed term "CUISIN" may have the thesaurused matches of "FOOD" and "DIN".

Step 3112 may then be performed to build a list of all possible combination of the thesaurused matches created and/or identified at step 3110. Continuing with the same tag example as shown in FIG. 31B, step 3112 would be performed to create the combinations "BEST MEXICAN FOOD", "BEST MEXICAN DIN", "GREAT MEXICAN FOOD", and "GREAT MEXICAN DIN". The number of combinations created by performing step 3112 is related to the number of thesaurused matches created and/or identified at step 3110.

Step 3114 may then be performed to store the combinations created by performing step 3112 in reverse order. For example, the combinations "BEST MEXICAN FOOD", "BEST MEXICAN DIN", "GREAT MEXICAN FOOD", and "GREAT MEXICAN DIN" may be created by step 3112, and step 3114 may take those combinations and create reversed combinations "FOOD MEXICAN BEST", "DIN MEXICAN BEST", "FOOD MEXICAN GREAT", and "DIN MEXICAN GREAT. An additional example, and as shown in step 3114, is "hotel in florida" versus "florida hotel", as both phrases are commonly understood to relate to hotels located in the State of Florida. Step 3114 is performed in part because the English language allows instances where a phrase can be reversed and still have the same or substantially the same meaning, as demonstrated by the hotel/Florida example.

Exemplary build thesaurused tags process 86 may not be limited to individual words. For example, and as may be described by way of example of a phrase match, the phrase "HIGH SCHOOL BASKETBALL" may be stemmed to "HIGH SCHO BASKETB" by performing step 3106, and may be separated into "HIGH, SCHO, BASKETB" by performing step 3108. Step 3110 may be performed to build a list of thesaurused matches, for example on the word "HIGH", resulting in the thesaurused match "TALL". However, and as can be appreciated, "TALL SCHOOL BASKETBALL" is a nonsense phrase, while "HIGH SCHOOL BASKETBALL" is a phrase commonly used and understood in the English language. As such, exemplary build thesaurused tags process 86 may further comprise the step (not shown in FIG. 31B) of recognizing words that are best understood as phrases, so that as in the present example, the words "HIGH SCHOOL" would remain as a phrase separate from the word "BASKETBALL", and an exemplary stemming of "HIGH SCHOOL BASKETBALL" may be ""HIGH SCHOOL" BASKETB". As such, and as described by way of the present example, both words and phrases are considered to be within the scope and spirit of the present disclosure.

Figure 31C:
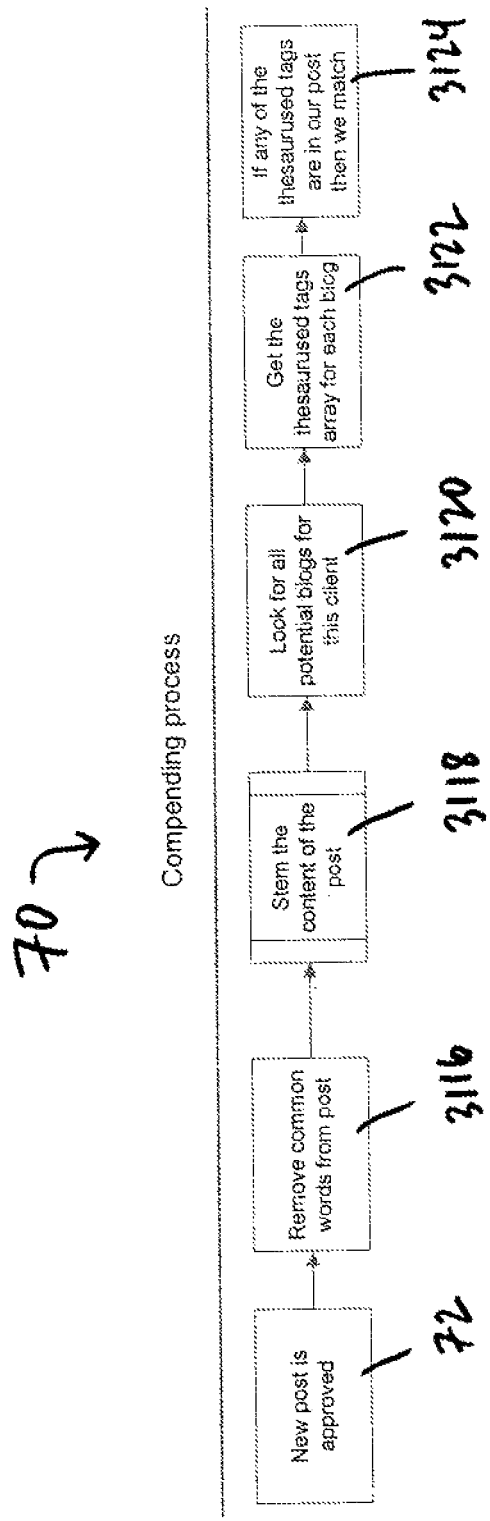
FIG. 31C shows a portion of an exemplary compending process of at least one embodiment of a method for preparing compended blogs according to the present disclosure.

FIG. 31C shows an another exemplary compending process 70 system for preparing compended blogs 50. As shown in FIG. 31C, compending process 70 includes step 72 of approving a post submission from a user (similar to compending process 70 shown in FIG. 30B), which is followed by step 3116 of removing common words from the post and step 3118 to stem the content of the post. Step 3116 may function similarly to step 3104 of FIG. 31B, as each step is performed to remove common words from a tag or a post, respectively. Step 3118 may function similarly to step 3106 of FIG. 31B, as each step is performed to stem the remaining words of a tag or post, respectively. The completion of step 3118 results in a compilation of stemmed terms based upon the remaining uncommon words of the post.

Exemplary compending process 70 as shown in FIG. 31C may further comprise the step 3120 of looking for all potential blogs for the client who prepared the present post. Step 3120 may be performed to identity one or more additional blogs by the same client, as the thesaurused tags saved for each of those blogs (as performed by step 88 of FIG. 31A) may be obtained in step 3122 of FIG. 31C. Those arrays of thesaurused tags obtained by performing step 3122 may be used in step 3124 to match any tags from the post being processed by exemplary compending process 70 shown in FIG. 31C to the thesaurused tags of the same client, thus completing the exemplary compending process 70 shown in FIG. 31C.

For each tag that may be applied to a compended blog, a set of potential matches (a serialized array of thesaurused tags) may be stored for a particular blog (as shown in step 88 of FIG. 31A). The stemmed thesaurus for a particular tag, as may be performed by exemplary build thesaurused tags process 86 of a system for preparing compended blogs 50 shown in FIG. 31B, may then be used to enhance the potential matches of compending process 70.

Figure 32:
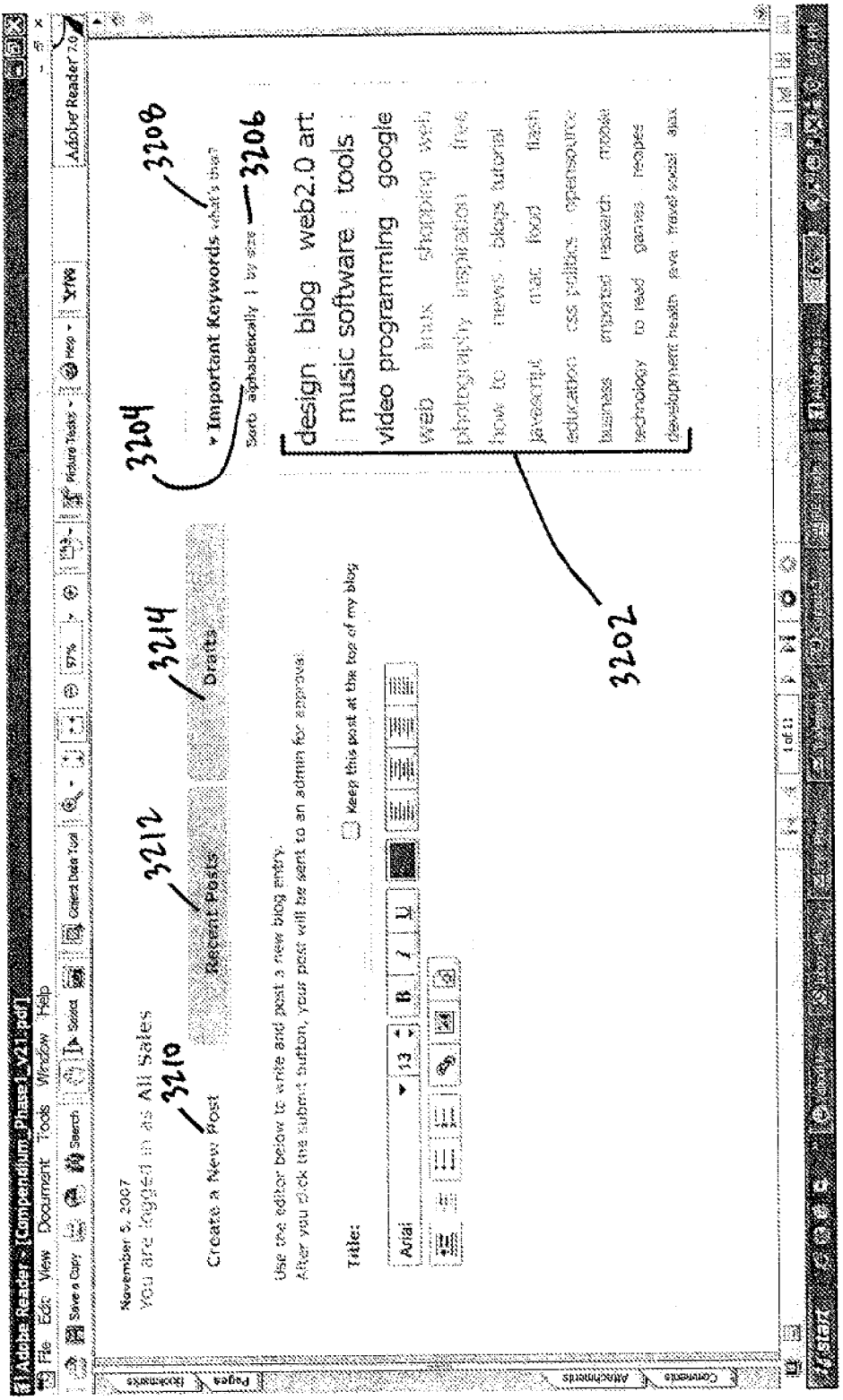
FIG. 32 shows a "Create a New Post" web page of at least one embodiment of a system for preparing compended blogs according to the present disclosure.

FIG. 32 shows a Create a New Post web page of a system for preparing compended blogs 50 according to an embodiment of the present disclosure. As shown in FIG. 32, Create a New Post web page 3200 allows a user to prepare a new blog article. The user may also include a title for the blog article and content for the particular blog article as shown in FIG. 18. Create a New Post web page 3200 illustratively comprises tag cloud 3202 (also referred to as a "word cloud") containing a visual representation generated by system for preparing compended blogs 50 providing a plurality of words. In the illustrative embodiment, the words depicted have been compended the most or the least in the context of the user's own postings, the organization's postings, or the postings of another group of users. In the example of FIG. 32, the tag cloud 3202 shown comprises the words/phrases "design", "blog", "web2.0 art", and others in the largest font shown, the word "web" in a smaller font, the words/phrases "linux", "free how to", "news", and others in yet a smaller font, etc., with the words/phrases in larger font being compended more frequently than the words/phrases in smaller fonts, respectively. It can be appreciated that it is within the scope of this disclosure for visual differences in the words presented in a tag cloud to be based on frequency of use, number of instances of use, the value in the context of the number of searches conducted using that particular word or phrase, or similar ranking criteria. It can be appreciated that emphasis can be placed on lesser-used or less frequently used words, for example, by causing such words to appear larger than comparably less used or less frequently used words.

Various font colors may also be used within tag cloud 3202, with words/phrases of similar compending frequency appearing in the same font color and different than words/phrases of lesser compending frequency. Tag cloud 3202, as shown within FIG. 32, may serve as a guide to the user when preparing his or her blog post by showing words/phrases commonly used with other compended blog posts and showing the frequency/popularity of those particular words/phrases so that the user may consider using one or more of those particular words/phrases in the post being prepared. This may be of particular interest to a user seeking to gain broader interest in his or her blog postings (by using more popular words/phrases rather than less popular words/phrases).

In the example shown in FIG. 32, the words/phrases within tag cloud 3202 (referenced within FIG. 32 as "Important Keywords") may also be sorted alphabetically or by size. A user may select "alphabetically" button 3204 to sort the words/phrases within tag cloud 3202 alphabetically, and/or the user may select "by size" button 3206 to sort the words/phrases within tag cloud 3202 by size. A user may also be able to select one or more of the words/phrases within tag cloud 3202 to direct the user to a separate web page, pop-up window, or a similar screen to provide the user with one or more example blog posts showing the use of that particular word. Alternatively, a user may be able to select one or more of the words/phrases within tag cloud so that the selected words/phrases are added to the blog post being prepared. A user may also select "what's this?" button 3208 to direct the user to a separate web page, pop-up window, or a similar screen to provide the user with information pertaining to the content and potential use(s) of tag cloud 3202. It can be appreciated that Create a New Post web page 3200 (or a functionally similar web page within system for preparing compended blogs 50) may contain one or more tag clouds 3202; and it can be further appreciated that the words/phrases within tag cloud(s) 3202 may not vary by font color and/or font size. Such embodiments within system for preparing compended blogs 50 utilizing multiple tag clouds 3202 may incorporate tag clouds 3202 based upon separate values, for example, frequency of use, number of instances of use, and the value in the context of the number of searches conducted using that particular word or phrase, or similar ranking criteria, within the same screen or web page. Further, such embodiments within system for preparing compended blogs 50 utilizing multiple tag clouds 3202 may incorporate tag clouds 3202 based upon ranking criteria for different groups; for example, one cloud may be presented for the particular user's own blog postings, another cloud for the postings of one or more groups of which the particular user is a member, an entire organization of which the user is an employee or agent, or other groups of which the user is a member. Further, it can be appreciated that a user or administrator may toggle within a single tag cloud to select whether tag cloud(s) 3202 is/are based upon criteria for an individual user, or such groups.

The example Create a New Post web page 3200 shown in FIG. 32 is shown with Create a New Post tab 3210 selected. The selection of Create a New Post tab 3210 by a user allows the user to insert a blog post title and content as described above with respect to FIG. 32 generally. A user may also select Recent Posts tab 3212 to direct the user to a web page or screen showing one or more blog posts recently prepared and posted by the user (or others in a group). A user may also select Drafts tab 3214 to direct the user to a web page or screen showing one or more drafts a user may have prepared which have not yet been posted or approved to the user's blog.

It can be appreciated that one or more web pages of a system for preparing compended blogs 50 of the present application may not be included within an exemplary system. Although this disclosure includes the example of blogs, it is within the scope of this disclosure to use the system and method for other content such as white papers or other writings or publications, videos, pictures, web pages, and the like. Although system 50 and the related method are described as including selection of categories, keywords, and compended tags, it is understood that not all of these levels are necessary, and even more may be included, in system 50 and the related method.

Although the system and method of the present application are described in the context of an individual user posting content to his or her individual webpage, or to a corporate webpage for inclusion in an organization's compended blog(s), the system and method may be used to compend posted content from a number of different sources not actively using the system or from one or more libraries of content. For example, any number of content providers could make their individual posts available for use by a company in compiling its blogs or a newsletter. It is within the scope of this disclosure for the system to be integrated with such a source or library so that instead of posting through the system, the system is used to select various posts to be included in the compended blog. Further, the system may be used to compend posted content in a manner other than a blog, such as a newsletter or other communication.

While various embodiments of systems, and methods for compending blogs have been described in considerable detail herein, the embodiments are merely offered by way of non-limiting examples of the disclosure described herein. Many variations and modifications of the embodiments described herein will be apparent to one of ordinary skill in the art in light of this disclosure. It will therefore be understood by those skilled in the art that various changes and modifications may be made, and equivalents may be substituted for elements thereof, without departing from the scope of the disclosure. Indeed, this disclosure is not intended to be exhaustive or to limit the scope of the disclosure. The scope of the disclosure is to be defined by the appended claims, and by their equivalents.

Further, in describing representative embodiments, the disclosure may have presented a method and/or process as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps disclosed herein should not be construed as limitations on the claims. In addition, the claims directed to a method and/or process should not be limited to the performance of their steps in the order written, and one skilled in the art can readily appreciate that the sequences may be varied and still remain within the spirit and scope of the present disclosure.

It is therefore intended that the disclosure will include, and this description and the appended claims will encompass, all modifications and changes apparent to those of ordinary skill in the art based on this disclosure.

We claim:

1. A method of posting blog content to a compended blog, the method comprising:
    establishing a plurality of compended blogs, each compended blog having at least one corresponding selected keyword and comprising one or more discrete compended posts, each compended post having been originally posted on a different blog;
    for each of the corresponding selected keywords, determining one or more stems of the selected keyword, and determining one or more synonyms of the selected keyword and of the one or more stems;
    obtaining a first blog content comprising a plurality of discrete first blog posts from a first blog;
    processing the first blog content to identify at least one blog content keyword contained within one or more of the discrete first blog posts;
    comparing the at least one identified blog content keyword to the at least one corresponding selected keyword of each compended blog and the corresponding stems and synonyms;
    for each of the compended blogs, posting the discrete first blog posts that contain the blog content keyword to the compended blog when the comparison reveals a match of the corresponding selected keyword of the compended blog or the corresponding stems or synonyms and the at least one blog content keyword based upon meeting or exceeding at least one predetermined criterion of the compended blog, and not posting the discrete first blog posts from the first blog to the compended blog when the discrete first blog posts are not relevant to the compended blog;
    obtaining a second blog content comprising a plurality of discrete second blog posts from a second blog;
    processing the second blog content to identify those of the discrete second blog posts that include the corresponding selected keyword or the corresponding stems or synonyms and those of the discrete second blog posts that are not relevant to the compended blog; and
    for each of the compended blogs, posting the discrete second blog posts that include the corresponding selected keyword or the corresponding stems or synonyms to the compended blog, and not posting the discrete second blog posts that are not relevant to the compended blog;
    wherein one of the discrete first blog posts, in response to the posting the discrete first blog posts that contain the blog content keyword or the corresponding stems or synonyms, is posted to a first compended blog and a second compended blog of the plurality of compended blogs.

2. The method of claim 1, wherein the at least one selected keyword comprises at least one compended tag.

3. The method of claim 1, wherein the at least one blog content keyword is stemmed to identify at least one blog content keyword stem.

4. The method of claim 3, wherein the comparing the at least one identified blog content keyword to the at least one corresponding selected keyword comprises comparing the at least one blog content keyword stem to the at least one corresponding selected keyword stem to determine whether a match exists.

5. The method of claim 3, wherein comparing the at least one identified blog content keyword to the at least one corresponding selected keyword comprises comparing the at least one identified blog content keyword and the at least one blog content keyword stem to the at least one corresponding selected keyword and the at least one selected keyword stem to determine whether a match exists.

6. The method of claim 1, wherein the at least one corresponding selected keyword is passed through a thesaurus to identify one or more selected keyword synonyms.

7. The method of claim 6, wherein the at least one blog content keyword is passed through a thesaurus to identify one or more blog content keyword synonyms.

8. The method of claim 7, wherein the comparing the at least one identified blog content keyword to the at least one corresponding selected keyword comprises comparing the one or more blog content keyword synonyms to the one or more selected keyword synonyms to determine whether the match exists.

9. The method of claim 1, wherein for each of the compended blogs, the matched discrete first blog posts and the matched discrete second blog posts are posted in chronological or reverse chronological order on the compended blog, the order based on a posting time on the corresponding first blog or second blog.

10. A system for compending blogs, comprising:
   a database capable of receiving blog content; and
   a processor associated with the database, the processor having and executing a program to:
   establish a plurality of compended blogs, each compended blog having at least one corresponding selected keyword and comprising one or more discrete compended posts, each compended post having been originally posted on a different blog;
   for each of the corresponding selected keywords, determine one or more stems of the selected keyword, and determining one or more synonyms of the selected keyword and of the one or more stems;
   obtain a first blog content comprising a plurality of discrete first blog posts from a first blog;
   process the first blog content to identify at least one blog content keyword contained within one or more of the discrete first blog posts;
   compare the at least one identified blog content keyword to the at least one corresponding selected keyword of each compended blog and the corresponding stems and synonyms; and
   for each of the compended blogs, post the discrete first blog posts that contain the blog content keyword to the compended blog when the comparison reveals a match of the corresponding selected keyword of the compended blog or the corresponding stems or synonyms and the at least one blog content keyword based upon meeting or exceeding at least one predetermined criterion of the compended blog, and not posting the discrete first blog posts from the first blog to the compended blog when the discrete first blog posts are not relevant to the compended blog;
   obtain a second blog content comprising a plurality of discrete second blog posts from a second blog;
   process the second blog content to identify those of the discrete second blog posts that include the corresponding selected keyword or the corresponding stems or synonyms and those of the discrete second blog posts that are not relevant to the compended blog; and
   for each of the compended blogs, post the discrete second blog posts that include the corresponding selected keyword or the corresponding stems or synonyms to the compended blog, and not posting the discrete second blog posts that are not relevant to the compended blog;
   wherein one of the discrete first blog posts, in response to the post the discrete first blog posts that contain the blog content keyword or the corresponding stems or synonyms, is posted to a first compended blog and a second compended blog of the plurality of compended blogs.

11. The system of claim 10, wherein the processor stems the at least one blog content keyword to identify at least one blog content keyword stem.

12. The system of claim 11, wherein the processor compares the at least one blog content keyword stem to the at least one corresponding selected keyword stem to determine whether a match exists.

13. The system of claim 10, wherein the processor passes the at least one corresponding selected keyword through a thesaurus to identify one or more selected keyword synonyms.

14. The system of claim 13, wherein the processor passes the at least one blog content keyword through a thesaurus to identify one or more blog content keyword synonyms.

15. The system of claim 14, wherein the processor compares the one or more blog content keyword synonyms to the one or more selected keyword synonyms to determine whether a match exists.

16. The system of claim 10, wherein for each of the compended blogs, the matched discrete first blog posts and the matched discrete second blog posts are posted in chronological or reverse chronological order on the compended blog, the order based on a posting time on the corresponding first blog or second blog.

17. A non-transitory computer-readable medium having instructions stored thereon that, when executed by a processor, cause the processor to generate a plurality of compended blogs, the generating comprising:
   establishing the plurality of compended blogs, each compended blog having at least one corresponding selected keyword and comprising one or more discrete compended posts, each compended post having been originally posted on a different blog;
   for each of the corresponding selected keywords, determining one or more stems of the selected keyword, and determining one or more synonyms of the selected keyword and of the one or more stems; obtaining a first blog content comprising a plurality of discrete first blog posts from a first blog;
   processing the first blog content to identify at least one blog content keyword contained within one or more of the discrete first blog posts;
   comparing the at least one identified blog content keyword to the at least one corresponding selected keyword of each compended blog and the corresponding stems and synonyms; and
   for each of the compended blogs, posting the discrete first blog posts that contain the blog content keyword to the compended blog when the comparison provides a match of the corresponding selected keyword of the compended blog or the corresponding stems or synonyms and the at least one blog content keyword based upon meeting or exceeding at least one predetermined criterion of the compended blog, and not posting the discrete first blog posts from the first blog to the compended blog when the discrete first blog posts are not relevant to the compended blog;

obtaining a second blog content comprising a plurality of discrete second blog posts from a second blog;

processing the second blog content to identify those of the discrete second blog posts that include the corresponding selected keyword or the corresponding stems or synonyms and those of the discrete second blog posts that are not relevant to the compended blog; and for each of the compended blogs, posting the discrete second blog posts that include the corresponding selected keyword or the corresponding stems or synonyms to the compended blog, and not posting the discrete second blog posts that are not relevant to the compended blog;

wherein one of the discrete first blog posts, in response to the posting the discrete first blog posts that contain the blog content keyword or the corresponding stems or synonyms, is posted to a first compended blog and a second compended blog of the plurality of compended blogs.

18. The computer-readable medium of claim 17, wherein the first blog is an individual blog.

19. The computer-readable medium of claim 17, wherein for each of the compended blogs, the matched discrete first blog posts and the matched discrete second blog posts are posted in chronological or reverse chronological order on the compended blog, the order based on a posting time on the corresponding first blog or second blog.

* * * * *

UNITED STATES PATENT AND TRADEMARK OFFICE
CERTIFICATE OF CORRECTION

PATENT NO. : 9,208,245 B2
APPLICATION NO. : 12/665568
DATED : December 8, 2015
INVENTOR(S) : Baggott et al.

Page 1 of 2

It is certified that error appears in the above-identified patent and that said Letters Patent is hereby corrected as shown below:

On the title page,

Item 57, column 2, under Abstract, line 2, delete "biogs," and insert -- blogs. --, therefor.

In the drawings,

On sheet 36 of 42, in FIG. 30B, line 7, delete "thesarus" and insert -- thesaurus --, therefor.

On sheet 37 of 42, in FIG. 30C, line 8, delete "thesarus" and insert -- thesaurus --, therefor.

On sheet 39 of 42, in FIG. 31A, under reference number 68, line 2, delete "companded" and insert -- compended --, therefor.

On sheet 40 of 42, in FIG. 31B, under reference number 3100, line 1, delete "Favorita" and insert -- Favorite --, therefor.

In the specification,

In column 1, line 24, delete "a an" and insert -- an --, therefor.

In column 1, line 29, delete "and a" and insert -- and an --, therefor.

In column 7, line 1, delete "father" and insert -- further --, therefor.

In column 7, line 45, after "number" delete "if" and insert -- is --, therefor.

In column 8, line 5, after "number" delete "if" and insert -- is --, therefor.

In column 20, line 56, delete "disclosure" and insert -- disclosure. --, therefor.

Signed and Sealed this
Twenty-third Day of August, 2016

Michelle K. Lee
*Director of the United States Patent and Trademark Office*

CERTIFICATE OF CORRECTION (continued)
U.S. Pat. No. 9,208,245 B2

In the specification,

In column 21, line 43, delete "farms" and insert -- forms --, therefor.

In column 21, line 45, delete "and or" and insert -- and/or --, therefor.

In column 24, line 39, delete "based on key terms" and insert -- based on full key terms --, therefor.

In column 24, line 43, delete "(mud/or" and insert -- (and/or --, therefor.

In column 24, line 49-50, delete "confidence," and insert -- confidence --, therefor.

In column 26, line 20, delete "clarity. System" and insert -- clarity, system --, therefor.

In column 30, line 30, delete "2007" and insert -- 2007. --, therefor.

In column 30, line 34, delete "that!Given" and insert -- that! Given --, therefor.

In column 30, line 37, delete "opinion." and insert -- opinion, --, therefor.

In column 35, line 38, delete "identity" and insert -- identify --, therefor.